US012562434B2

(12) United States Patent (10) Patent No.: US 12,562,434 B2
Siters et al. (45) Date of Patent: Feb. 24, 2026

(54) LIGHTWEIGHT NONWOVEN FIBER MATS

(71) Applicant: UNIFRAX I LLC, Tonawanda, NY (US)

(72) Inventors: Kevin E. Siters, Cheektowaga, NY (US); Kenneth B. Miller, Lockport, NY (US); Daniel Brandel, Lancaster, NY (US); Mark D. Stahlman, Niagara Falls, NY (US); Mauricio Munhoz de Souza, Amherst, NY (US); Bruce K. Zoitos, Williamsville, NY (US); Adam Kelsall, Williamsville, NY (US); Chad D. Cannan, Spring, TX (US)

(73) Assignee: UNIFRAX I LLC, Tonawanda, NY (US)

( * ) Notice: Subject to any disclaimer, the term of this patent is extended or adjusted under 35 U.S.C. 154(b) by 646 days.

(21) Appl. No.: 17/596,748

(22) PCT Filed: Jun. 18, 2020

(86) PCT No.: PCT/US2020/038540
§ 371 (c)(1),
(2) Date: Dec. 17, 2021

(87) PCT Pub. No.: WO2020/257526
PCT Pub. Date: Dec. 24, 2020

(65) Prior Publication Data
US 2022/0247036 A1 Aug. 4, 2022

Related U.S. Application Data

(60) Provisional application No. 62/864,244, filed on Jun. 20, 2019.

(51) Int. Cl.
*H01M 50/44* (2021.01)
*H01M 10/052* (2010.01)
(Continued)

(52) U.S. Cl.
CPC ......... *H01M 50/44* (2021.01); *H01M 10/052* (2013.01); *H01M 50/403* (2021.01);
(Continued)

(58) Field of Classification Search
CPC .... H01M 50/44; H01M 50/403; H01M 50/42; H01M 50/4295; H01M 50/437;
(Continued)

(56) References Cited

U.S. PATENT DOCUMENTS 4,277,545 A 7/1981 Kalnoki-Kis
4,421,834 A 12/1983 Zupancic
(Continued)

FOREIGN PATENT DOCUMENTS

CN 1216163 A 5/1999
CN 102522514 A 6/2012
(Continued)

OTHER PUBLICATIONS

English translation JPH0732007B2—Separator for storage battery; Nippon sheet Glass Co Ltd; Miwa; Apr. 10, 1995 (Year: 1995).*
(Continued)

*Primary Examiner* — Adam J Francis
(74) *Attorney, Agent, or Firm* — Haynes and Boone, LLP

(57) ABSTRACT
Nonwoven fiber mats include primarily B-glass fibers, and have a thickness of about 10 to about 700 microns and a basis weight of about 1 to 70 g/m². The mats are generally thermally stable at temperatures of up to 650° C., and are suitable for use as battery separators.

22 Claims, 48 Drawing Sheets

2020/01/23    L    x200    500 um

(51) Int. Cl.

| | |
|---|---|
| *H01M 50/403* | (2021.01) |
| *H01M 50/42* | (2021.01) |
| *H01M 50/429* | (2021.01) |
| *H01M 50/437* | (2021.01) |

(52) U.S. Cl.
CPC ....... *H01M 50/42* (2021.01); *H01M 50/4295* (2021.01); *H01M 50/437* (2021.01)

(58) Field of Classification Search
CPC ............. H01M 50/414; H01M 50/446; H01M 10/052; H01M 10/058; D04H 1/4218; D04H 1/645; D04H 1/732
See application file for complete search history.

(56) References Cited

U.S. PATENT DOCUMENTS

| | | | |
|---|---|---|---|
| 4,734,341 | A | 3/1988 | Descroix et al. |
| 5,415,959 | A | 5/1995 | Pyszczek et al. |
| 5,624,771 | A | 4/1997 | Sano et al. |
| 5,654,114 | A | 8/1997 | Kubota et al. |
| 5,962,162 | A | 10/1999 | Barrella et al. |
| 6,200,706 | B1 | 3/2001 | Ashida et al. |
| 6,376,109 | B1 | 4/2002 | Sano et al. |
| 6,447,958 | B1 | 9/2002 | Shinohara et al. |
| 6,478,829 | B1 | 11/2002 | Zguris |
| 6,489,062 | B1 | 12/2002 | Watanabe et al. |
| 6,511,774 | B1 | 1/2003 | Tsukuda et al. |
| 6,713,215 | B2 | 3/2004 | Watanabe et al. |
| 6,749,649 | B2 | 6/2004 | Sano et al. |
| 7,510,806 | B2 | 3/2009 | Yoshimura et al. |
| 8,481,206 | B2 | 7/2013 | Sawayama et al. |
| 8,741,486 | B1 | 6/2014 | Jacobsen et al. |
| 9,093,695 | B2 | 7/2015 | Chami et al. |
| 9,142,357 | B2 | 9/2015 | Matsumoto |
| 9,656,196 | B2 | 5/2017 | Sato et al. |
| 9,685,646 | B2 | 6/2017 | Ketzer et al. |
| 9,748,543 | B2 | 8/2017 | Hayakawa et al. |
| 9,755,204 | B2 | 9/2017 | Shimura et al. |
| 9,966,634 | B2 | 5/2018 | Numata et al. |
| 10,056,592 | B2 | 8/2018 | Krishnamoorthy et al. |
| 10,062,887 | B2 | 8/2018 | Guo et al. |
| 2004/0219424 | A1 | 11/2004 | Kanno et al. |
| 2005/0069779 | A1 | 3/2005 | Yoshimura et al. |
| 2006/0068294 | A1 | 3/2006 | Mraz et al. |
| 2006/0096263 | A1 | 5/2006 | Kahlbaugh et al. |
| 2011/0059370 | A1* | 3/2011 | Sawayama ........ H01M 10/0569 429/326 |
| 2012/0121975 | A1* | 5/2012 | Rajaram ............... H01M 50/44 428/401 |
| 2012/0255398 | A1 | 10/2012 | Schade et al. |
| 2013/0101887 | A1* | 4/2013 | Sugiyama ........... H01M 50/491 429/144 |
| 2013/0224543 | A1 | 8/2013 | Park et al. |
| 2015/0068029 | A1 | 3/2015 | Park et al. |
| 2015/0079479 | A1* | 3/2015 | Hayakawa ........... H01M 50/411 429/255 |
| 2015/0099155 | A1 | 4/2015 | Guo et al. |
| 2016/0145779 | A1* | 5/2016 | Teng ....................... E04C 2/043 442/330 |
| 2016/0240885 | A1 | 8/2016 | Nishimura |
| 2017/0117549 | A1 | 4/2017 | Hintennach |
| 2017/0194649 | A1 | 7/2017 | Huusken |
| 2017/0288188 | A1* | 10/2017 | Dietz, III .............. H01M 10/12 |
| 2018/0034027 | A1 | 2/2018 | Shang et al. |
| 2018/0261816 | A1 | 9/2018 | Himstedt et al. |
| 2018/0309107 | A1* | 10/2018 | Widener ............. H01M 10/658 |
| 2018/0366763 | A1 | 12/2018 | Wang Chen |
| 2019/0237730 | A1 | 8/2019 | Himstedt et al. |

FOREIGN PATENT DOCUMENTS

| | | |
|---|---|---|
| CN | 105990554 A | 10/2016 |
| DE | 38 29 420 C1 | 11/1989 |
| DE | 10 2007 054 223 A1 | 5/2009 |
| DE | 10 2009 029 598 B4 | 8/2012 |
| DE | 10 2014 218 779 A1 | 3/2016 |
| EP | 0 191 569 A2 | 8/1986 |
| EP | 0 296 589 A2 | 12/1988 |
| EP | 0 432 501 A2 | 6/1991 |
| EP | 0 441 589 A1 | 8/1991 |
| EP | 0 443 235 A2 | 8/1991 |
| EP | 0 587 199 B1 | 10/1999 |
| EP | 0 953 218 B1 | 3/2003 |
| EP | 2 680 342 A1 | 1/2014 |
| EP | 2 262 037 B1 | 8/2014 |
| EP | 2 636 086 B1 | 3/2015 |
| EP | 2 897 189 A1 | 7/2015 |
| EP | 3 206 251 A1 | 8/2017 |
| EP | 3 080 852 B1 | 2/2018 |
| EP | 2 954 573 B1 | 4/2018 |
| EP | 3 067 956 B1 | 4/2018 |
| EP | 3 343 688 A1 | 7/2018 |
| EP | 3 067 955 B1 | 8/2018 |
| EP | 3 155 673 B1 | 12/2018 |
| JP | 2-170347 A | 7/1990 |
| JP | H0732007 B2 * | 4/1995 |
| JP | 8-28215 B2 | 3/1996 |
| JP | 3466045 B2 | 11/2003 |
| JP | 2007-317405 A | 12/2007 |
| JP | 4075866 B2 | 4/2008 |
| JP | 4095670 B2 | 6/2008 |
| JP | 4491075 B2 * | 6/2010 ............. C03C 13/00 |
| JP | 2011-060444 A | 3/2011 |
| JP | 2011-134930 A | 7/2011 |
| JP | 2011-233473 A | 11/2011 |
| JP | 2011-253709 A | 12/2011 |
| JP | 2013-89563 A | 5/2013 |
| JP | 2015-32518 A | 2/2015 |
| JP | WO 2013/180073 A1 | 1/2016 |
| JP | 5876766 B2 | 3/2016 |
| JP | WO 2016/031693 A1 | 3/2016 |
| JP | 2016-100181 A | 5/2016 |
| JP | 2017-033864 A | 2/2017 |
| JP | 2017-078109 A | 4/2017 |
| JP | 2017-082028 A | 5/2017 |
| JP | 2018-095976 A | 6/2018 |
| KR | 10-2008-0027229 | 3/2008 |
| KR | 10-0859754 B1 | 9/2008 |
| KR | 10-1306274 B1 | 9/2013 |
| KR | 10-2015-0013662 | 2/2015 |
| KR | 10-2015-0134425 | 12/2015 |
| WO | WO 81/03397 A1 | 11/1981 |
| WO | WO 98/32184 A1 | 7/1998 |
| WO | WO 03/012896 A1 | 2/2003 |
| WO | WO 03/065480 A1 | 8/2003 |
| WO | WO 2006/019148 A1 | 2/2006 |
| WO | WO 2017/036522 A1 | 3/2017 |
| WO | WO 2018/011478 A1 | 1/2018 |
| WO | WO 2018/185075 A2 | 10/2018 |

OTHER PUBLICATIONS

International Search Report and Written Opinion of the International Search Authority issued by the U.S. Patent and Trademark Office for International Application No. PCT/US2020/038540 dated Nov. 24, 2020. (10 pages).

Raj Borax Private Limited, "Boron in Glass and Glass Fibre" www.rajborax.com, Apr. 29, 2016. (online], [retrieved on Sep. 24, 2020]. Retrieved from the Internet: <URL: http://www.rajborax.com/Boron%20in%20glass.html>. (1 page).

North American High Temperature Insulation Wool Industry, "Refractory Ceramic Fiber", www.htiwcoalition.org, 2019. [online], [retrieved on Sep. 16, 2020]. Retrieved from the Internet: URL:http://www.htlwcoalition.org/rcf.html. (2 pages).

Nittobo Group, "Special Materials—T-Glass", www.nittobo.co.jp, 2020. [online], [retreived on Sep. 16, 2020]. Retrieved from the Internet: <URL: https://www.nittobo.co.jp/eng/business/glassfiber/sp_material/t-glass.htm>. (4 pages).

International Preliminary Report on Patentability received in International Application No. PCT/US2020/038540, issued Dec. 21, 2021. (7 pgs.).

(56) References Cited

OTHER PUBLICATIONS

Kirchhöfer, M. et al., "Separators for Li-Ion and Li-Metal Battery Including Ionic Liquid Based Electrolytes Based on the TFSI- and FSI-Anions", International Journal of Molecular Sciences 2014, 15, 14868-14890. (23 pgs.).

Newman, G., "Electrolyte Structure and Lithium Rechargeability", The Electrochemical Society Proceedings 1980, 143-157. (17 pgs.).

Schadeck, Ulrich et al., "Flexible, Heat-Resistant, and Flame-Retardant Glass Fiber Nonwoven/Glass Platelet Composite Separator for Lithium-Ion Batteries", Energies 2018, 11, 999, 1-14. (14 pgs.).

Shui, J. et al., "Reversibility of anodic lithium in rechargeable lithium-oxygen batteries", Nature Communications 2013, 1-7. (7 pgs.).

Subbarao, S.; Frank H., "Characterization of Glass Fiber Separator Material for Lithium Batteries", NASA Goddard Space Flight Center—Battery Workshop 1983, 97-106. (10 pgs.).

Xi, Luo et al., "Glass fiber fabric mat as the separator for lithium-ion battery with high safety performance", Springer-Short Communication 2015, 3135-3139. (5 pgs.).

Zhang, Bo, "A superior thermostable and nonflammable composite membrane towards high power battery separator", Nano Energy 2014, 10, 277-287. (11 pgs.).

Zhu, J., "Understanding glass fiber membrane used as a novel separator for lithium-sulfur batteries", Journal of Membrane Science 504 (2016), 89-96. (8 pgs.).

Office Action for Korean Patent Application No. 10-2022-7001850, issued by the Korean Intellectual Property Office, dated Jan. 2, 2024. (7 pgs.).

English translation of Office Action for Korean Patent Application No. 10-2022-7001850, issued by the Korean Intellectual Property Office, dated Jan. 2, 2024. (7 pgs.).

First Office Action and Search Report for Chinese Patent Application No. 202080058731.5, issued by the China National Intellectual Property Administration, dated Dec. 1, 2023. (9 pgs.).

English Translation of First Office Action and Search Report for Chinese Patent Application No. 202080058731.5, issued by the China National Intellectual Property Administration, dated Dec. 1, 2023. (15 pgs.).

First Office Action for Japanese Patent Application No. 2021-575893, issued by the Japanese Patent Office, dated Feb. 14, 2023. (4 pgs.).

English Translation of First Office Action for Japanese Patent Application No. 2021-575893, issued by the Japanese Patent Office, dated Feb. 14, 2023. (4 pgs.).

Extended European Search Report for European Patent Application No. 20826497.8, issued by the European Patent Office, dated May 26, 2023. (7 pgs.).

Notification to Grant Patent Right for Invention for Chinese Patent Application No. 202080058731.5, issued by the China National Intellectual Property Administration, dated Sep. 2, 2024. (5 pgs.).

English Translation of Notification to Grant Patent Right for Invention for Chinese Patent Application No. 202080058731.5, issued by the China National Intellectual Property Administration, dated Sep. 2, 2024. (2 pgs.).

Opposition No. 2024-700928 for Japanese Patent No. 7471327, issued by the Japanese Patent Office, dated Nov. 7, 2024, Part 1. (39 pgs.).

Opposition No. 2024-700928 for Japanese Patent No. 7471327, issued by the Japanese Patent Office, dated Nov. 7, 2024, Part 2. (38 pgs.).

Opposition No. 2024-700928 for Japanese Patent No. 7471327, issued by the Japanese Patent Office, dated Nov. 7, 2024, Part 3. (33 pgs.).

Opposition No. 2024-700928 for Japanese Patent No. 7471327, issued by the Japanese Patent Office, dated Nov. 7, 2024, Part 4. (11 pgs.).

Notice of Reasons for Revocation of a Patent for Japanese Patent No. 7471327, issued by the Japanese Patent Office, dated Jan. 27, 2025. (30 pgs.).

* cited by examiner

LIGHTWEIGHT NONWOVEN FIBER MATS

CROSS-REFERENCE TO RELATED APPLICATIONS

This application is a U.S. National Stage patent application of International Patent Application No. PCT/US2020/038540, filed Jun. 18, 2020, which claims priority to U.S. Provisional Patent Application No. 62/864,244, filed Jun. 20, 2019, entitled "Lightweight Nonwoven Fiber Mats," the disclosures of which are hereby incorporated by reference in their entirety.

BACKGROUND

The present disclosure relates generally to nonwoven fiber mats and methods of preparation thereof. In particular, the present disclosure describes lightweight nonwoven fiber mats that provide a porous membrane and are resistant to degradation and shrinkage in extreme thermal events. The nonwoven fiber mats may be used, for example, as battery separators.

Lithium ion batteries offer several advantages over other batteries, such as conventional lead acid batteries. Some of the advantages that are offered include being typically lighter than other batteries for a given capacity, delivering a high open-circuit voltage, a low self-discharge rate, a reduced battery memory effect, and reduced toxic landfill. Lithium-ion batteries, however, are prone to some issues and/or safety concerns such as thermal runaway, which may occur if the battery is overheated or overcharged.

Thermal runaway occurs when the cell becomes thermally unstable, which can lead to a spike in temperature within the cell that may result in catastrophic failure of the cell and/or battery. During thermal runaway, the high heat of the failing cell can propagate to adjacent cells within the battery, which may cause the adjacent cells to become thermally unstable. A chain reaction may result within the battery, which may lead to rupture of the cell and/or fire, or an explosion in extreme cases. Thermal runaway can be initiated from various sources including overcharging, charging at a voltage that is too great, dendrite growth within the cell, or other overheating or short-circuiting events.

The widespread use of lithium-ion batteries as portable power sources over the last decade has revealed a need for increased safety within the system. In lithium-ion batteries, polymer separators of polyethylene or polypropylene are commonly used; however, these separators are susceptible to thermal degradation in the event of cell overheating or thermal runaway. Failure of the separator may lead to a direct short and an explosive energy generation in the cell. The shrinkage and degradation of the separator can lead to a dangerous short in the battery.

Thus, there is a continuing need for improved materials and methods that provide increased safety, particularly in lithium-ion batteries.

BRIEF DESCRIPTION OF THE DRAWINGS

The following figures are included to illustrate certain aspects of the present invention, and should not be viewed as an exclusive embodiment. The subject matter disclosed is capable of considerable modification, alteration, and equivalents in form and function, as will occur to those of ordinary skill in the art and having the benefit of this disclosure.

DETAILED DESCRIPTION

Figure 1:
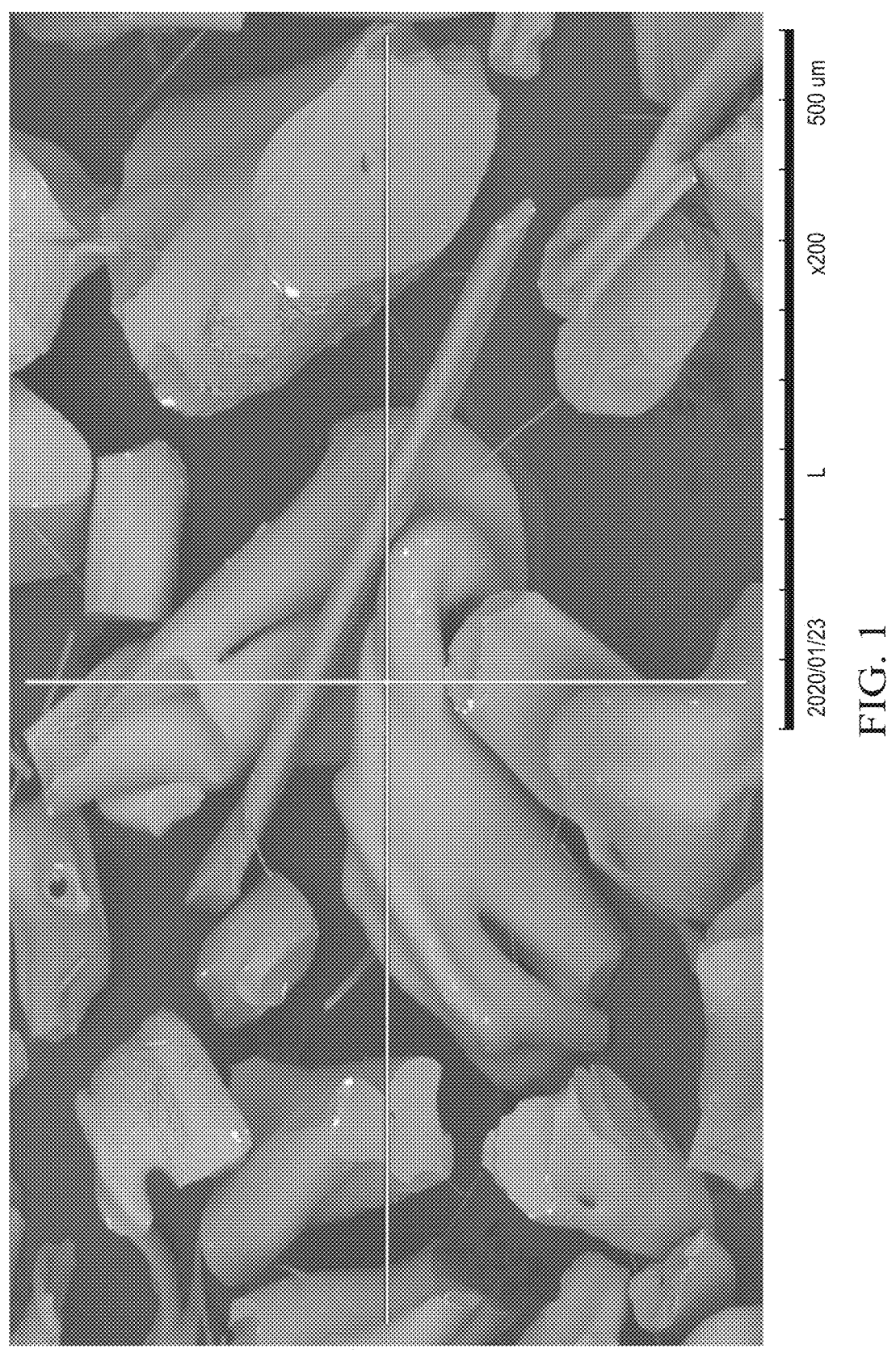
FIG. 1 illustrates an SEM micrograph of "shot" generated during the fiberization of BX9 fiber according to embodiments of the present disclosure.

The present disclosure describes a nonwoven fiber mat that includes primarily B-glass fibers (borosilicate glass), refractory ceramic fibers (RCF), or polycrystalline wool fibers with a thickness of about 10 microns to about 500 microns, with excursions to a maximum thickness of 700 microns, a basis weight of about 1 to about 70 g/m$^2$ (GSM), an average pore diameter of about 0.5 to about 0.8 microns, a cumulative pore volume of about 1 to about 5 cm$^3$/g, a permeability of about 0.01 to 1 Darcy, and a surface area of about 3 to about 35 m$^2$/g. In some embodiments, the B-glass fibers have an average diameter of less than or equal to about 1 micron and are present in an amount of about 50 to about 100 weight percent of the fiber mat. Permeability, pore size, and similar properties are facilitated by the diameter of the fiber; a fine fiber allows the present disclosure to provide a robust, porous membrane that allows for the transport of select materials. Advantageously, the mat may have the properties of being permeable or semipermeable to ions and liquids, thermally stable at elevated temperatures, and/or electrically insulating. In exemplary embodiments, the mat is thermally stable up to 650° C.

The compositions of B-glass, C-glass (acid resistant borosilicate glass) and E-glass (calcium aluminosilicate glass) are provided below in Table 1, wherein the amount of each component is expressed in weight percent.

TABLE 1

| COMPOSITIONS OF B, C, and E GLASS | | | |
|---|---|---|---|
| | B | C | E |
| SiO$_2$ | 55.0-60.0 | 63.0-67.0 | 50.0-56.0 |
| Al$_2$O$_3$ | 4.0-7.0 | 3.0-5.0 | 13.0-16.0 |
| B$_2$O$_3$ | 8.0-11.0 | 4.0-7.0 | 5.8-10.0 |
| Na$_2$O | 9.5-13.5 | 14.0-17.0 | <0.50 |
| K$_2$O | 1.8-4.0 | <2.0 | <0.40 |
| CaO | 2.8-5.0 | 4.0-7.0 | 15.0-24.0 |
| MgO | <2.0 | 2.0-4.0 | <5.5 |
| Fe$_2$O$_3$ | <0.20 | <0.20 | <0.50 |
| ZnO | 2.0-5.0 | <0.10 | <0.02 |
| BaO | 3.0-6.0 | <0.10 | <0.03 |
| F$_2$ | <1.0 | <1.0 | <1.0 |
| TiO$_2$ | — | — | <1.0 |

Any type of B-glass fiber (or a combination of different types of B-glass fibers) may be used in the mat. For example, BX9 fibers, BOO fibers, and/or B02 fibers, all commercially available from Lauscha Fiber International GmbH, may be used. These fibers all have the composition noted above in Table 1 and meet the following additional criteria:

BX9 fibers—average fiber diameter of less than 0.5 microns and specific surface area of 5.0 to 7.0 m$^2$/g B00 fibers—average fiber diameter of less than 0.6 microns and specific surface area of 3.8 to 5.8 m$^2$/g B02 fibers—average fiber diameter of less than 0.7 microns and specific surface area of 2.5 to 3.5 m$^2$/g Other types of fibers, however, including fibers of different chemistries, diameters, morphologies, lengths and nominal surface areas, may be used at an additive level (e.g., at no more than 50% of the mat, at no more than 25% of the mat, or at no more than 10% of the mat). In an exemplary embodiment, C-glass fibers and B-glass fibers with the compositions set forth in Table 1 above are both present in the mat.

Polycrystalline wool fibers are high performance fibers, which may include about 1 to about 28 weight percent silica (SiO$_2$), and about 72 to about 99 weight percent aluminum oxide (Al$_2$O$_3$). High performance fibers differ in properties from conventional RCFs that include from about 40 weight percent to about 60 weight percent Al$_2$O$_3$ and about 40 weight percent to about 60 weight percent SiO$_2$. The toughness of high performance fibers makes them desirable for use in insulating and supportive articles.

In various embodiments, the mat also includes a binder (e.g., organic binder and/or inorganic binder) in an amount of up to about 20 weight percent. Suitable organic binders include, but are not limited to, nanofibrillated cellulose (NFC), microfibrillated cellulose (MFC), and acrylic latex emulsions. Other suitable organic binders include emulsions of polyethylene, polypropylene, polyimides, polyamides, polyvinyl alcohols, silicone, polyvinyl acetates, polyvinyl chlorides, polystyrenes (e.g., styrene-butadiene-rubber and styrene maleic anhydride), starches (of all chemistries), celluloses (e.g., carboxymethyl cellulose and hydroxyethyl cellulose), other polyolefins, and binders or resins of varying chemistries commonly used in standard papermaking techniques. Inorganic binders may also be used and include additional inorganic fibers of different diameters and different chemistries, and/or other binders such as inorganic clays.

In several embodiments, the mat is fabricated using standard papermaking methods. Such methods typically rely on suspending the fiber in water or other suitable media and vacuum forming by draining on a screen or forming using a doctor blade, spraying, foaming, fourdrinier, or inclined wire or rotoforming techniques.

Mat Applications

In several embodiments, the mat is formulated into a battery separator. The battery separator may be incorporated into any suitable battery, such as lithium-ion batteries, nickel-cadmium (NiCd) batteries, metal hydride batteries, or lead acid batteries. In some embodiments, the battery separator is formed through the mixing of glass fibers (e.g., BX9 fibers as mentioned above), starch, NFC, a latex aqueous acrylic co-polymer emulsion binder, and conditioning agents such as wetting agents, surfactants, dry-strength additives, and wet-strength additives, such as alcohol alkoxylates, copolymers of acrylamide and acrylic acid, polyacrylamide resins, cationic glyoxylated resins, polyamidoamine resins, and polyamine-epichlorohydrin resins. BX9 glass fibers, which are commercially available from Lauscha Fiber International GmbH, are comprised of B-glass (see Table 1 above), and have an average diameter of less than 0.5 microns and a specific surface area between 5-7 $m^2/g$. Those of ordinary skill in the art will recognize that a given sample of the commercially available fibers exhibit a range of diameters. For instance, BX9 fibers have a diameter range of 0.1 microns-10 microns, with the majority of the fiber diameters between 0.1 microns and 1.5 microns. Other glass fibers may be used in the embodiments discussed herein. These fibers may be of different glass chemistries and have unique surface areas, average diameters, and diameter ranges.

Non-fibrous material is usually generated and captured in the commercial production of BX9. These artifacts are typically referred to as "shot." In the case of BX9 fibers, non-fibrous material or shot typically have a diameter greater than 45 microns and are present at 0.5% by weight. Some embodiments, however, can contain shot with a diameter of 25 microns to 45 microns or less than 25 microns.

A slurry or suspension that includes the components above (e.g., glass fibers, binder, and conditioning agent) is loaded onto a mesh screen, drained and/or drawn out with a blade, sprayed, or vacuum formed, to provide a film with a finite thickness. The film advantageously includes other characteristics, such as thermal stability, cumulative pore volume, permeability, and handleability, which are described in greater detail below. The use of the mats in lithium-ion batteries can realize improved performance via specific capacity and charge/discharge rate.

Thermally stable separators, such as those described herein, can mitigate previously described problems due to their enhanced thermal stability. The nature of the fiber, specifically the fine average diameter and relatively high nominal specific surface area, allows for a highly porous material that is advantageous for its use in fuel cells or as a battery separator. The porous nature of the separator allows for the improved transit of ions and other small molecules through the separator making it very advantageous for various energy cells.

Other possible applications of the mat include as a capacitor, a fuel cell membrane, or any other energy storage applications, and any other applications requiring a combination of high temperature stability, electrical insulation, and ionic/liquid permeability.

Exemplary Embodiments

Ultra-Thin Nonwoven Fiber Mat

In certain embodiments, the mat has a thickness of about 10 microns to about 100 microns, has a basis weight of about 1 to about 25 GSM, and primarily includes B-glass fibers (e.g., BX9 glass fibers as mentioned above), RCFs, or polycrystalline wool fibers ("ultra-thin mat"). The fine diameter and high surface area of the BX9 fiber allows for a permeable matrix. Other fibers of different chemistries, diameters, lengths, and nominal surface areas, however, may be used in varying proportions. For example, C-glass fibers may be added at no more than 50% of the mat, at no more than 25% of the mat, or at no more than 10% of the mat. The ultra-thin mat may include varying amounts and chemistries of any one of the binders, synthetic fibers, or conditioning agents, depending on how the ultra-thin mat is produced, as further described below.

In some embodiments, the ultra-thin mat includes a binder such as NFC, acrylic latex, and/or other types of latexes such as polyvinyl alcohols and/or polyvinyl acetates. The binders may be present in the ultra-thin mat up to an amount of about 20 weight percent. Advantageously, the ultra-thin mat can be made through standard papermaking techniques, such as vacuum formation, inclined wire, fourdrinier, doctor blading, spraying, and foaming, and can have a heat stability of up to 650° C. In various embodiments, the ultra-thin mat has an average pore diameter of about 1 to about 3 microns, a cumulative pore volume of about 1 to about 5 $cm^3/g$, a permeability of about 0.01 to about 0.5 Darcy, and a surface area of about 3 to about 10 $m^2/g$.

The ultra-thin mat can be formulated into a nanoporous or mesoporous battery separator or a high-temperature electrical insulator that can be used in various types of batteries, capacitors, and fuel cells, in particular small portable lithium-ion batteries. The inclusion of glass or polycrystalline fibers yields a separator with increased thermal stability during a thermal event in the cell (i.e., runaway or overheating).

According to several embodiments, the ultra-thin mat includes about 90 to about 99 weight percent B-glass fibers, for example BX9 glass fibers, and about 1 to about 10 weight percent dry starch (with no conditioning agent). In certain embodiments, the ultra-thin mat includes about 50 to about 95 weight percent BX9 glass fibers, about 1 to about 20 weight percent dry starch, and about 5 to about 30 weight percent acrylic latex (with no conditioning agent). In various embodiments, the ultra-thin mat includes about 80 to about 99 weight percent BX9 glass fibers and about 1 to about 20 weight percent NFC (with no conditioning agent). In certain embodiments the ultra-thin mat includes about 80 to about 99 weight percent BX9 glass fibers, about 1 to about 20 weight percent NFC, and about 0 to about 10 weight percent of a conditioning agent such as a wetting agent, surfactant, or dry-strength and/or wet-strength additive. In some embodiments, the ultra-thin mat includes about 50 to about 95 weight percent BX9 glass fibers, and about 1 to about 20 weight percent silicone, polyvinyl alcohol, or polyvinyl acetate (with no conditioning agent). In yet other embodiments, the ultra-thin mat includes about 50 to about 95 weight percent BX9 glass fibers, about 5 to about 30 weight percent acrylic latex, and about 1 to about 20 weight percent of a conditioning agent.

Thin Nonwoven Fiber Mat

In certain embodiments, the mat has a thickness of about 200 microns to about 700 microns, has a basis weight of about 30 to about 70 GSM, and includes primarily B-glass fibers, RCFs, or polycrystalline wool fibers ("thin mat"). Other fibers of the same chemistry (B-glass), or different chemistries, diameters, lengths, and surface areas may be used in varying concentrations. For example, C-glass fibers may be added in a small amount (e.g., at no more than 50% of the mat, at no more than 25% of the mat, or, for example, at no more than 10% of the mat). In particular, C-glass fibers of different diameters, lengths, and surface areas may be used.

The thin mat may also include a binder such as NFC, acrylic latex, silicones, and/or other types of latexes such as polyvinyl alcohols, polyvinyl acetates and polyacrylics. These binders may be present in the thin mat in an amount of up to about 20 weight percent. In an exemplary embodiment, the binder is present in an amount of about 1 to about 10 weight percent. In various embodiments, the thin mat has an average pore diameter of about 1 to about 5 microns, a cumulative pore volume of about 1 to about 5 cm$^3$/g, a permeability of about 0.01 to about 0.3 Darcy, and a surface area of about 10 to about 35 m$^2$/g.

Advantageously, the thin mat has a heat stability of up to 650° C., and can be made using standard papermaking techniques. Methodologies such as rotoforming and vacuum forming can be used in the development and production of the thin mat.

Thin mats may also be formulated into battery separators. While similar to the ultra-thin mats used as a battery separator in smaller type or portable lithium-ion batteries described above, a thicker, denser, more robust separator may be required for larger lithium-ion batteries used for grid energy storage. Regardless of thickness or area density, however, the separator should still provide a porous membrane and be resistant to degradation and shrinkage in extreme thermal events. The shrinkage and degradation of the separator in a cell this large could result in a catastrophic and very dangerous event if a short in the battery occurs.

Elimination of non-fibrous material is crucial to the safety and functionality of the thin glass mat. The presence of large shot particles in the fiber slurry during formation of the thin mat may result in critical failures such as pinholes or tears. The resulting defects can cause dangerous failures in the battery cell; therefore, the removal of shot is essential. Large shot particles with a diameter greater than 45 microns should be removed from the slurry. FIG. 1 is an SEM micrograph of representative shot and non-fibrous material separated from BX9 fiber.

In some embodiments, the thin mat includes 100 weight percent B-glass fibers, for example BX9 glass fibers, and no binder. In other embodiments, the thin mat includes about 80 to about 99 weight percent BX9 glass fibers, and about 1 to about 20 weight percent NFC, acrylic latex, polyvinyl alcohol, silicone, and/or polyvinyl acetate. In certain embodiments, the thin mat includes about 50 to about 99 weight percent BX9 glass fibers and about 1 to about 50 weight percent C08 fiber which is commercially available from Lauscha Fiber International GmbH (C-glass chemistry, average diameter less than 1.0 micron, specific surface area 1 to 3 m$^2$/g). Other types of glass fibers formed by rotary, flame attenuation, or any other formation method may be used. These include, for example, B00 (B-glass chemistry, average diameter less than 0.5 micron, specific surface area 3.8 to 5.8 m$^2$/g) and B02 (B-glass, average diameter less than 0.6 micron, specific surface area 2.5 to 4.5 m$^2$/g), both of which are commercially available from Lauscha Fiber International GmbH. These and other types of fibers, including fibers of different chemistries, diameters, morphologies, lengths, and nominal surface areas, however, may be used at an additive level (e.g., at no more than 50% of the mat, at no more than 40% of the mat, at no more than 30% of the mat, at no more than 20% of the mat, or at no more than 10% of the mat).

Mat Properties

Several different papermaking techniques were utilized for production of the mats. Generally, these embodiments include B-glass fibers, for example BX9 glass fibers, NFC, and/or other binders and various blends of other binders. These embodiments were prepared to optimize the wet and dry tensile strength of the mat, the cumulative pore volume and permeability of the mat, and the long-term stability of the mat in the battery. Different properties of the mats were also evaluated.

Thermal Stability. Thermal stability is a metric that is used to determine the maximum operating temperature at which the cell can function without disintegration of the separator. In the name of safety, utilizing a battery separator with a greater thermal stability (higher disintegration temperature) will help mitigate dangerous shorts in a lithium-ion battery when the cell is operating at elevated temperatures. In other words, a separator should be resilient enough to withstand the elevated temperatures of a thermal runaway event to protect the user from any potential hazardous reactions resulting in the anode and cathode material making contact with one another. Shrinkage testing at elevated temperatures (200° C.-600° C.) measured the change in area and area density (GSM). Furthermore, thermal gravimetric analysis (TGA) was performed, up to 650° C., to determine the exact percentage of latex binder, starch, or other organic material in the separator. Additionally, TGA was used to predict binder loss or the presence of an oxidative destruction in a given separator at elevated temperatures by measuring the percent mass loss. These events may result in partial or complete destruction of the separator. As detailed in the examples below, the separators exhibited little physical alteration, including destruction, at temperatures between 200° C.-400° C.

Handleability. Any thin nonwoven mat that includes glass fibers will face the challenge of being produced in large quantities quickly and incorporated into various products, including as energy storage units and battery separators. The mat will need to be robust enough to be handled without tearing. To this end, the handleability was measured qualitatively and quantitatively. The dry tensile strength was quantified by measuring the load applied to the paper prior to break (lbs./in and kg/m$^2$). The ability to handle the mat was judged by removing the mat from the mesh screen easily without tearing and giving a pass or fail description. The area density of each mat was quantified by calculating the GSM.

Pore Diameter, Cumulative Pore Volume, Permeability, and Surface Area. The cumulative pore volume and permeability of the separator can facilitate increased cell capacity. Therefore, a thermally stable battery separator that provides sufficient pore volume of an appropriate diameter to accommodate the constant transit of lithium ions between the anode and the cathode is desired. In this regard, the cumulative pore volume, permeability, and surface/interface topography were characterized. Mercury intrusion porosimetry (MIP) and scanning electron microscopy (SEM) imaging were utilized to analyze these properties qualitatively and quantitatively. MIP allows for the three-dimensional analysis of the pores in a given mat. The analysis yielded values that described the median pore size (micron), surface area (m$^2$/g), and cumulative pore volume (cm$^3$/g). Permeability was expressed in Darcy units. SEM allows for the qualitative observation of the mat's topography in formulations that contain and do not contain latex binders, such as an acrylic latex emulsion, which may be crucial in determining if the topography is negatively impacted by the intercalation of latex.

Charge/Discharge and Cycle Retention. Separator materials were examined for their impact on overall cell capacity at various charge and discharge rates. Cell capacities at rates from C/10 up to 5 C were measured.

It is generally known that lithium-ion cells demonstrate lower capacity at high charge/discharge rates and that lithium ion transfer between electrodes proceeds more completely at lower charge rates, thus allowing a higher capacity to be realized. Practically, this could allow for longer discharge times and faster charge times at a given charge rate or discharge rate. A separator that provides a greater porosity, pore volume and through-pores will allow for enhanced transfer of lithium ions between the electrodes. The improved lithium ion transfer will allow for a higher capacity to be realized at higher rates.

The performance of the separator embodiments can be described using the specific discharge and specific charge capacity of a coin cell prepared with the separator embodiments. C-rate tests were conducted on cells by the following method. Rates are typically referred to as "C" values. A "1 C" charge/discharge rate will charge/discharge the full capacity of a given cell in 1 hour. A charge rate of "2 C" will charge the same cell in 30 minutes. A charge rate of "C/2" will charge the same cell in 2 hours.

After undergoing a formation process, cells began the test in a discharged state. The following C-rate test includes one total cycle, of which the charge and discharge are comprised of attenuating C-rates. The cells were subjected to a single 5 C-rate charge until a voltage of 4.2V was achieved and the energy input to the cell recorded. After a rest, a charge rate of 2 C was applied to the same cell, adding to the partial charge accumulated at the 5 C rate and the additional energy input to the cell was recorded. This was repeated for rates of 1 C, C/2, C/5, and C/10. Following the C/10 charging step, the cell was considered to be fully charged. In this manner, the increment of total charge in mAh/g achieved at each rate was determined.

For discharge capacity, the testing was repeated, but with the cells undergoing discharge. The cell was first subjected to a single cycle at a 5 C-rate discharge until a voltage of 2.5V was achieved and the energy output determined. This same cell then underwent a 2 C discharge and the energy output determined. This was repeated for rates of 1 C, C/2, C/5, and C/10. The cell was considered fully discharged following the C/10 cycle. The examples below are compared against a generic polypropylene separator.

The results are expressed as a ratio of the incremental charge from each rate against the cumulative charge achieved over all rates applied. The graphs shown represent capacity realized at each rate on charge and discharge and were generated by determining the portion of overall capacity achieved at each C-rate.

Cycle life is a parameter that should not be negatively affected by the introduction of an inorganic, stable separator presented in the following embodiments. No components of the separator should result in consumption or absorption of the electrolyte, cause a physical change, layer on the anode/cathode material, or result in any changes to the cell such as swelling, leaking, or contraction during charge/discharge cycles. Although arbitrary, it is generally accepted that a 20% reduction in capacity, 80% of original, is the effective end of the automotive battery cell's life. Typical lithium-ion batteries exhibit a post-formation coulombic efficiency of greater than 99% after the formation cycle. Physical changes in the anode, cathode, electrolyte composition, and integrity can also be monitored by cyclic voltammetry. Changes or features in cyclic voltammetry after many cycles of a cell containing the examples below are indicative of the separator causing an irreversible reaction by interacting with the cell. Significant deviations, in particular, vertical lines observed in the cyclic voltammograms during the course of the experiment are not the result of an irreversible reaction in the coin cell; rather, they are artifacts from instrumentation initiating the experiment. Substantial shifts in the cyclic voltammogram observed after C/3 cycling may be indicative of an irreversible reaction between the separator and remainder of the cell. In short, the cyclic voltammograms collected before and after C/3 cycling should be easily superimposed.

Fiber Index and Shot Content. Fiber index is described as the percentage of fibrous material in the finished ultra-thin or thin mat and non-fibrous particulate. When determining the fiber index of the described examples, the finished mat is pulverized and then placed in water. The fiber is separated from the "shot" using elutriation where the fibrous material is removed from the system and the shot that remains is collected, dried, and weighed. The percent shot of the fibrous mat is then calculated. The fiber index of the finished ultra-thin or thin mat is calculated from the difference from the percent shot.

The following examples are illustrative of the materials and methods discussed above and are not intended to be limiting.

Example 1—Ultra-Thin Mat with Starch

A suspension containing the necessary amounts of BX9 glass fibers and dry starch to form the basis of the ultra-thin mat was formed. First, 0.45 g of BX9 glass fibers was added to 100 g of water at a temperature of 50° C., acidified to a pH of about 3.0 with 10% sulfuric acid ($H_2SO_4$), and blended using a laboratory heavy-duty blender for 2 minutes to disperse the fiber. Next, a solution of 0.25 g of dry starch and 20 g of water at 50° C. was mixed at 1000 RPM using a laboratory stand mixer for 2 minutes or until the starch dissolved. The two components were mixed and suspended in 3 gallons of hot water at 50° C. and acidified to a pH of 3.0 with 10% $H_2SO_4$.

The resulting suspension was then mixed for 5 minutes before the ultra-thin mat was formed using vacuum formation. The suspension was transferred to the reservoir of a sheet mold above a 330 mesh screen and mixed by hand to ensure even distribution of the fibers. The reservoir was allowed to drain, causing the suspension to deposit on the screen and forcing the formation of an ultra-thin mat. The resulting wet film was removed from the sheet mold while on the 330 mesh screen, dried in an oven between 60° C. to 65° C. and removed from the mesh screen.

The dried film was then analyzed for thickness, area density (GSM), loss on ignition (LOI) (via TGA), shrinkage, MIP (median pore size, surface area, and cumulative pore volume), permeability, SEM imaging, specific discharge capacity, and tensile strength. Those results are shown and described in the tables and accompanying figures below.

Figure 2A:
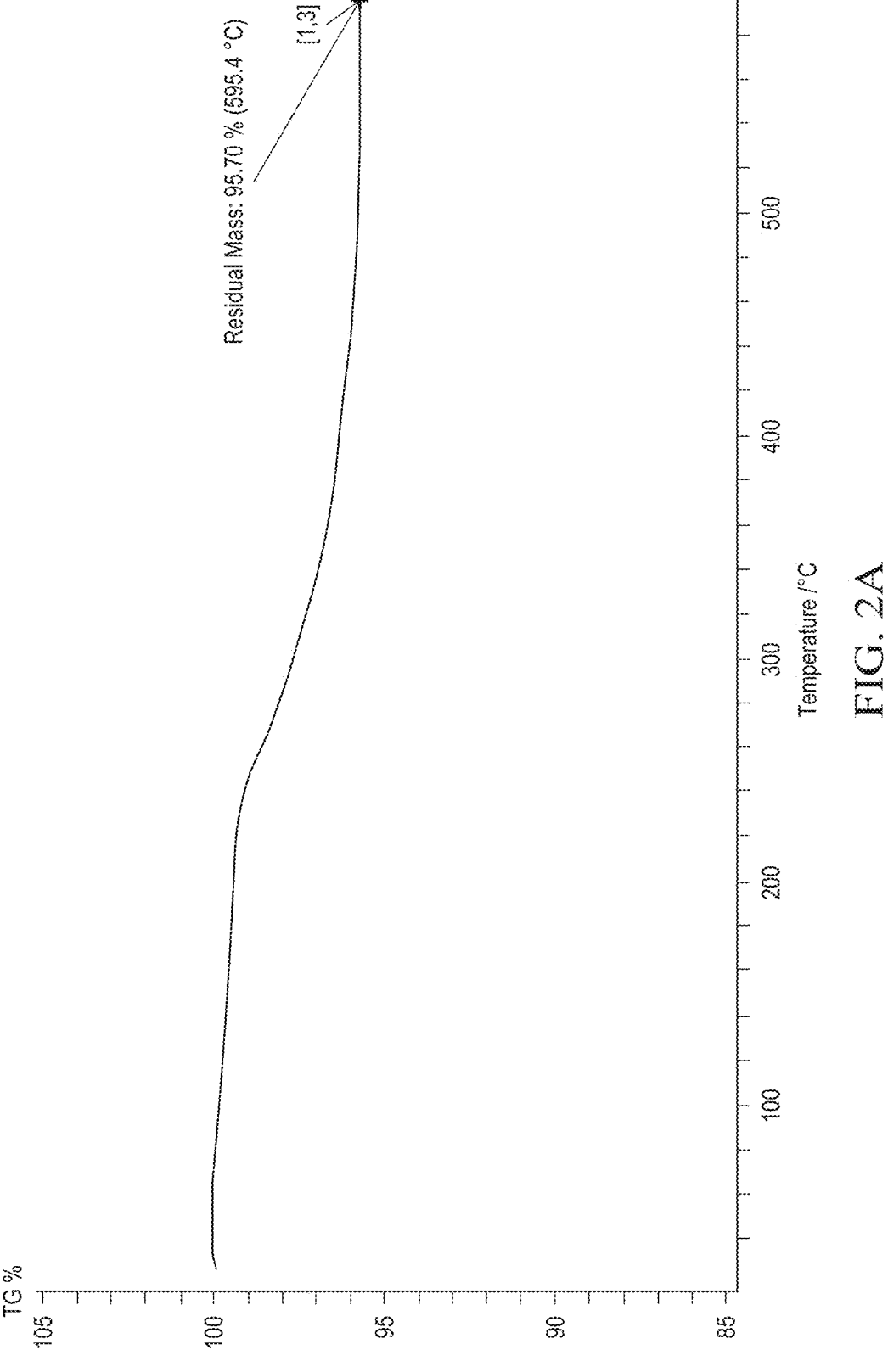
FIGS. 2A and 2B illustrate the loss on ignition of the ultra-thin mat of Example 1 and the comparison to a standard Celgard® 2325 separator, respectively, according to embodiments of the present disclosure.
Figure 2B:
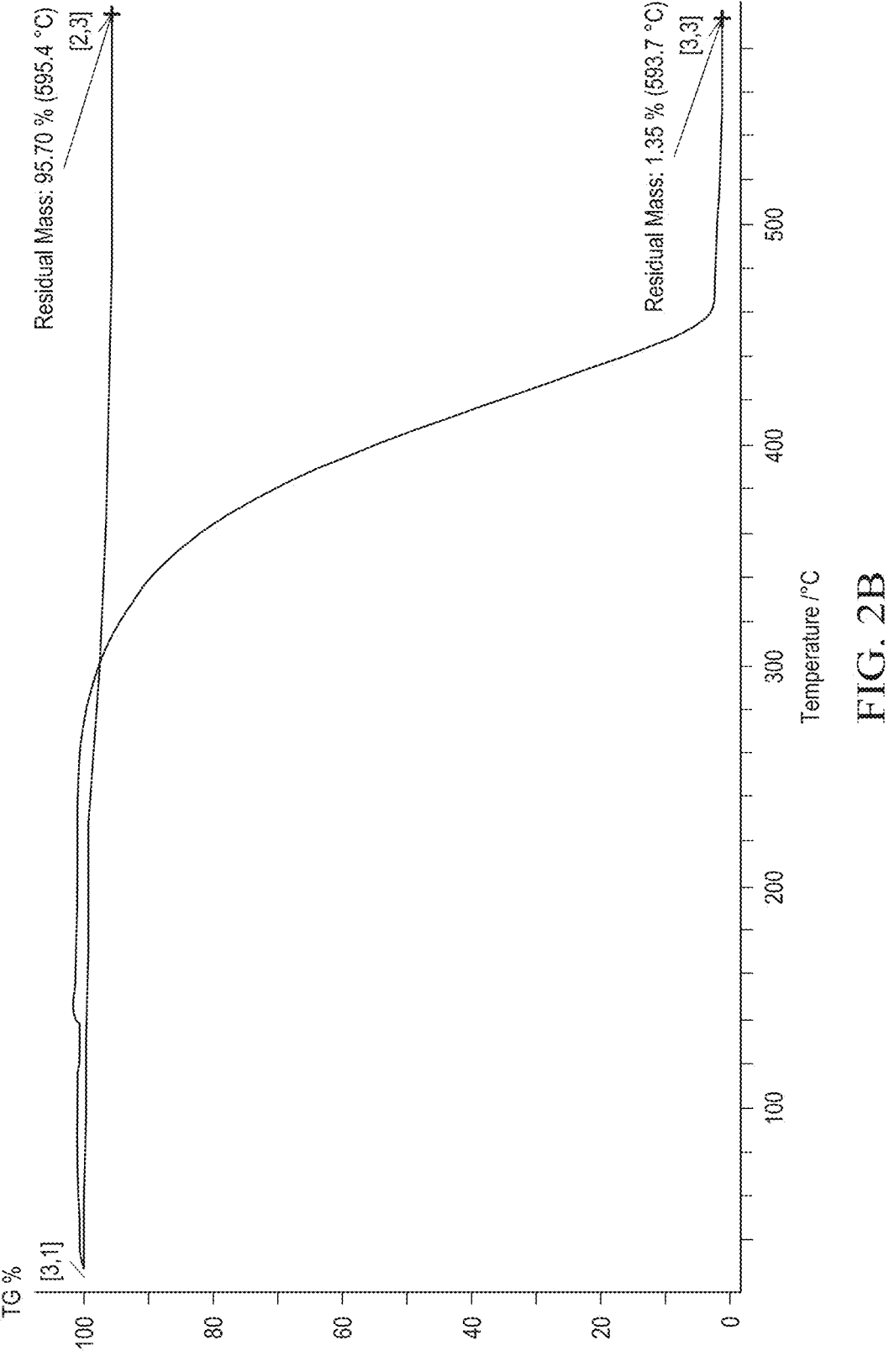

FIGS. 2A and 2B illustrate the LOI for the film and a comparison to a standard Celgard® 2325 separator. Utilizing glass fibers in a vacuum-formed ultra-thin mat increased thermal stability of the resulting battery separator by at least 20-fold, as measured by LOI at temperatures nearing 600° C. compared to that of the standard Celgard® 2325 separator that rapidly disintegrated at temperatures above 250° C. (99.5% to 4.3%). In this instance, it is apparent that the Celgard® 2325 separator oxidizes (burns) at temperatures near 600° C. and the ultra-thin mat does not.

Figure 3A:
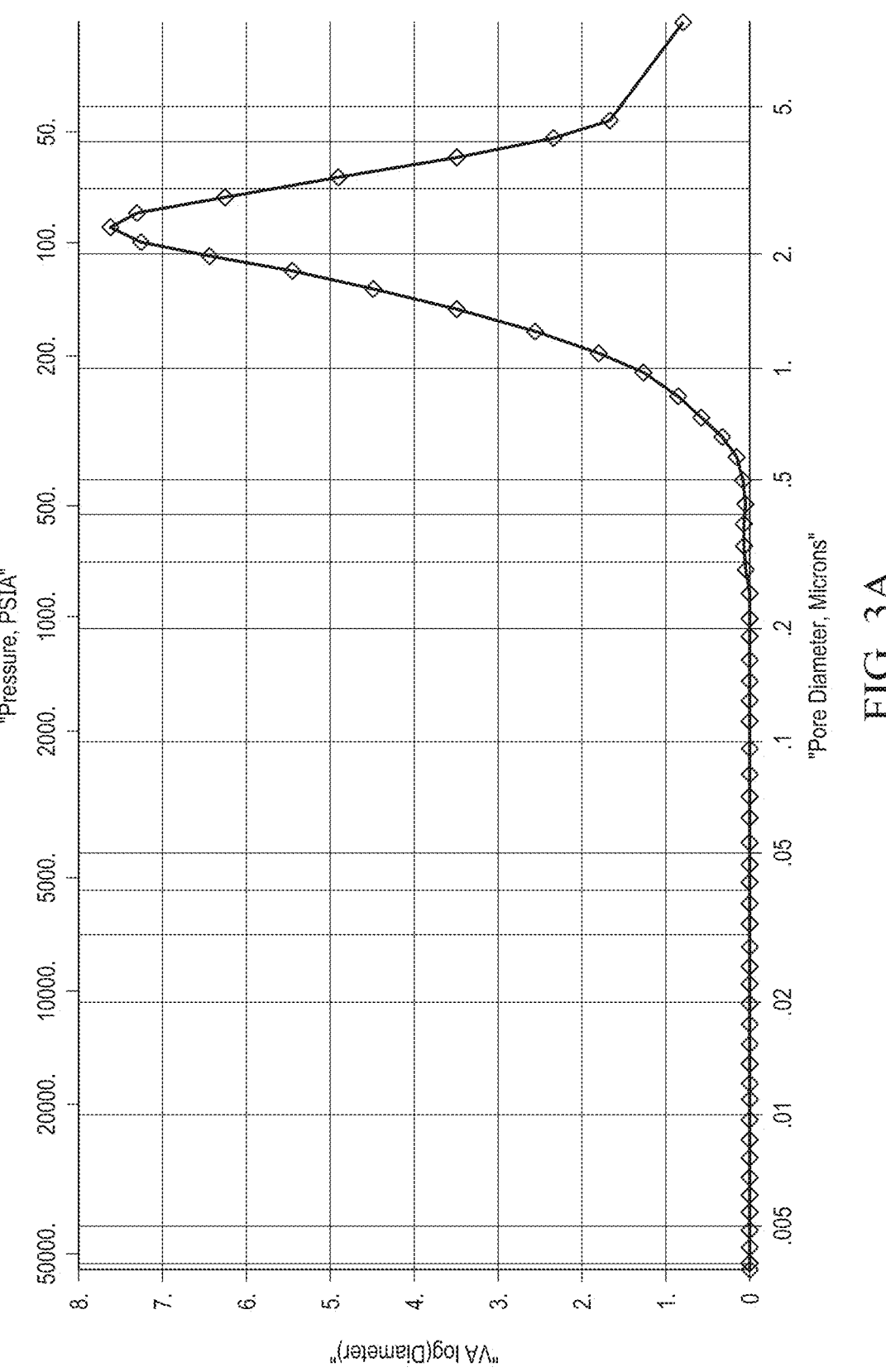
FIGS. 3A, 3B, and 3C illustrate the median pore size, cumulative pore volume, and surface area, respectively, of the ultra-thin mat of Example 1, according to embodiments of the present disclosure.
Figure 3B:
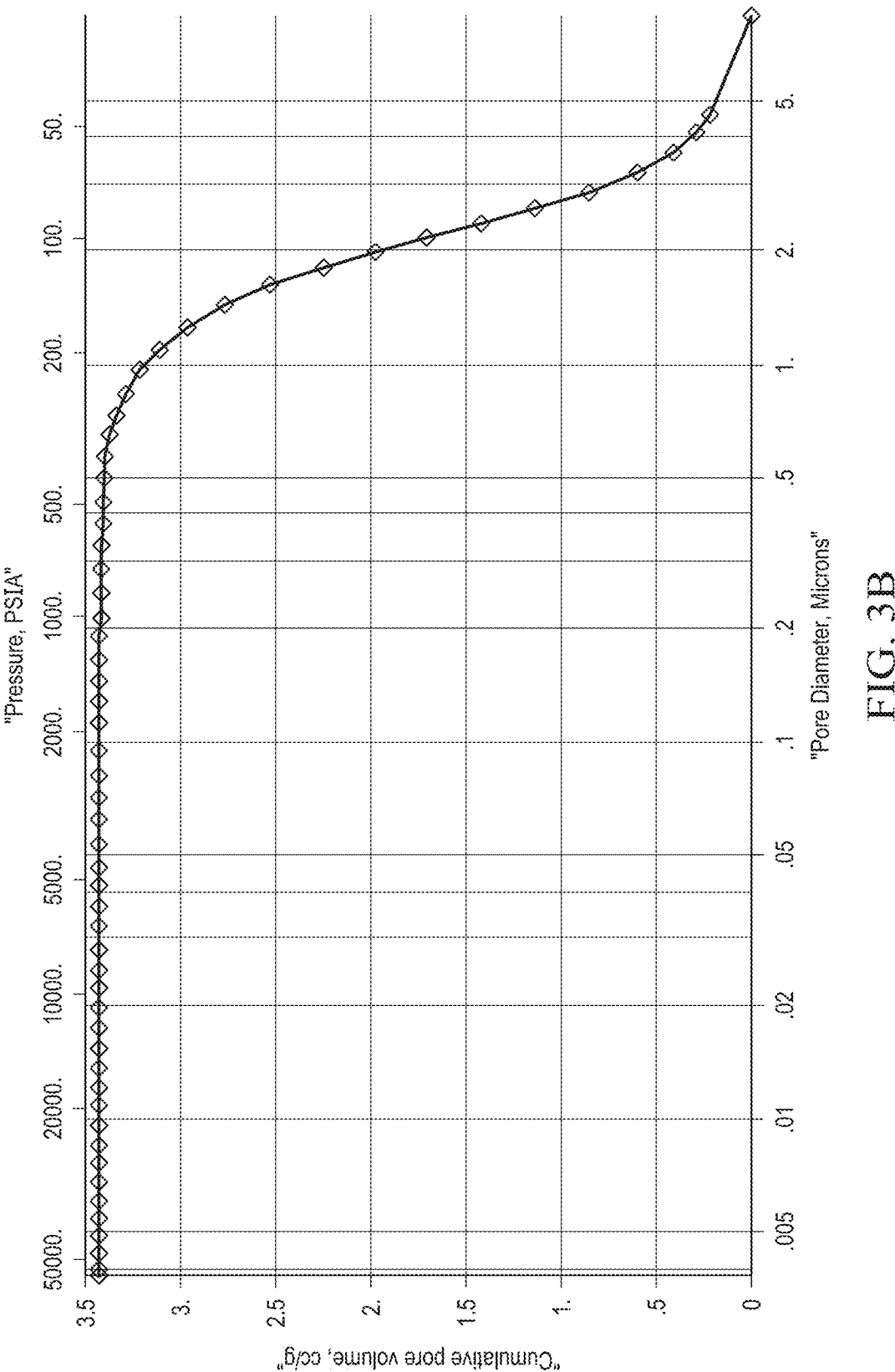
Figure 3C:
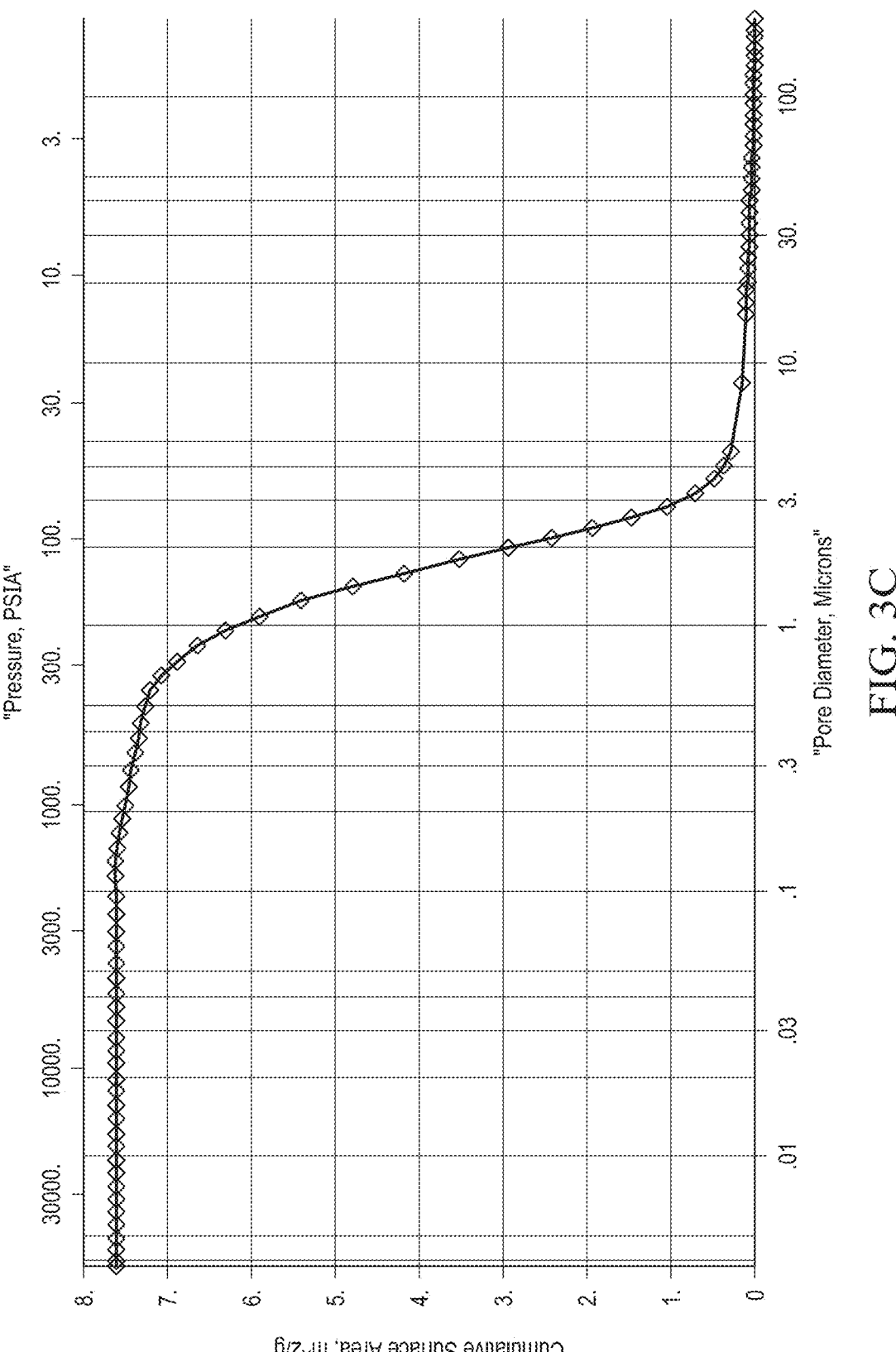
Figure 4A:
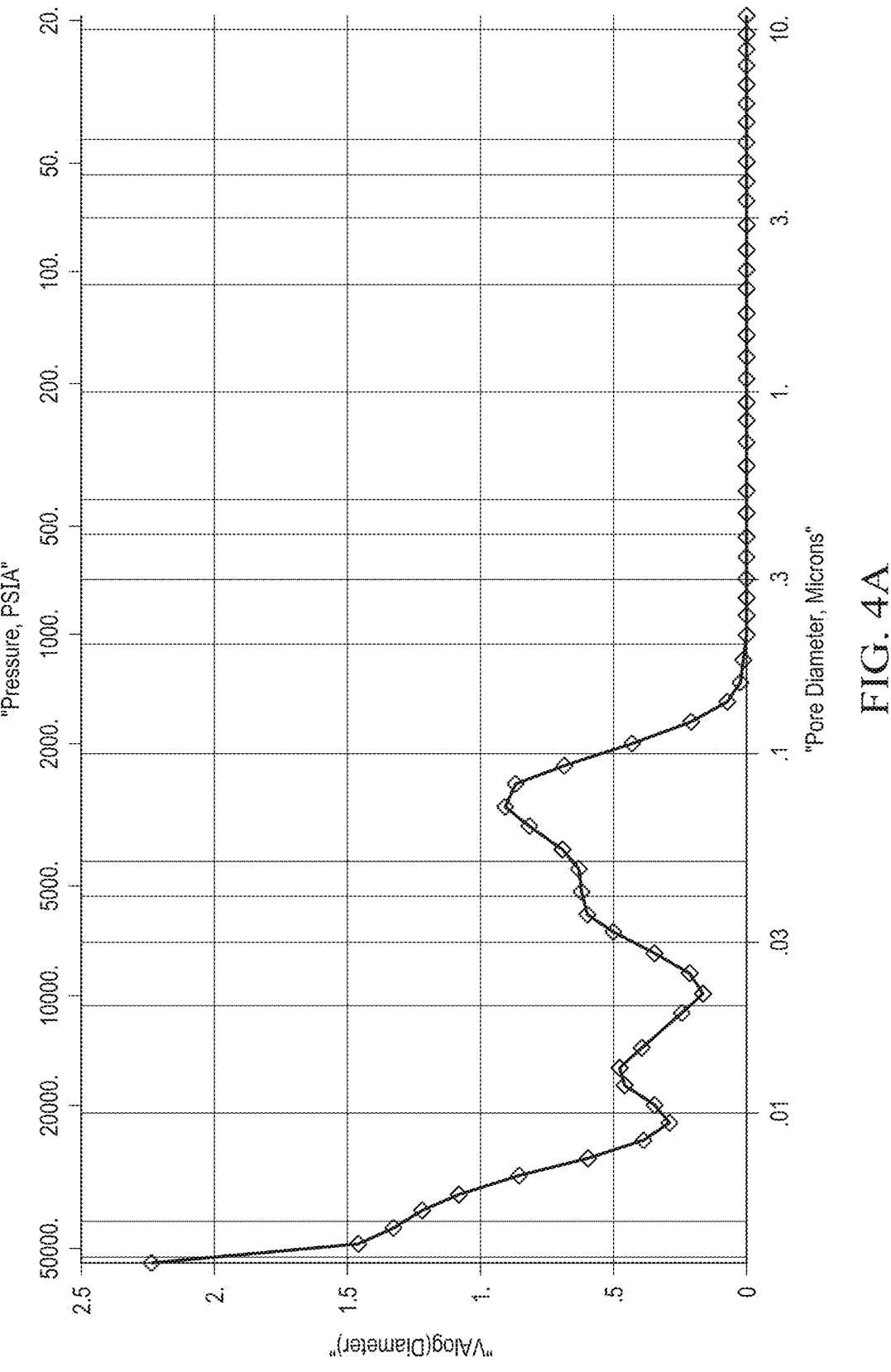
FIGS. 4A and 4B illustrate the median pore size and cumulative pore volume of a standard Celgard® 2325 separator, respectively.
Figure 4B:
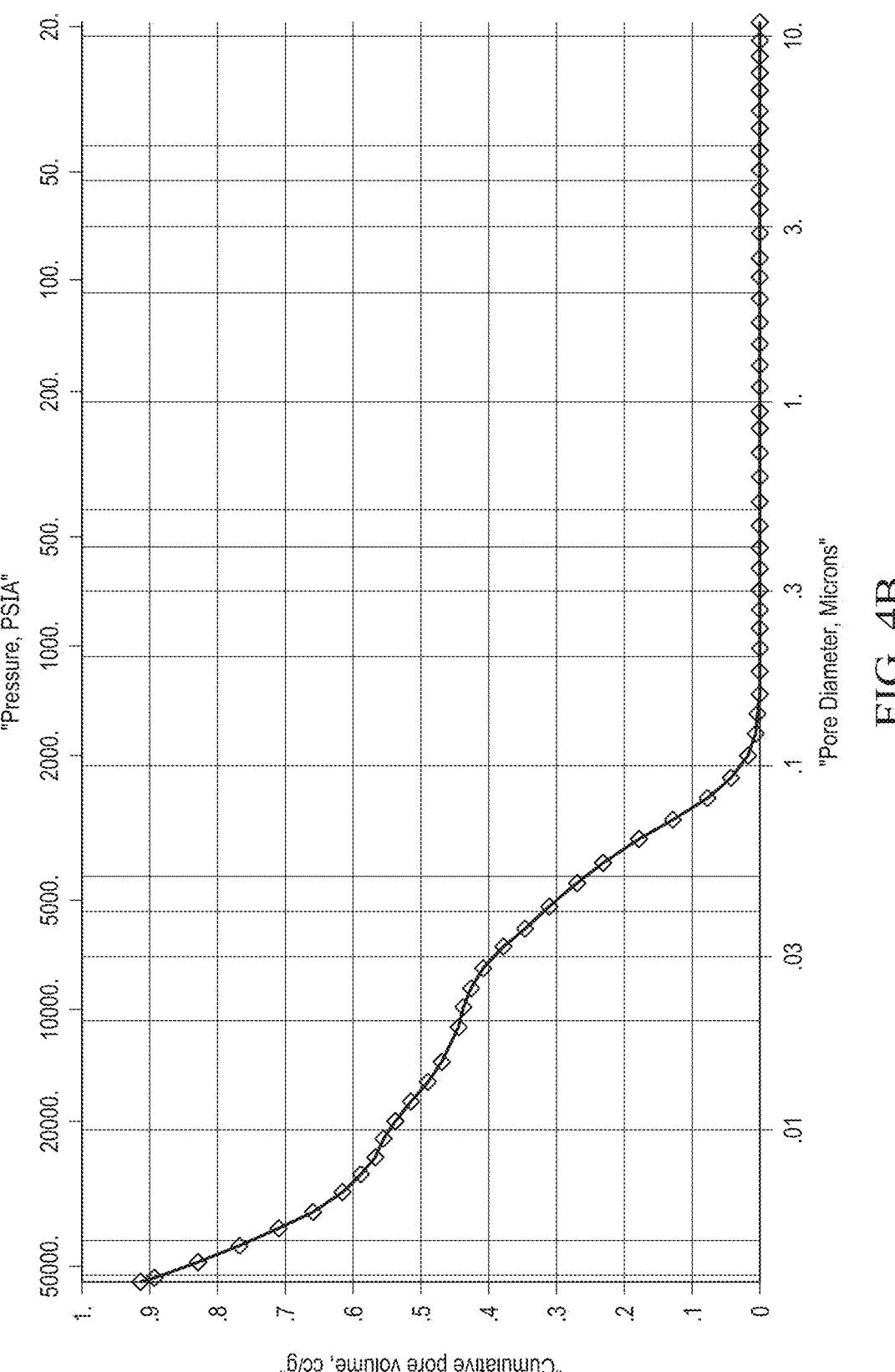

FIG. 3A illustrates the median pore size of the dried film, and FIG. 3B illustrates the cumulative pore volume of the dried film. FIG. 3C illustrates the surface area of the dried film. FIG. 4A illustrates the median pore size of the standard Celgard® 2325 separator and FIG. 4B illustrates the cumulative pore volume of the standard Celgard® 2325 separator. Intertwining BX9 fibers together yielded a separator with a >175-fold increase in median pore size, compared to the standard Celgard® 2325 separator.

Coin cells were produced utilizing the dried film and the standard Celgard® 2325 separator as a control. Cathodes consisted of commercially available cathode active material $LiNi_{0.5}Co_{0.2}Mn_{0.3}O_2$ (NCM523) on an aluminum current collector foil, and anodes were constructed using anode active material (Hitachi MagE3 graphite) on copper current collector foil. The electrolyte was 1.2M lithium hexafluorophosphate ($LiPF_6$) in 3:7 EC (ethylene carbonate):EMC (ethyl methyl carbonate).

Figure 5:
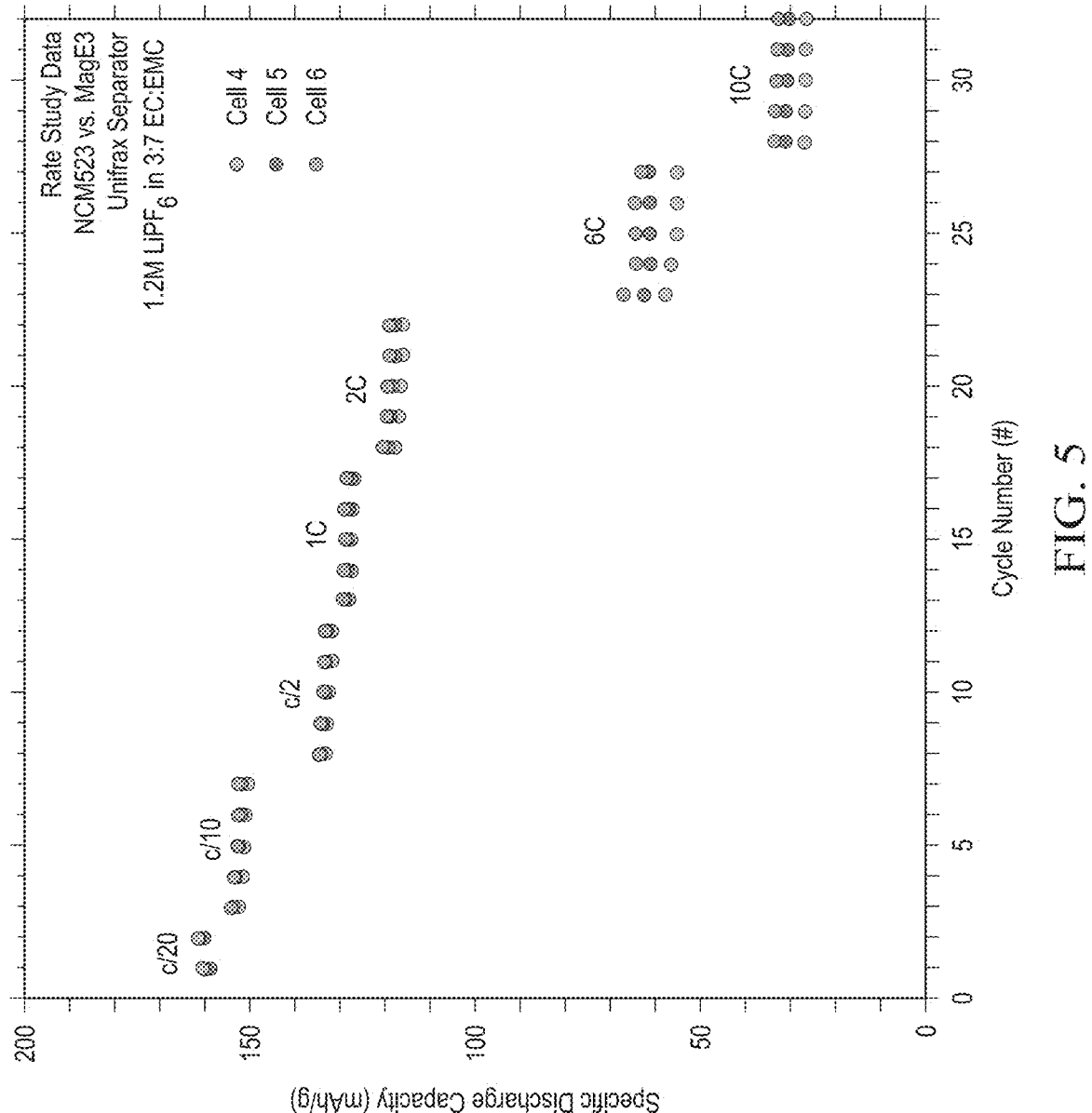
FIG. 5 illustrates the capacity performance at different discharge rates of the ultra-thin mat of Example 1 according to embodiments of the present disclosure.

FIG. 5 illustrates the capacity performance of the dried film at different discharge rates. While not wishing to be bound by theory, the observed increase in specific capacity of the ultra-thin mat over the standard Celgard® 2325 separator at high discharge rates may be attributed to more rapid transport of lithium ions through the ultra-thin mat material.

Table 2 summarizes the results of testing the dried film of Example 1.

TABLE 2

RESULTS OF EXAMPLE 1

| Characteristic | Result | |
| | Ultra-Thin Mat | Standard |
| --- | --- | --- |
| Handleability (Pass/Fail) | Pass | ND |
| Thickness (μm) | 20 | 25 |
| Area Density - GSM | 4.8 | 15 |
| Loss on Ignition by TGA (%) | 4.3 | 99.5 |
| Average Pore Diameter (μm) | 1.8 | 0.0106 |
| Pore Volume (cm³/g) | 3.4 | 0.9 |
| Permeability (Darcy) | 0.121 | 0.00014 |
| Tensile Strength (kg/cm²) | 20 | 150-1700 |
| Surface Area (m²/g) | 7.47 | ND |
| Capacity Performance at Discharge Rates (mAh/g) | | |
| C/20 | 160 | 160 |
| C/10 | 150 | 145 |
| C/2 | 135 | 130 |
| C | 130 | 110 |
| 2C | 120 | 85 |
| 6C | 65 | 25 |
| 10C | 30 | 10 |

ND = Not determined

Example 2—Ultra-Thin Mat with Starch

Using a laboratory stand mixer, 0.16 g of dry starch in 500 mL of hot water (50° C.) at an acidic pH (between 2.8 and 3.5) was mixed. Then, 0.19 g of BX9 glass fibers was added and pre-mixed for 5 minutes to form a slurry. The slurry was then placed in a laboratory blender and blended for 1 minute. The sides of the blender were rinsed and an additional 500 mL of water (acidified to a pH between 2.8-3.5 with 10% $H_2SO_4$) was added to the blender and blended for an additional minute.

The surface of a tight 450 mesh, metal screen was wetted with water, and the slurry from the blender was poured evenly onto the screen and allowed to gravity drain completely without vacuum, and a film was formed.

The mat was dried in an oven at a temperature 60° C. for 5-15 minutes or to dryness, removed from the oven, and allowed to cool. The resulting dried mat was gently removed from the screen.

Coin cells were produced utilizing the following common commercially-available components, substances, and conditions: cathodes consisted of a mixture of: 94 wt % cathode active material $LiNi_{0.5}Co_{0.2}Mn_{0.3}O_2$ (NCM523), 2.5% conductive additive (C65 conductive carbon black), and 3.5 wt % polyvinylidene fluoride (PVDF) binder (HSV 1800 PVDF) on an aluminum current collector foil (area: 1.77 cm²), and anodes were constructed using a mixture of 94% anode active material (graphite), 2.5% conductive additive (C65 conductive carbon black), and 3.5% PVDF binder (HSV 900 PVDF) on copper current collector foil (area: 2.01 cm²). The electrolyte was 1.0M lithium hexafluorophosphate ($LiPF_6$) in 3:7 EC (ethylene carbonate):EMC (ethyl methyl carbonate). Cells were housed in 2032 coin cell casings from Hohsen Corp. The cell utilized separators formed from the dried mat. The separators were dried in a vacuum oven at 130° C. for 12 hours prior to use. A generic polypropylene (PP) separator was used as a control.

Figure 6A:
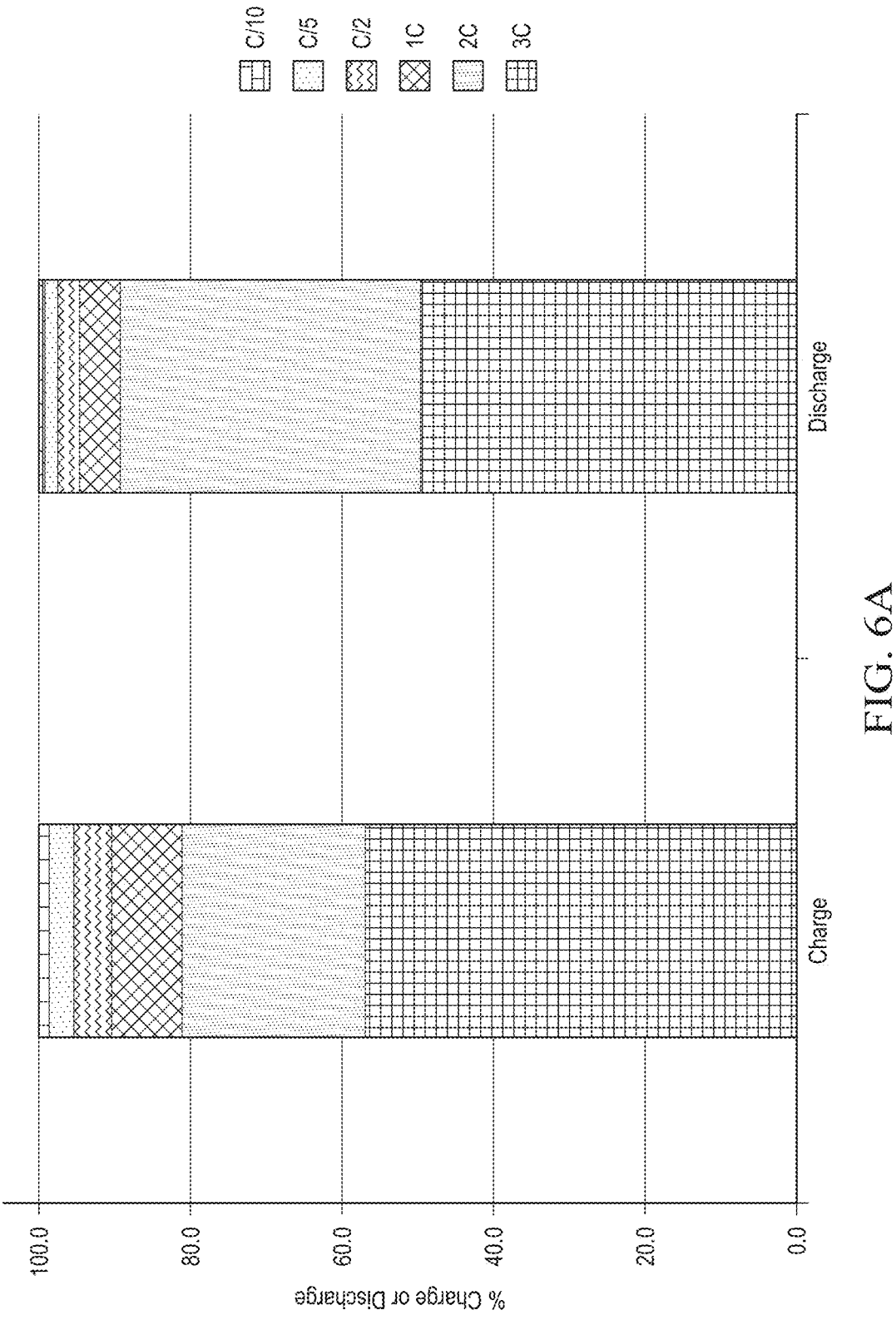
FIG. 6A illustrates the % charge and % discharge at different rates of a cell prepared with the ultra-thin mat of Example 2 according to embodiments of the present disclosure.
Figure 6B:
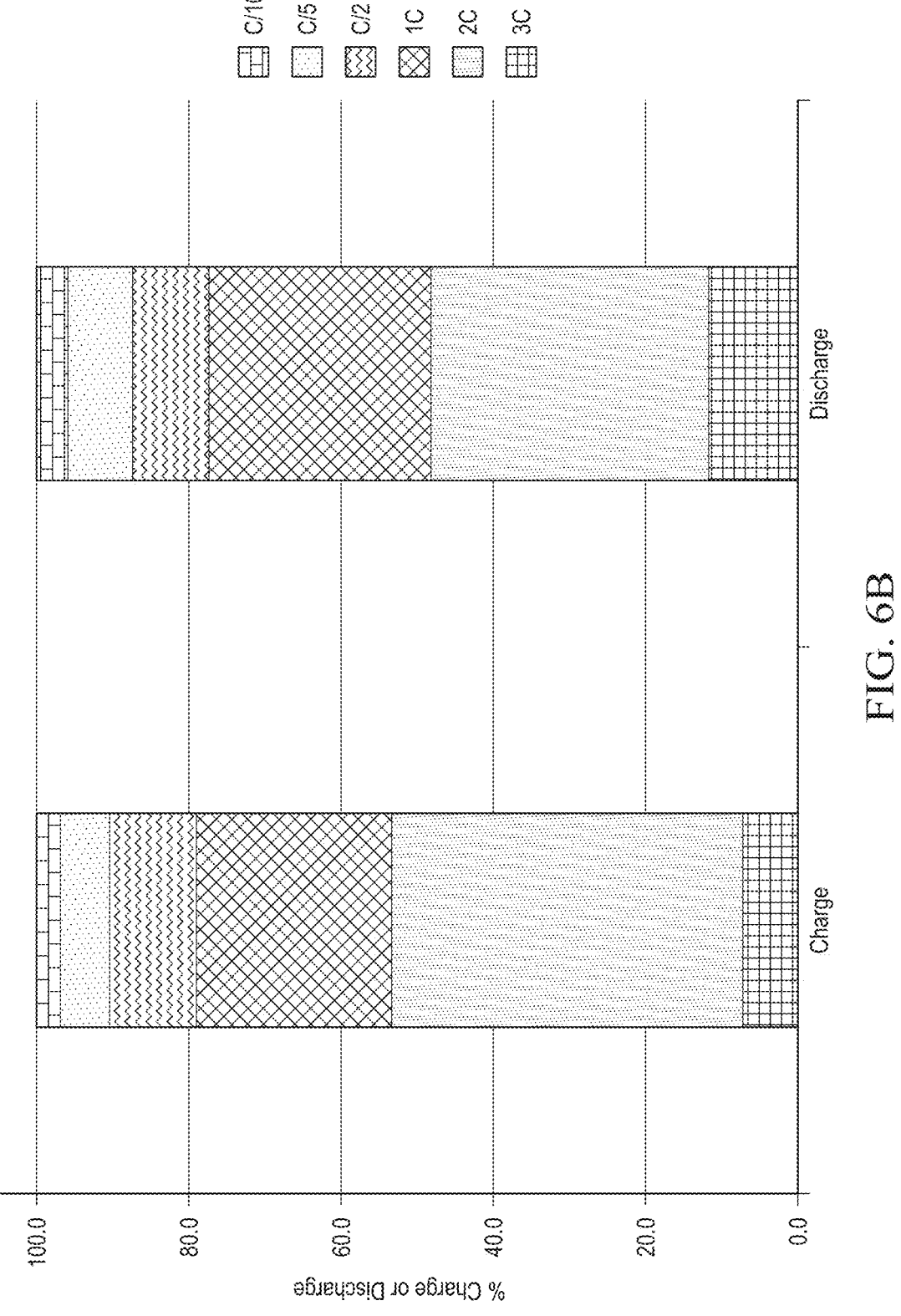
FIG. 6B illustrates the % charge and % discharge at different rates of a cell prepared with a generic polypropylene separator.

FIGS. 6A and 6B illustrate the percent charge and discharge (as a function of specific capacity) using the separator of Example 2 (FIG. 6A) and a generic PP separator (FIG. 6B) as the cell containing those separators experiences a single cycle of the discharge and charge rates of: C/10, C/5, C/2, 1C, 2 C, and 5 C. The percentages presented in Table 3 below describe the amount of charge or discharge capacity that is realized after a single cycle at the described discharge and charge rate. The separator of Example 2 exhibits exemplary specific charge and discharge capacity at high charge and discharge rates compared to the generic PP separator demonstrating that the coin cell prepared with the separator of Example 2 would be able to provide more capacity at high charge and discharge rates, yielding a longer run time at all discharge rates and faster charge times at all charging rates.

Figure 7A:
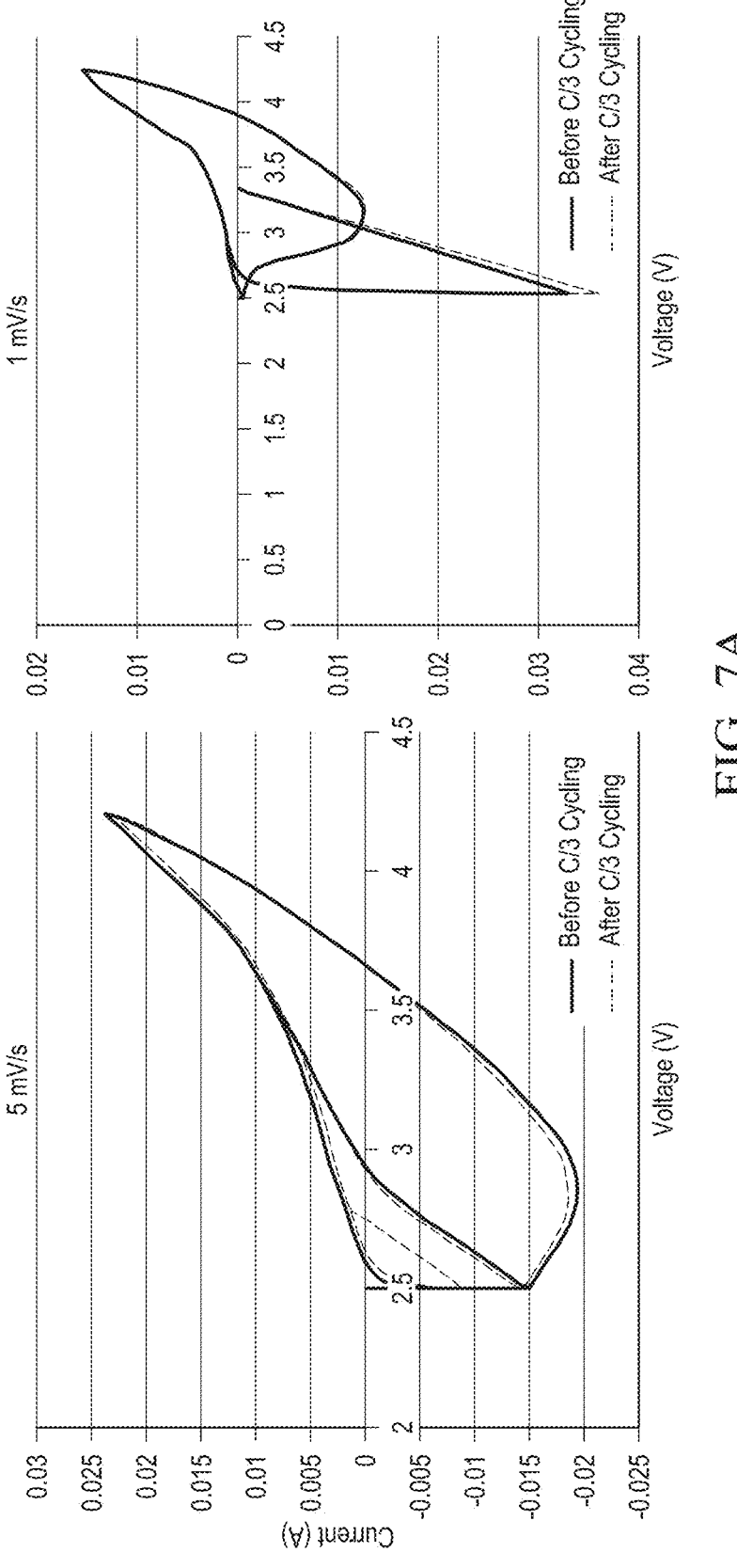
FIG. 7A illustrates the cyclic voltammetry before and after charge and discharge cycling at C/3 of a cell prepared with the ultra-thin mat of Example 2 according to embodiments of the present disclosure.
Figure 7B:
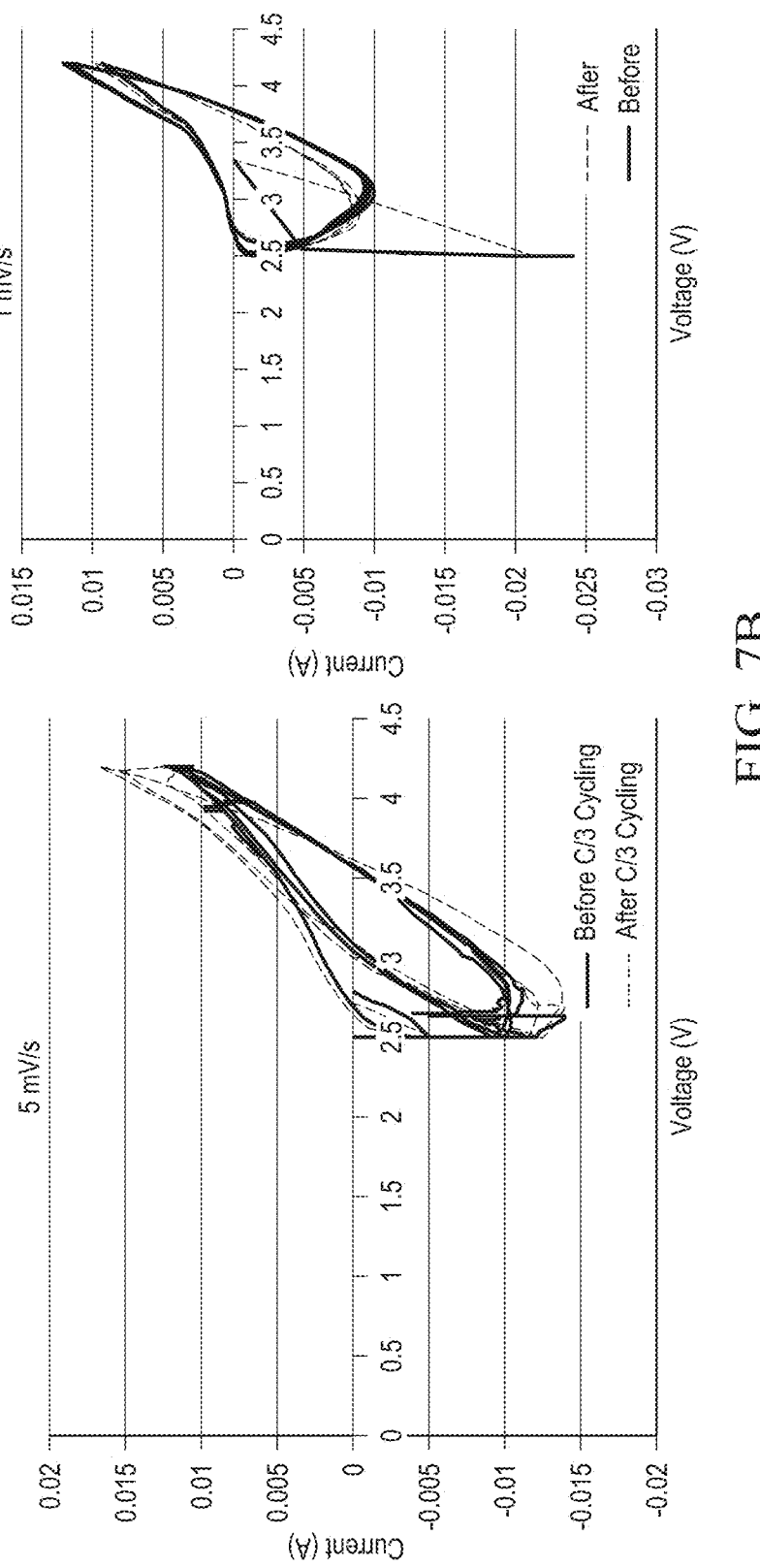
FIG. 7B illustrates the cyclic voltammetry before and after charge and discharge cycling at C/3 of a cell prepared with a generic polypropylene separator.

The coulombic efficiency of cells containing the separator of Example 2 and the generic PP separator is calculated as a percent of the specific discharge capacity over the specific charge capacity at a rate of C/3. Those results are shown and described in Table 3 below. Cyclic voltammetry was performed before and after the cycling at C/3. FIGS. 7A and 7B demonstrate the stability of the mat in a coin cell before and after repeated cycling at a rate of C/3 of the separator of Example 2 and the generic PP separator, respectively. An identical or similar cyclic voltammogram observed before and after 15 cycles at a discharge rate of C/3 indicates stable cell cycling. In other words, a similar cyclic voltammogram suggests that irreversible reactions are not occurring during cycling and that the separator, and its individual components, is stable during cycling. In the case of the separator of Example 2, the cyclic voltammogram after cycling at C/3 is nearly identical compared to the generic PP separator, which exhibits more significant deviations. Less significant deviations to the cyclic voltammogram of the separator of Example 2 suggests greater stability in the coin cell preparations described than the generic PP separator.

Figure 8:
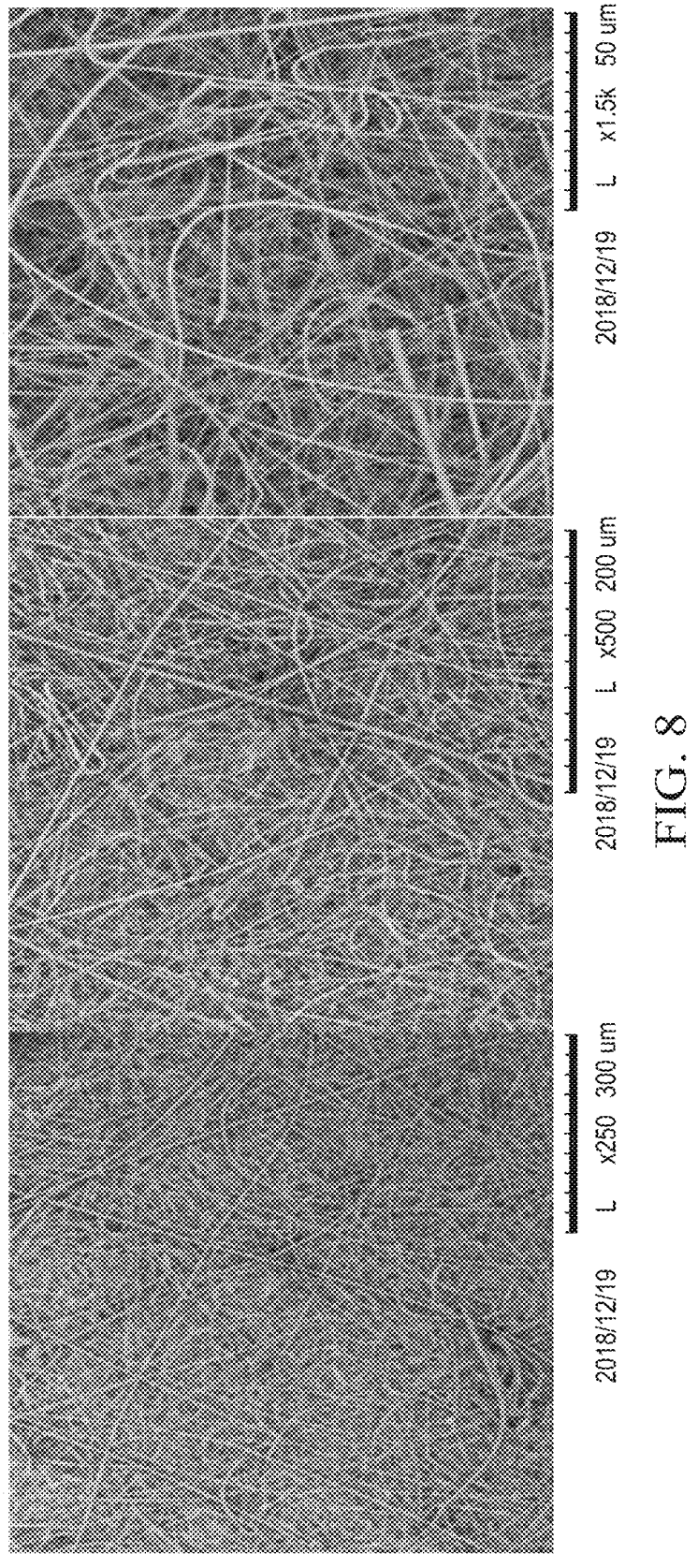
FIG. 8 illustrates SEM micrographs of the ultra-thin mat of Example 2 according to embodiments of the present disclosure.

FIG. 8 displays representative SEM micrographs of the dried film of the separator of Example 2, showing the intertwining of the BX9 fibers. SEM allows for the quali-
tative analysis of the pore matrix and space available for
lithium ion transport between the anode and cathode.

Table 3 summarizes the results of testing the dried film of
Example 2.

TABLE 3

RESULTS OF EXAMPLE 2

| Characteristic | Result | |
| --- | --- | --- |
| | Ultra-Thin Mat | Standard |
| % Cumulative Charge | | |
| 5C | 57.0 | 7.3 |
| 2C | 81.3 | 53.8 |
| 1C | 90.6 | 79.3 |
| C/2 | 95.5 | 90.7 |
| C/5 | 98.6 | 97.2 |
| C/10 | 100.0 | 100.0 |
| % Cumulative Discharge | | |
| 5C | 49.9 | 11.5 |
| 2C | 89.6 | 48.5 |
| 1C | 95.0 | 77.7 |
| C/2 | 97.7 | 87.8 |
| C/5 | 99.4 | 96.3 |
| C/10 | 100.0 | 100.0 |
| Average Discharge Capacity at C/3 (mAh/g) | 132.3 | 121.2 |
| Average Charge Capacity at C/3 (mAh/g) | 132.9 | 122.5 |
| Average Coulombic Efficiency at C/3 | 99.6% | 98.9% |
| Cyclic Voltammetry (Pass/Fail) | Pass | Pass* |

Pass* = Pass with some minor differences

Example 3—Ultra-Thin Mat with Starch and Acrylic Latex

First, 5.0 g of acrylic latex emulsion, 1.6 g of dry starch,
and 0.12 g of hydroxyethyl cellulose thickener was mixed
using a laboratory stand mixer with 140 g of water at a
temperature of 50° C. This mixture was acidified to pH 3.0
with 10% $H_2SO_4$. This was mixed using a stand mixer for 10
minutes at 600 RPM. Then, 5.0 g of BX9 glass fibers was
slowly mixed in along with an additional 80 g of water. Once
the fiber was added, the slurry was mixed for 10 minutes to
ensure homogeneity; the speed of the mixer was adjusted as
needed. Next, 19.9 g of the slurry was added to 1 gallon of
water in a 4 gallon tank and mixed for 10 minutes. The
mixture was diluted to 3 gallons of water (50° C.) and
acidified to a pH of 3.0 with 10% $H_2SO_4$, and mixed for 5
minutes before the mat was formed using vacuum forma-
tion.

The suspension was then transferred to the reservoir of a
sheet mold above a 330 mesh screen and stirred by hand to
ensure even distribution of the fibers. The reservoir was
allowed to drain, causing the suspension to deposit on the
screen and forcing the formation of an ultra-thin mat. The
resulting wet film was removed from the sheet mold while
on the 330 mesh screen, dried in an oven between 60° C. to
65° C. and the dried mat removed from the mesh screen.

Figure 9:
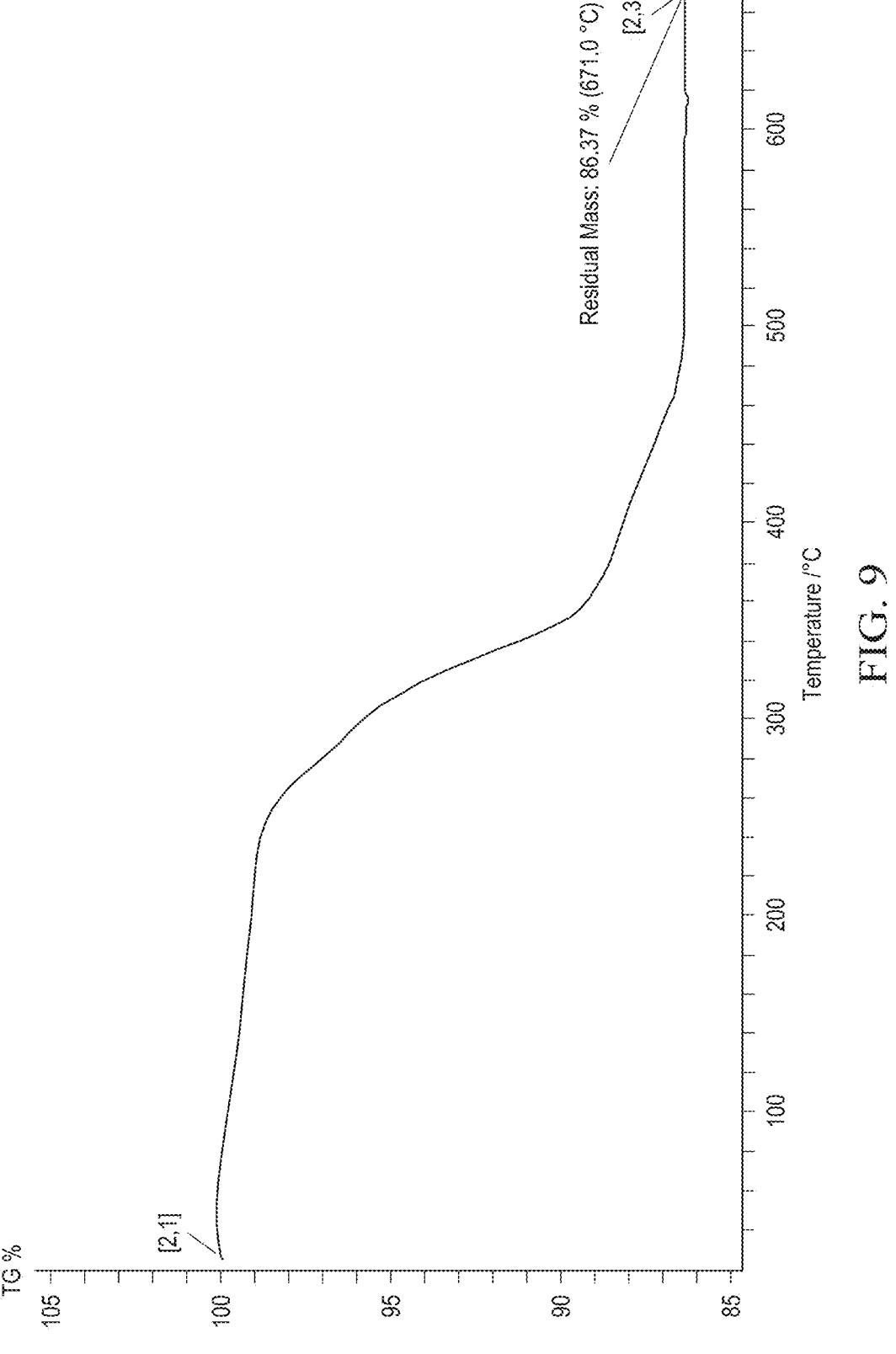
FIG. 9 illustrates the loss on ignition of the ultra-thin mat of Example 3 according to embodiments of the present disclosure.
Figure 10A:
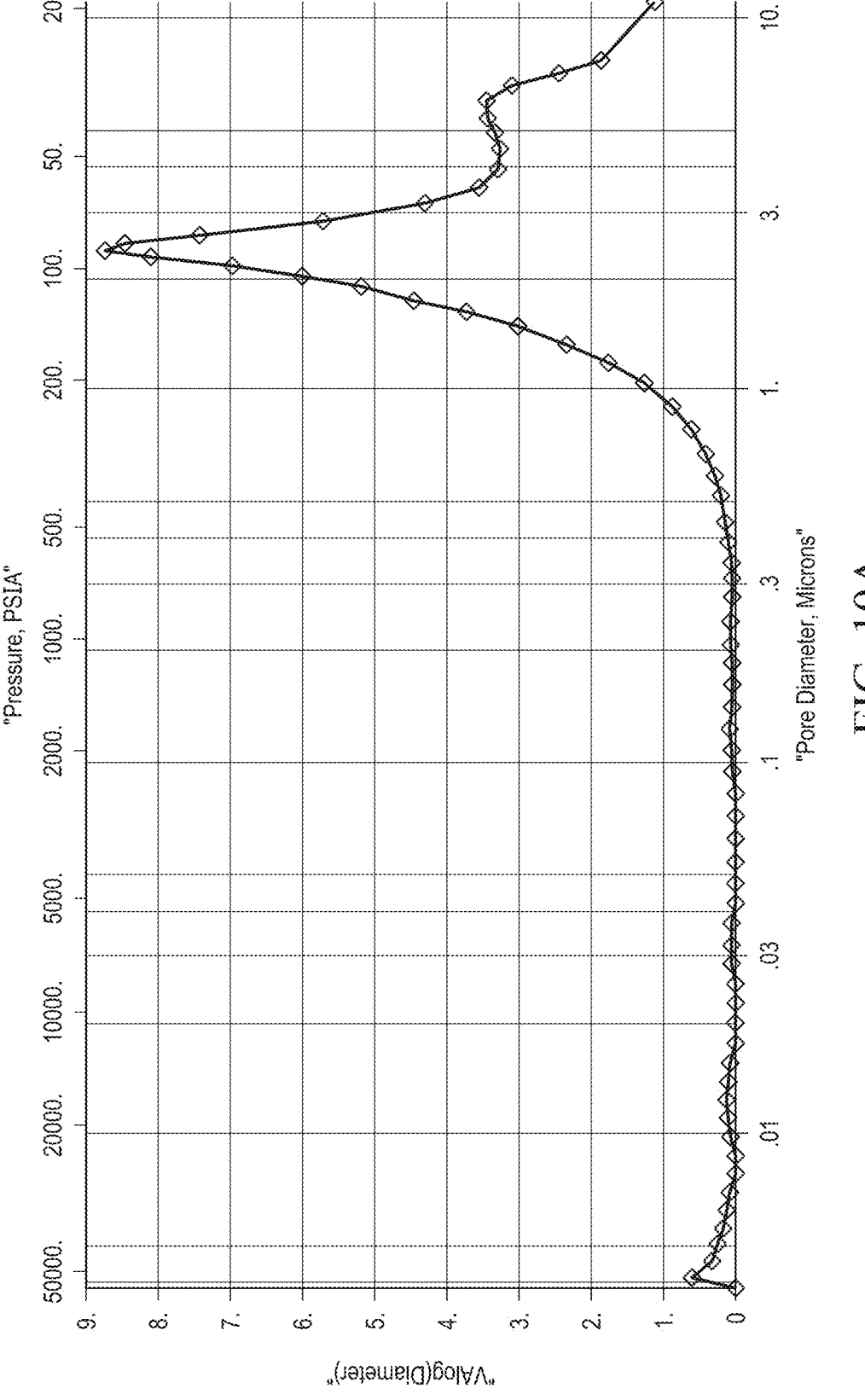
FIGS. 10A, 10B, and 10C illustrate the median pore size, cumulative pore volume, and surface area, respectively, of the ultra-thin mat of Example 3, according to embodiments of the present disclosure.
Figure 10B:
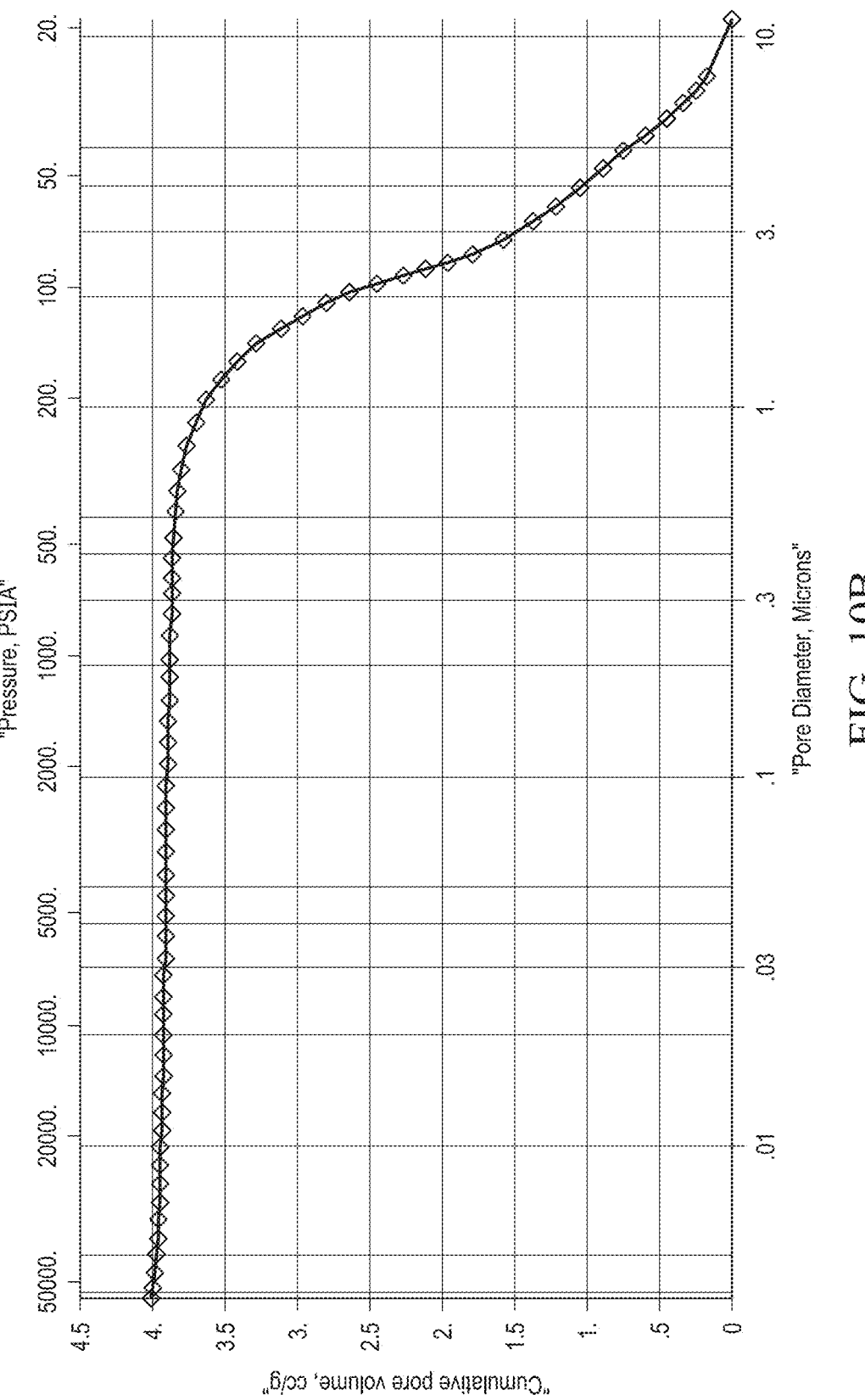
Figure 10C:
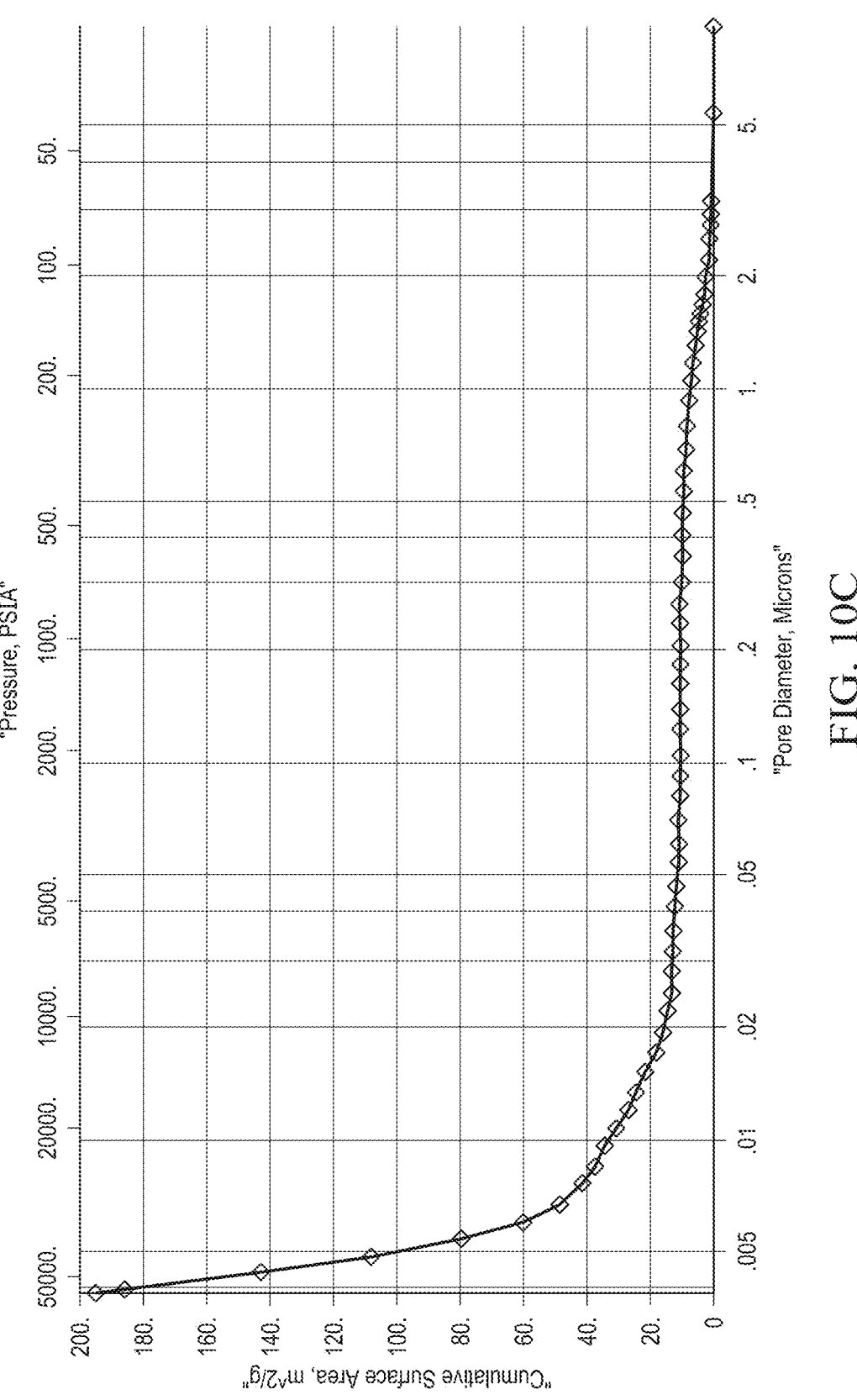

TGA gave an understanding of how much organic mate-
rial could be afforded to the separator while conserving the
inorganic nature of the separator. Additionally, this analysis
provided information regarding the quantities of starch,
acrylic latex emulsion, and BX9 glass fibers that were
retained during the vacuum formation. Any change in pore diameter and deposition of the acrylic latex emulsion into
the pores formed by the matrix of glass fiber was monitored
by SEM. Cumulative pore volume, pore diameter, and
permeability were determined at this time. Tensile strength
experiments determined the effective change in tensile
strength with the introduction of the organic components.
The results from the TGA and the tensile strength experi-
mentation, shown in Table 4 below, were used together to
determine the ideal levels of starch, latex binder, and other
agents. As done in Example 1, the results from Example 3
were compared to the standard Celgard® 2325 separator.
The results are shown in Table 4 below. FIG. 9 illustrates the
LOI (via TGA) of the mat of Example 3, FIG. 10A shows the
median pore size, FIG. 10B shows the cumulative pore
volume, and FIG. 10C shows the surface area.

TABLE 4

RESULTS OF EXAMPLE 3

| Characteristic | Result | |
| --- | --- | --- |
| | Ultra-Thin Mat | Standard |
| Handleability (Pass/Fail) | Pass | ND |
| Thickness (μm) | 22 | 25 |
| Area Density - GSM | 6.1 | 15 |
| Loss on Ignition by TGA (%) | 13.7 | 99.5 |
| Average Pore Diameter (μm) | 1.3 | 0.0106 |
| Pore Volume ($cm^3$/g) | 1.2 | 0.9 |
| Permeability (Darcy) | 0.024 | 0.00014 |
| Tensile Strength (kg/$cm^2$) | 29 | 150-1700 |
| Surface Area ($m^2$/g) | 3.84 | ND |

ND = Not determined

Coin cells were produced utilizing the following common
commercially-available components, substances, and con-
ditions: cathodes consisted of a mixture of: 94 wt % cathode
active material $LiNi_{0.5}Co_{0.2}Mn_{0.3}O_2$ (NCM523), 2.5% con-
ductive additive (C65 conductive carbon black), and 3.5 wt
% polyvinylidene fluoride (PVDF) binder (HSV 1800
PVDF) on an aluminum current collector foil (area: 1.77
$cm^2$), and anodes were constructed using a mixture of 94%
anode active material (graphite), 2.5% conductive additive
(C65 conductive carbon black), and 3.5% PVDF binder
(HSV 900 PVDF) on copper current collector foil (area: 2.01
$cm^2$). The electrolyte was 1.0M lithium hexafluorophos-
phate ($LiPF_6$) in 3:7 EC (ethylene carbonate):EMC (ethyl
methyl carbonate). Cells were housed in 2032 coin cell
casings from Hohsen Corp. The cell utilized separators
formed from the dried mat. The separators were dried in a
vacuum oven at 130° C. for 12 hours prior to use. A generic
polypropylene (PP) separator was used as a control.

Figure 11:
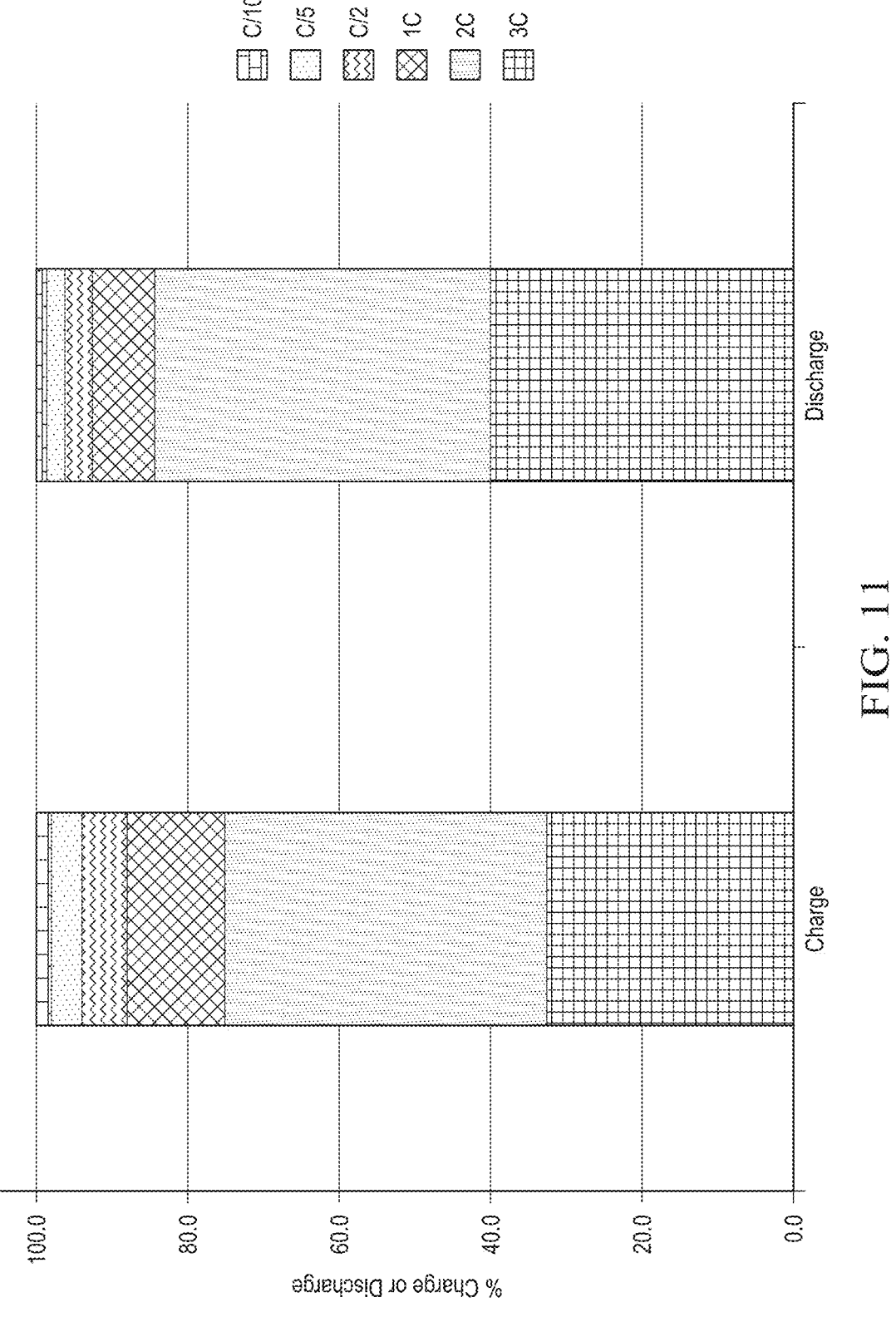
FIG. 11 illustrates the % charge and % discharge at different rates of a cell prepared with the ultra-thin mat of Example 3 according to embodiments of the present disclosure.

FIG. 11 illustrates the percent charge and discharge (as a
function of specific capacity) using a cell containing the mat.
As shown in FIG. 11, the cell containing the mat experiences
a single cycle of the discharge and charge rates of: C/10, C/5,
C/2, 1C, 2 C and 5 C. The percentages presented in Table 5
below describe the amount of charge or discharge capacity
that is realized after a single cycle at the described discharge
and charge rate. The mat exhibits improved charge and
discharge capacity at 5 C rates. While not as pronounced as
Example 2, likely due to a decrease in pore volume and
permeability, a coin cell prepared with the mat exhibits
improved specific charge and discharge capacity up to rates
of C/2 compared to the generic PP separator.

Figure 12:
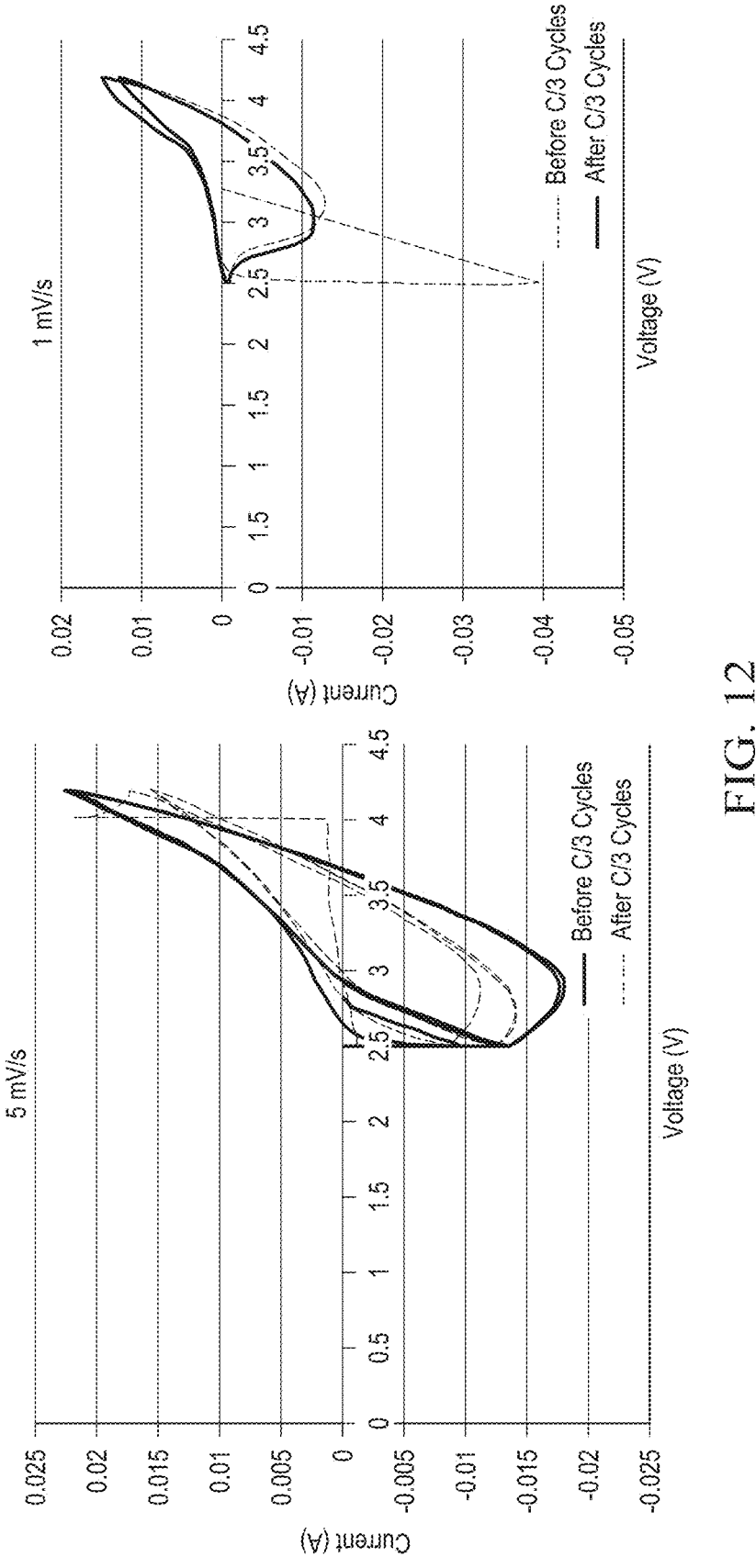
FIG. 12 illustrates the cyclic voltammetry before and after charge and discharge cycling at C/3 of a cell prepared with the ultra-thin mat of Example 3 according to embodiments of the present disclosure.

The coulombic efficiency of cells containing the mat, as
described below, is the ratio of the specific discharge capac-
ity over the specific charge capacity at a rate of C/3. Those
results are shown and described in Table 5 below. Cyclic voltammetry was performed before and after the cycling at C/3. FIG. 12 demonstrates the stability of the mat in a coin cell before and after repeated cycling at a rate of C/3 of Example 3. Some differences are observed; however, these differences are not indicative of irreversible reactions that would compromise the integrity of the coin cell and are within acceptable limits.

Table 5 summarizes the results of testing the mat of Example 3.

TABLE 5

ADDITIONAL RESULTS OF EXAMPLE 3

| Characteristic | Result | |
| --- | --- | --- |
| | Ultra-Thin Mat | Standard |
| % Cumulative Charge | | |
| 5C | 32.5 | 7.3 |
| 2C | 75.4 | 53.8 |
| 1C | 88.2 | 79.3 |
| C/2 | 94.1 | 90.7 |
| C/5 | 98.0 | 97.2 |
| C/10 | 100.0 | 100.0 |
| % Cumulative Discharge | | |
| 5C | 39.8 | 11.5 |
| 2C | 84.7 | 48.5 |
| 1C | 92.6 | 77.7 |
| C/2 | 96.4 | 87.8 |
| C/5 | 98.8 | 96.3 |
| C/10 | 100.0 | 100.0 |
| Average Capacity Performance Discharge Rate of C/3 (mAh/g) | 122.1 | 121.2 |
| Average Capacity Performance Charge Rate of C/3 (mAh/g) | 122.6 | 122.5 |
| Average Coulombic Efficiency at C/3 | 99.7% | 98.9% |
| Cell Integrity - Cyclic Voltammetry (Pass/Fail) | Pass* | Pass* |

Pass* = Pass with some minor differences

Example 4—Ultra-Thin Mat with Nanofibrillated Cellulose 2.1 g of a previously mixed suspension of 1% NFC was blended using a laboratory blender with 500 mL of water for 20 seconds. To this suspension, 0.5 g of BX9 glass fibers was added and blended at the same speed for an additional 10 seconds. The components were then suspended in 1 gallon of water, which was previously acidified to a pH of 3.0-3.5 with 10% $H_2SO_4$. The suspension was allowed to mix for 3 to 5 minutes. The mixture was diluted to 3 gallons of hot water (50° C.) and acidified to a pH of 3.0 with 10% $H_2SO_4$, and mixed for 5 minutes before the mat was formed using vacuum formation.

The suspension was transferred to the reservoir of a sheet mold above a 330 mesh screen and mixed by hand to ensure even distribution of the fibers. The reservoir was allowed to drain, causing the suspension to deposit on the screen and forcing the formation of an ultra-thin mat. The resulting wet film was removed from the sheet mold while on the 330 mesh screen, dried in an oven between 60° C. to 65° C. and the dried mat was removed from the mesh screen.

Figure 13:
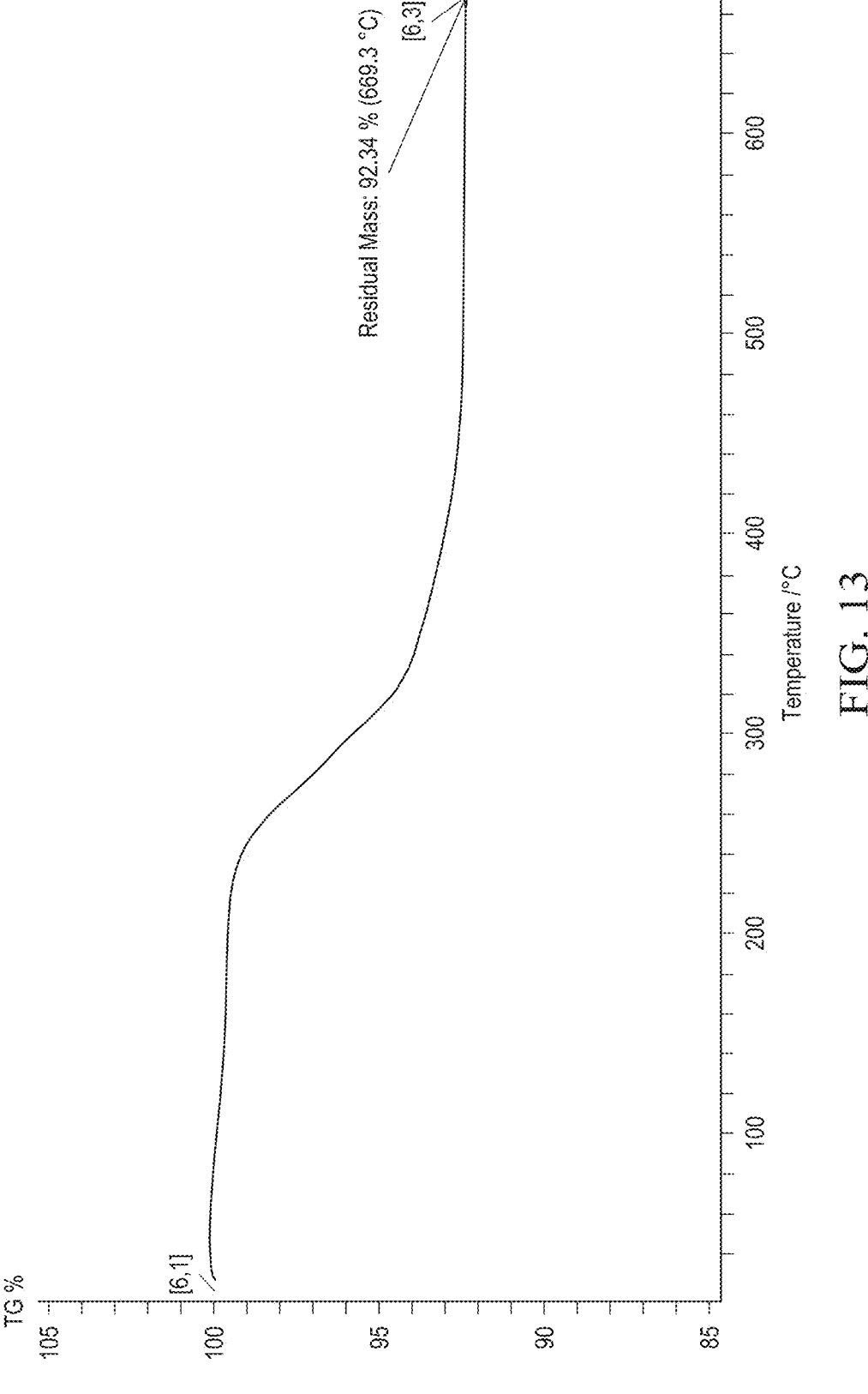
FIG. 13 illustrates the loss on ignition of the ultra-thin mat of Example 4 according to embodiments of the present disclosure.
Figure 14A:
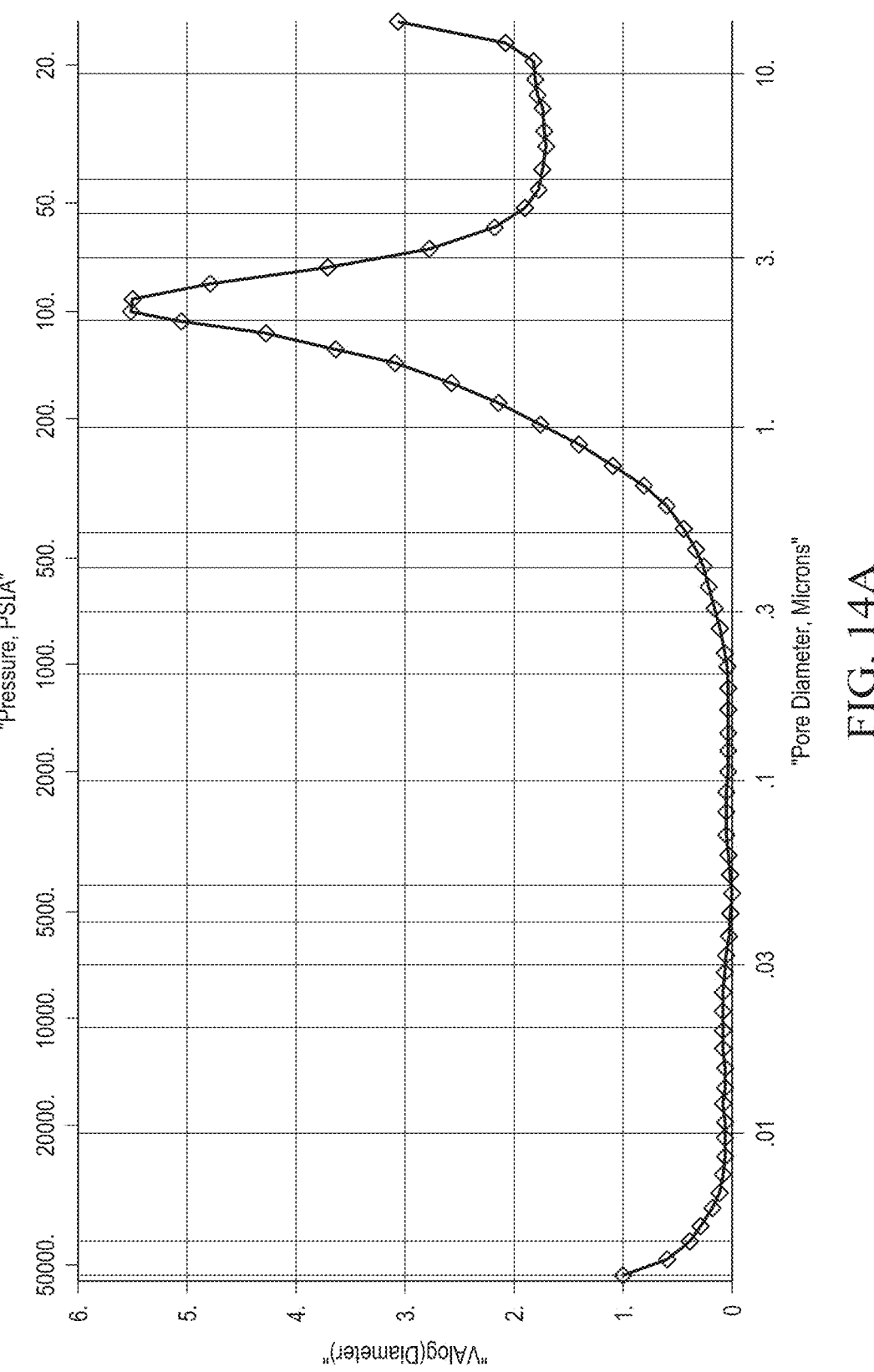
FIGS. 14A, 14B, and 14C illustrate the median pore size, cumulative pore volume, and surface area, respectively, of the ultra-thin mat of Example 4 according to embodiments of the present disclosure.
Figure 14B:
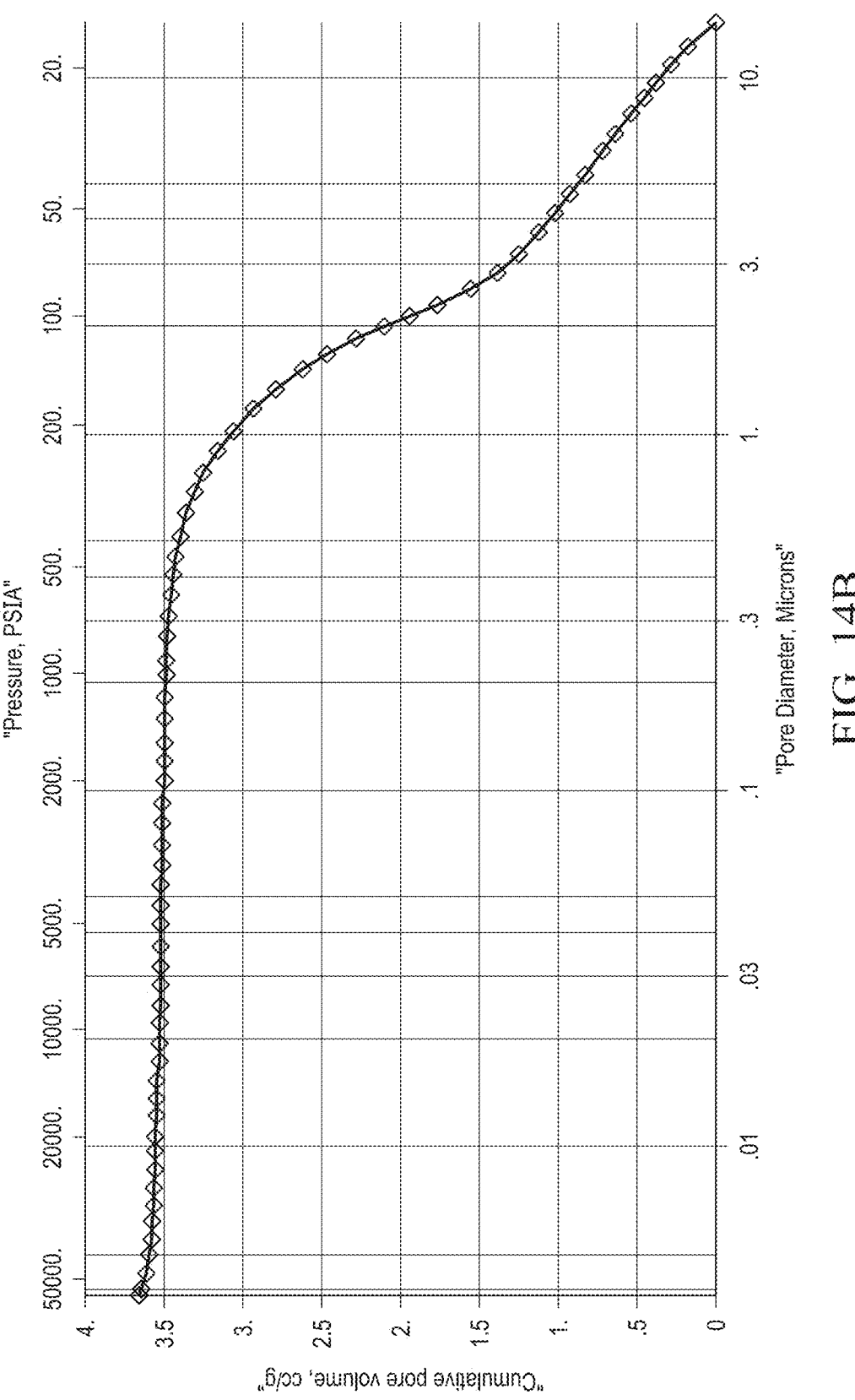
Figure 14C:
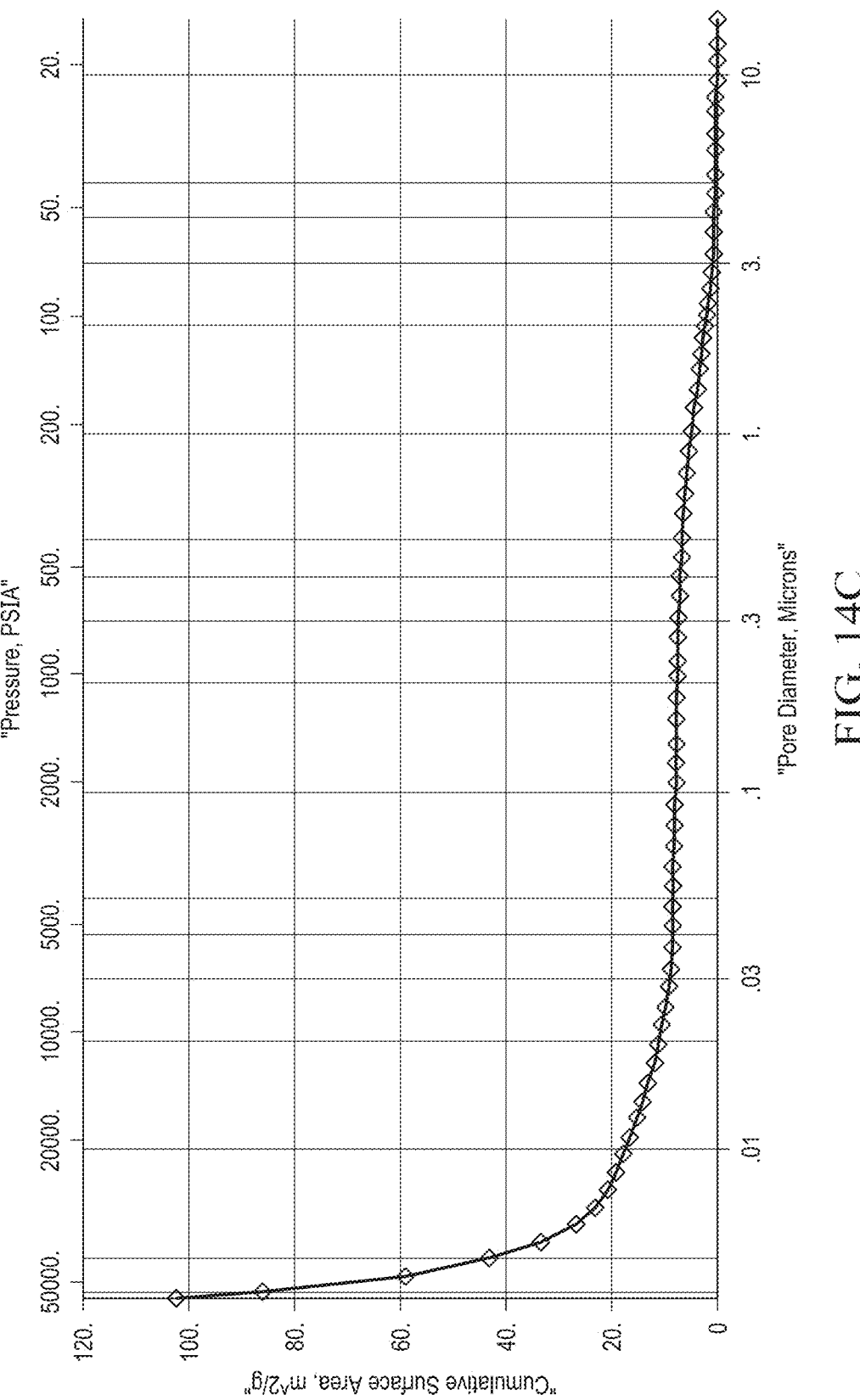

Thickness, GSM, LOI, tensile strength, surface area, cumulative pore volume, pore diameter, and permeability were determined at this point. As done in Example 1, the results of Example 4 were compared to the standard Celgard® 2325 separator. The results are shown in Table 6 below, FIG. 13 illustrates the LOI (via TGA) of the mat of Example 4, FIG. 14A shows the median pore size, FIG. 14B shows the cumulative pore volume, and FIG. 14C shows the surface area.

TABLE 6

RESULTS OF EXAMPLE 4

| Characteristic | Result | |
| --- | --- | --- |
| | Ultra-Thin Mat | Standard |
| Handleability (Pass/Fail) | Pass | ND |
| Thickness (μm) | 19 | 25 |
| Area Density - GSM | 5.7 | 15 |
| Loss on Ignition by TGA (%) | 7.8 | 99.5 |
| Average Pore Diameter (μm) | 1.1 | 0.0106 |
| Pore Volume (cm³/g) | 1.3 | 0.9 |
| Permeability (Darcy) | 0.018 | 0.00014 |
| Tensile Strength (kg/cm²) | 22 | 150-1700 |
| Surface Area (m²/g) | 4.72 | ND |

ND = Not determined

Example 5—Ultra-Thin Mat with Nanofibrillated Cellulose

Using a laboratory stand mixer, 0.08 g of NFC in 500 mL of hot water (50° C.) at an acidic pH (between 2.8 and 3.5) was mixed. Then, 0.19 g of BX9 fiber was added and pre-mixed for 5 minutes to form a slurry. The slurry was then placed in a laboratory blender and blended for 1 minute. The sides of the blender were rinsed and an additional 500 mL of water (acidified to a pH of 2.8-3.5 with 10% $H_2SO_4$) was added to the blender and blended for an additional minute.

The surface of a tight 450 mesh, metal screen was wetted with water, and the slurry from the blender was poured evenly onto the screen and allowed to drain completely. The slurry was allowed to drain without vacuum and a film was formed.

The resulting mat was dried in an oven at 60° C. for 5-15 minutes or to dryness, removed from the oven, and allowed to cool. The resulting dried mat was gently removed from the screen.

Coin cells were produced utilizing the following common commercially-available components, substances, and conditions: cathodes consisted of a mixture of: 94 wt % cathode active material $LiNi_{0.5}Co_{0.2}Mn_{0.3}O_2$ (NCM523), 2.5% conductive additive (C65 conductive carbon black), and 3.5 wt % polyvinylidene fluoride (PVDF) binder (HSV 1800 PVDF) on an aluminum current collector foil (area: 1.77 cm²), and anodes were constructed using a mixture of 94% anode active material (graphite), 2.5% conductive additive (C65 conductive carbon black), and 3.5% PVDF binder (HSV 900 PVDF) on copper current collector foil (area: 2.01 cm²). The electrolyte was 1.0M lithium hexafluorophosphate ($LiPF_6$) in 3:7 EC (ethylene carbonate):EMC (ethyl methyl carbonate). Cells were housed in 2032 coin cell casings from Hohsen Corp. The cell utilized separators formed from the dried mat. The separators were dried in a vacuum oven at 130° C. for 12 hours prior to use. A generic polypropylene (PP) separator was used as a control.

Figure 15:
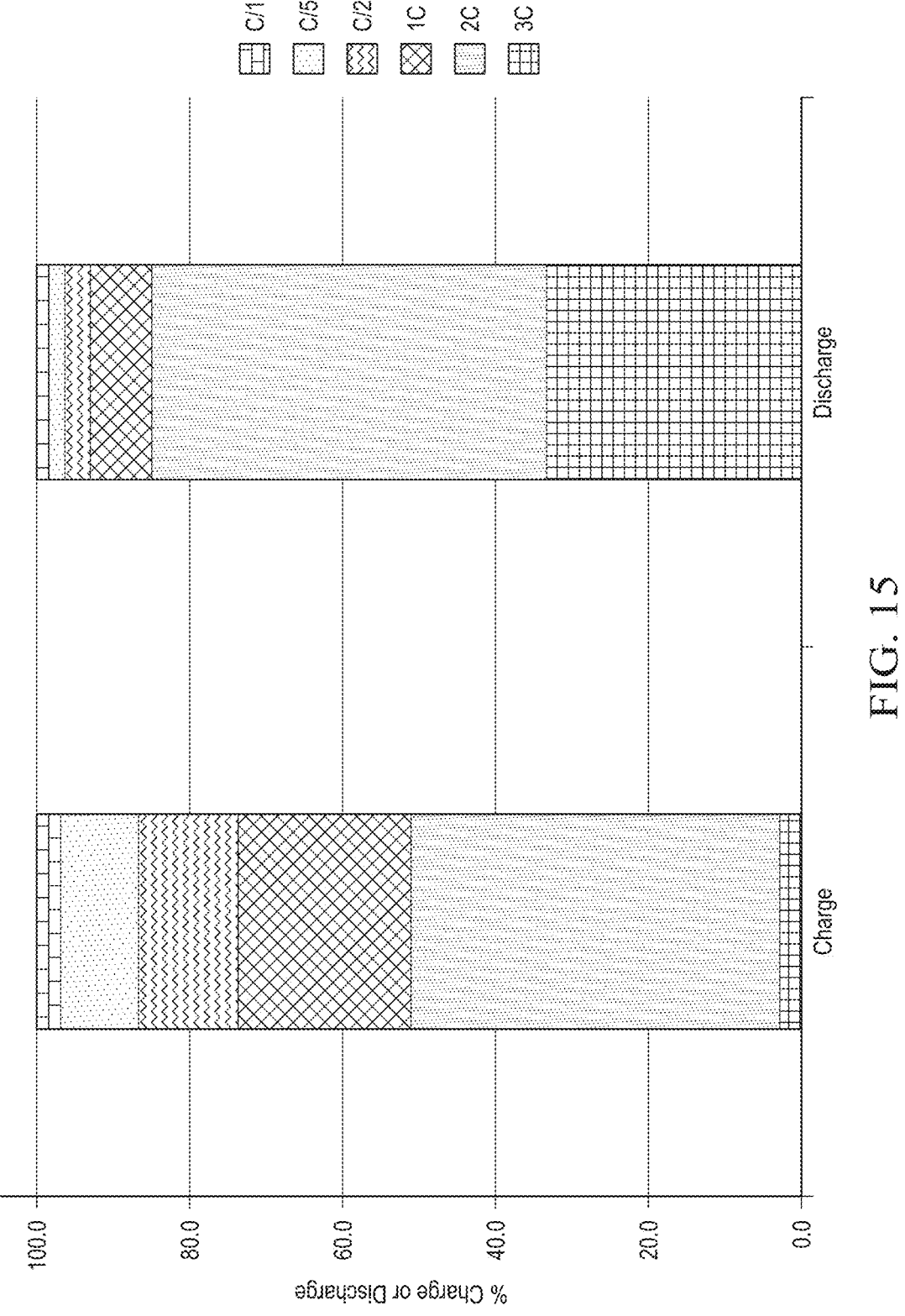
FIG. 15 illustrates the % charge and % discharge at different rates of a cell prepared with the ultra-thin mat of Example 5 according to embodiments of the present disclosure.

FIG. 15 illustrates the percent charge and discharge (as a function of specific capacity) using a cell containing the mat as it experiences a single cycle of the discharge and charge rates of: C/10, C/5, C/2, 1C, 2 C, and 5 C. The percentages presented in Table 7 below describe the amount of charge or discharge capacity that is realized after a single cycle at the described discharge and charge rate. The cumulative pore volume and permeability of the mat of Example 5 is lower than the mat in Example 1; however, the specific discharge capacity of coin cells prepared with the mat of Example 5 is greater than those prepared with the control PP separator up to discharge rates of C/5.

Figure 16:
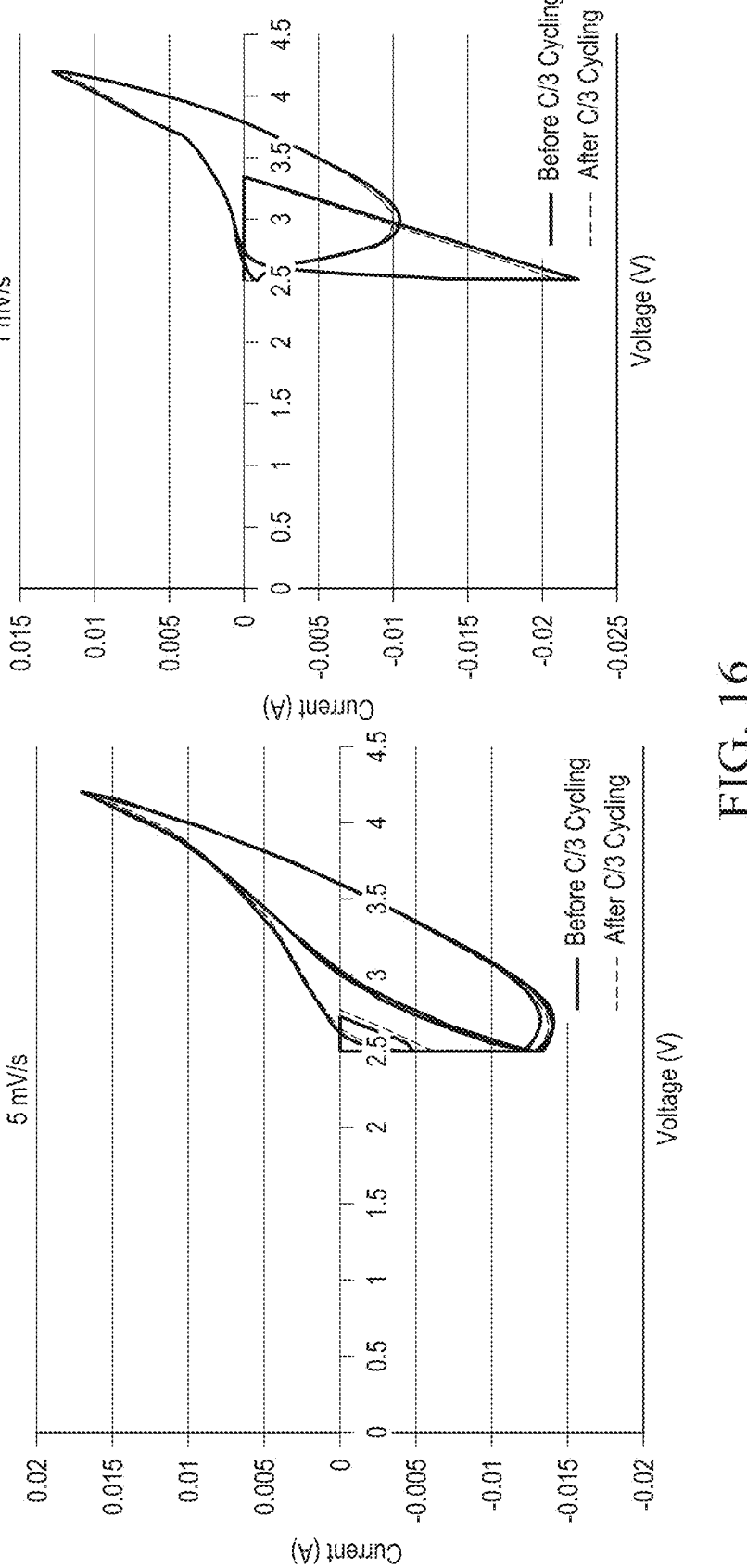
FIG. 16 illustrates the cyclic voltammetry before and after charge and discharge cycling at C/3 of a cell prepared with the ultra-thin mat of Example 5 according to embodiments of the present disclosure.

The coulombic efficiency of cells containing the mat of Example 5 is described below. FIG. 16 demonstrates the stability of a coin cell before and after repeated cycling at a rate of C/3 for the mat of Example 5. The cyclic voltammogram in FIG. 16 before and after cycling at two different potentials are nearly indistinguishable suggesting no changes to the anode, cathode, or electrolyte solution during cycling. The results are shown in Table 7.

TABLE 7

RESULTS OF EXAMPLE 5

| Characteristic | Result | |
| | Ultra-Thin Mat | Standard |
|---|---|---|
| % Cumulative Charge | | |
| 5C | 3.0 | 7.3 |
| 2C | 51.5 | 53.8 |
| 1C | 73.9 | 79.3 |
| C/2 | 87.1 | 90.7 |
| C/5 | 97.0 | 97.2 |
| C/10 | 100.0 | 100.0 |
| % Cumulative Discharge | | |
| 5C | 33.4 | 11.5 |
| 2C | 85.4 | 48.5 |
| 1C | 93.3 | 77.7 |
| C/2 | 96.7 | 87.8 |
| C/5 | 98.8 | 96.3 |
| C/10 | 100.0 | 100.0 |
| Average Capacity Performance Discharge Rate of C/3 (mAh/g) | 122.6 | 121.2 |
| Average Capacity Performance Charge Rate of C/3 (mAh/g) | 123.6 | 122.5 |
| Average Coulombic Efficiency at C/3 | 99.3% | 98.9% |
| Cell Integrity - Cyclic Voltammetry (Pass/Fail) | Pass | Pass* |

Pass* = Pass with some minor differences

Figure 17A:
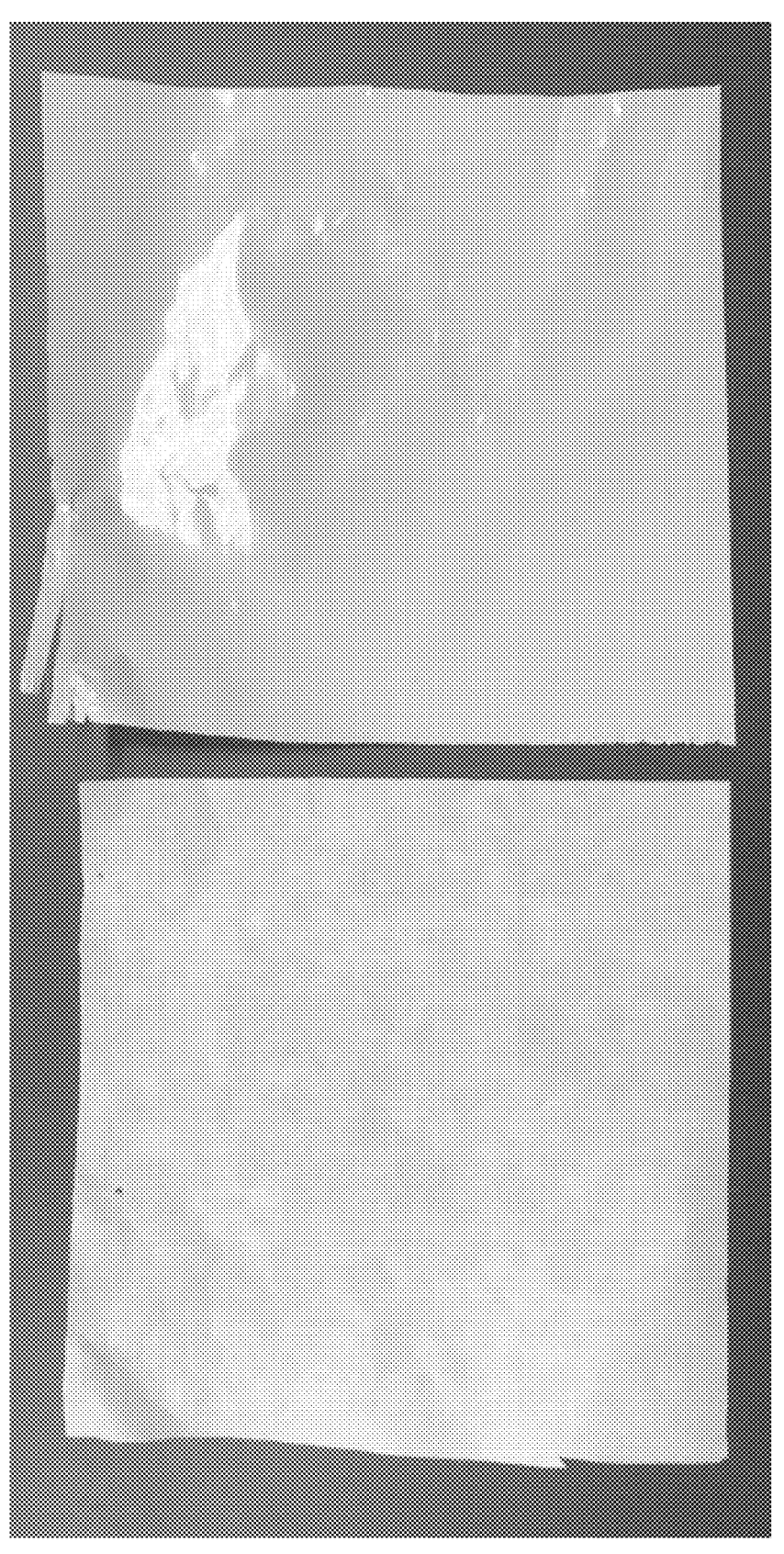
FIGS. 17A and 17B illustrate the ultra-thin mat samples tested in Example 5 for shrinkage before and after heating, respectively, according to embodiments of the present disclosure.
Figure 17B:
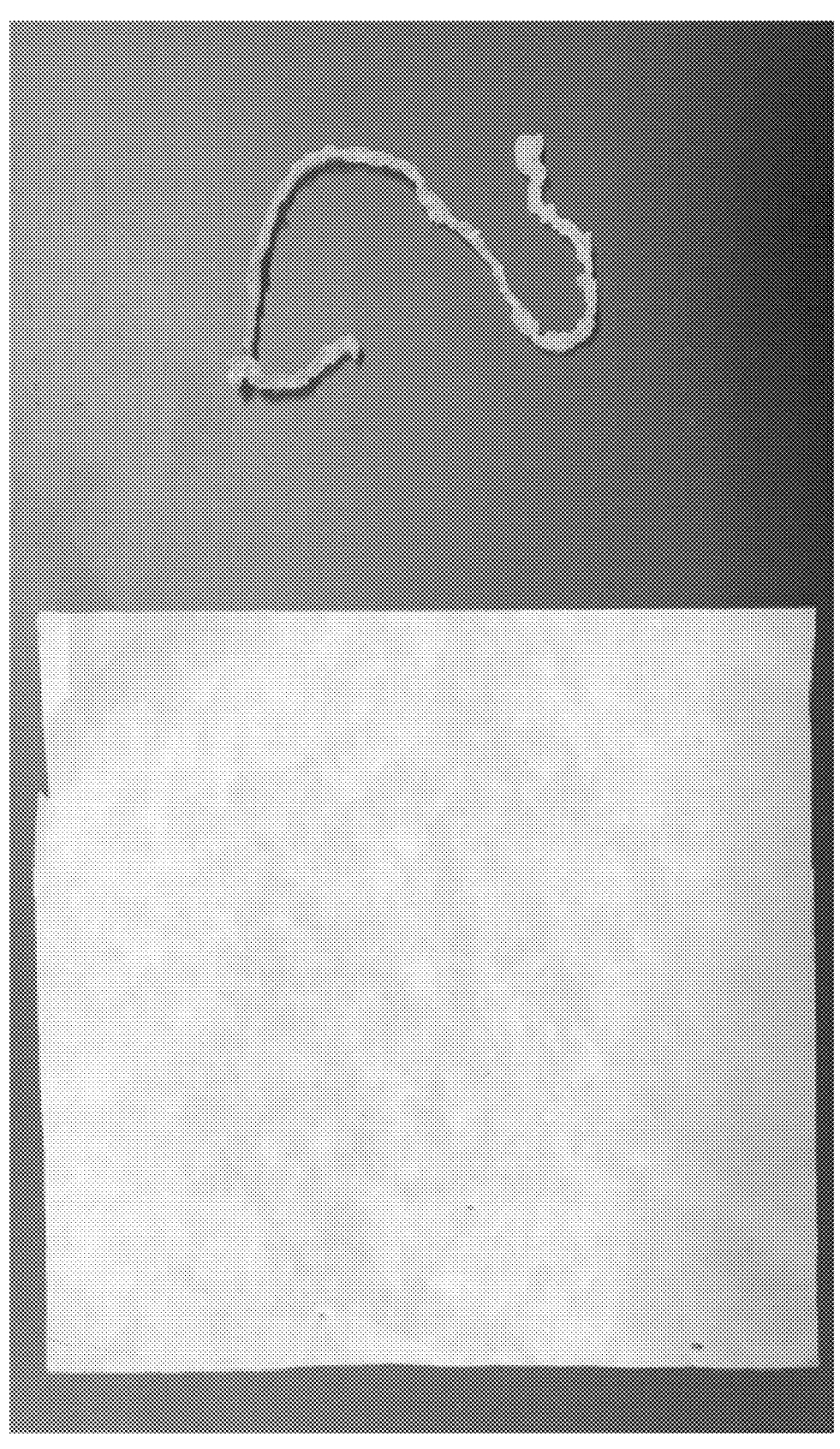

Thermal shrinkage is a very important metric for a thermally stable battery separator. If the separator shrinks when heated, the anode and cathode may come in contact and a dangerous shorting event may occur. A sample of a standard Celgard® 2325 separator and the mat of Example 5 were cut. Dimensions of each sample were measured (length, width, and thickness) along with the mass of each sample. The weighed and measured samples were treated at 200° C. in a kiln for 30 minutes. After this time the samples were removed from the kiln and allowed to cool to room temperature. The dimensions (length, width, and thickness) and mass of each sample were measured again and compared to the values prior to firing. Significant degradation of the standard Celgard® 2325 separator is observed after heating the sample to the extent that the dimensions of the sample cannot be measured and the sample is described as being destroyed. The mat of Example 5, however, exhibited no measurable change after heating, suggesting resistance to physical deformation upon heating. The results are shown in Tables 8 and 9 and FIGS. 17A (before heating) and 17B (after heating).

TABLE 8

MEASUREMENTS PRIOR TO HEATING

| Metric | Example 5 | Standard |
|---|---|---|
| Weight (mg) | 73 | 176 |
| Thickness (μm) | 25 | 27 |
| Area (cm²) | 111.1 | 122.1 |
| GSM | 6.5 | 14.4 |

TABLE 9

MEASUREMENTS AFTER HEATING

| Metric | Example 5 | Standard |
|---|---|---|
| Weight (mg) | 74 | 188 |
| Thickness (μm) | 24 | Destroyed |
| Area (cm²) | 113.7 | |
| GSM | 6.5 | |

Example 6—Ultra-Thin Mat with Polyvinyl Alcohol

A 1% suspension of polyvinyl alcohol was prepared in water by vigorously blending polyvinyl alcohol for 45 seconds using a laboratory stand mixer immediately before use. In this embodiment, 2.1 g of a previously mixed 1% suspension of polyvinyl alcohol was vigorously blended using a laboratory blender with 500 mL of water for 20 seconds. To this suspension, 0.45 g of BX9 glass fibers was added and blended at the same speed for an additional 60 seconds.

The components described above were then suspended in 1 gallon of water, which was previously acidified to a pH of 3.0-3.5 with 10% $H_2SO_4$ and mixed for 5 minutes before a mat was formed using vacuum formation.

The suspension was transferred to the reservoir of a sheet mold above a 330 mesh screen and mixed by hand to ensure even distribution of the fibers. The reservoir was allowed to drain, causing the suspension to deposit on the screen and forcing the formation of an ultra-thin mat. The resulting wet film was removed from the sheet mold while on the 330 mesh screen, dried in an oven between 60° C. to 65° C. and the dried mat was removed from the mesh screen.

Figure 18:
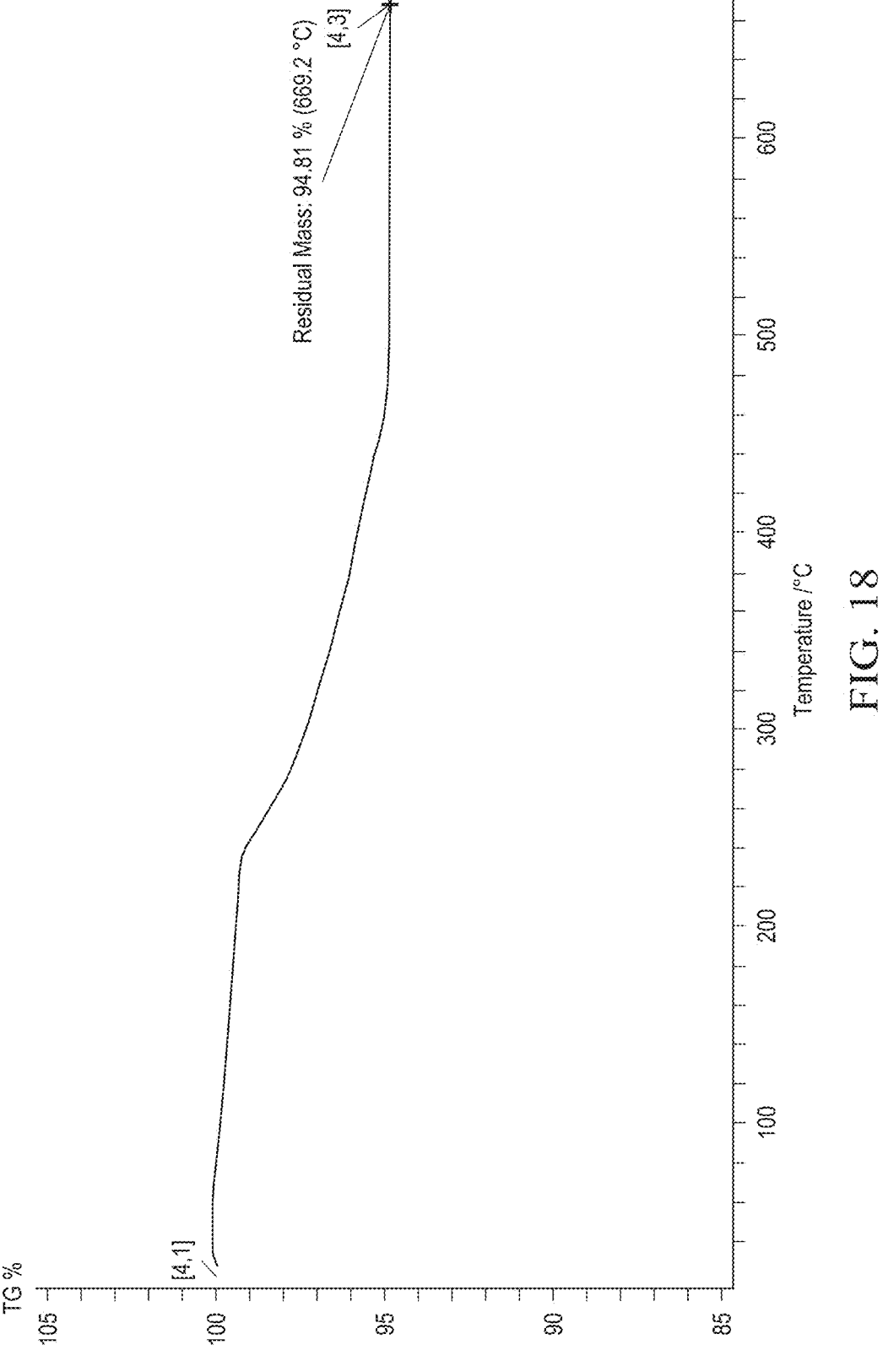
FIG. 18 illustrates the loss on ignition of the ultra-thin mat of Example 6 according to embodiments of the present disclosure.

Thickness, LOI, and tensile strength were determined at this point. The results are shown in Table 10 below and were compared to a standard Celgard® 2325 separator. FIG. 18 illustrates the LOI (via TGA).

TABLE 10

RESULTS OF EXAMPLE 6

| Characteristic | Result | |
| | Ultra-Thin Mat | Standard |
|---|---|---|
| Handleability (Pass/Fail) | Pass | ND |
| Thickness (μm) | 19 | 25 |
| Area Density - GSM | ND* | 15 |
| Loss on Ignition by TGA (%) | 5.4 | 99.5 |
| Average Pore Diameter (μm) | ND* | 0.0106 |
| Pore Volume (cm³/g) | ND* | 0.9 |

TABLE 10-continued

RESULTS OF EXAMPLE 6

| Characteristic | Result | |
| | Ultra-Thin Mat | Standard |
| --- | --- | --- |
| Permeability (Darcy) | ND* | 0.00014 |
| Tensile Strength (kg/cm$^2$) | 4.0 | 150-1700 |
| Surface Area (m$^2$/g) | ND* | ND |

ND = Not determined
ND* = Not determined because tensile strength too weak

Example 7—Ultra-Thin Mat with Acrylic Latex, Starch and Conditioning/Wetting Agent 3.2 g of acrylic latex emulsion, 3.1 g of dry starch, and 0.1 g of hydroxyethyl cellulose were mixed using a laboratory stand mixer with 140 g of hot water (50° C.). This mixture was acidified to pH 3.0 with 10% $H_2SO_4$ and mixed for 10 minutes, after which 3.8 g of an alcohol alkoxylate wetting agent is added and allowed to mix for 5 minutes. 5.1 g of BX9 glass fibers was slowly mixed in along with an additional 80 g of water. Once the fiber was added, the slurry was mixed for 10 additional minutes to ensure homogeneity; the speed of the mixer was adjusted as needed.

Then, 18.0 g of the slurry was added to 1 gallon of water in a 4 gallon tank and mixed for 10 minutes. The mixture was diluted to 3 gallons with hot water (50° C.), acidified to a pH of 3.0 with 10% $H_2SO_4$, and mixed for 5 minutes before a mat was formed using vacuum formation.

The suspension was transferred to the reservoir of a sheet mold above a 330 mesh screen and mixed by hand to ensure even distribution of the fibers. The reservoir was allowed to drain, causing the suspension to deposit on the screen and forcing the formation of an ultra-thin mat. The resulting wet film was removed from the sheet mold while on the 330 mesh screen, dried in an oven between 60° C. to 65° C. and the dried mat was removed from the mesh screen.

Figure 19:
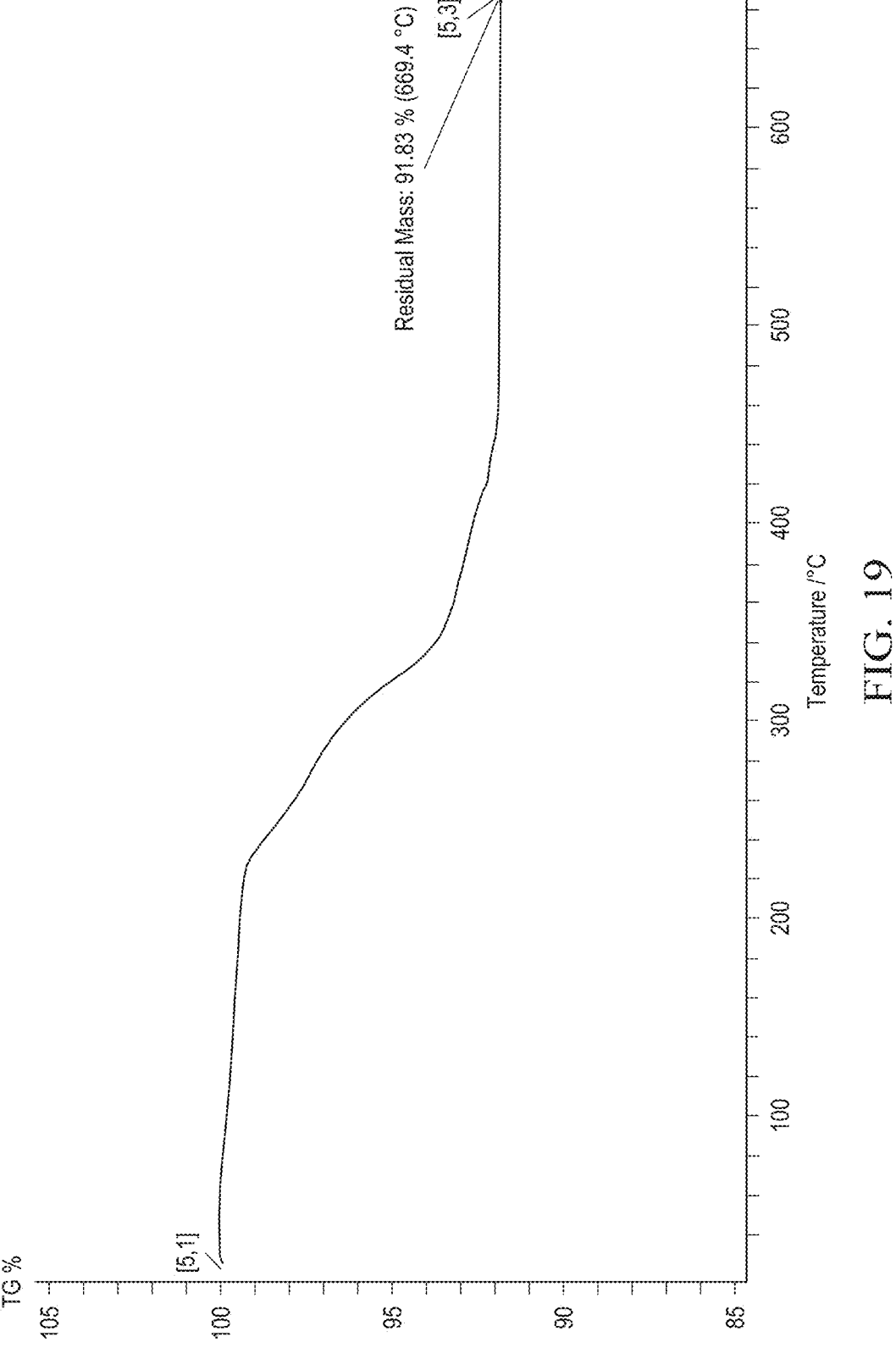
FIG. 19 illustrates the loss on ignition of the ultra-thin mat of Example 7 according to embodiments of the present disclosure.
Figure 20A:
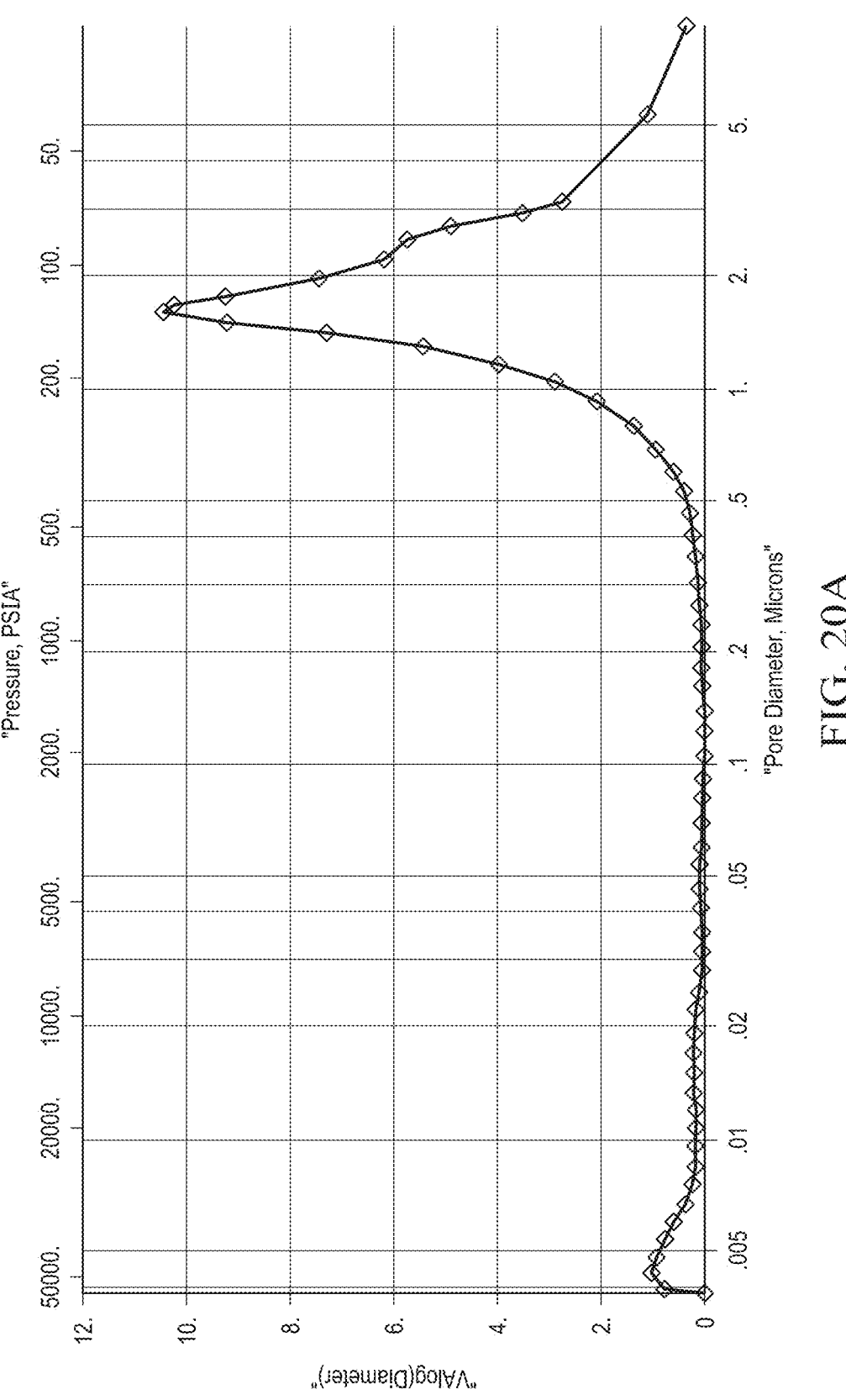
FIGS. 20A, 20B, and 20C illustrate the median pore size, cumulative pore volume, and surface area, respectively, of the ultra-thin mat of Example 7 according to embodiments of the present disclosure.
Figure 20B:
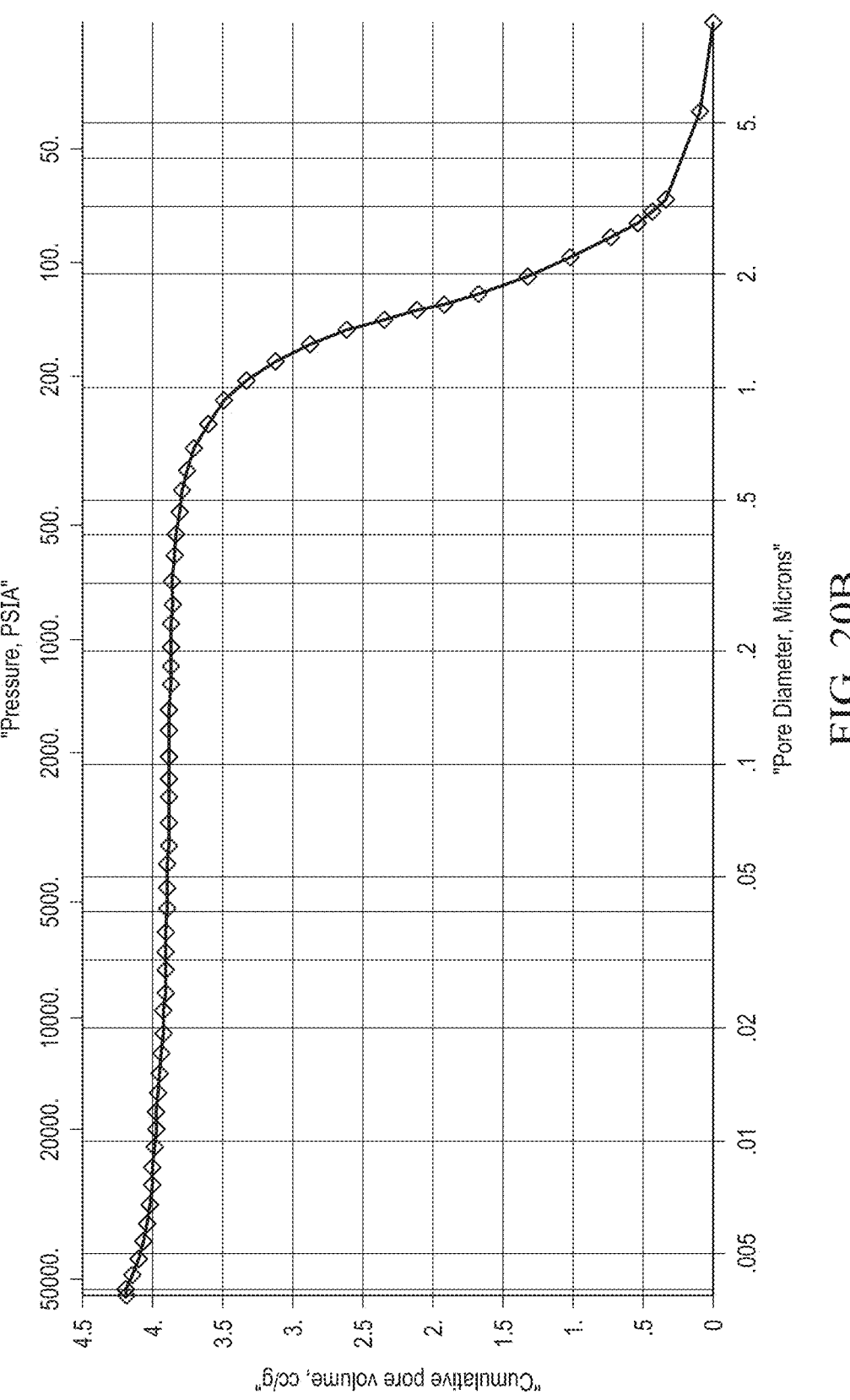
Figure 20C:
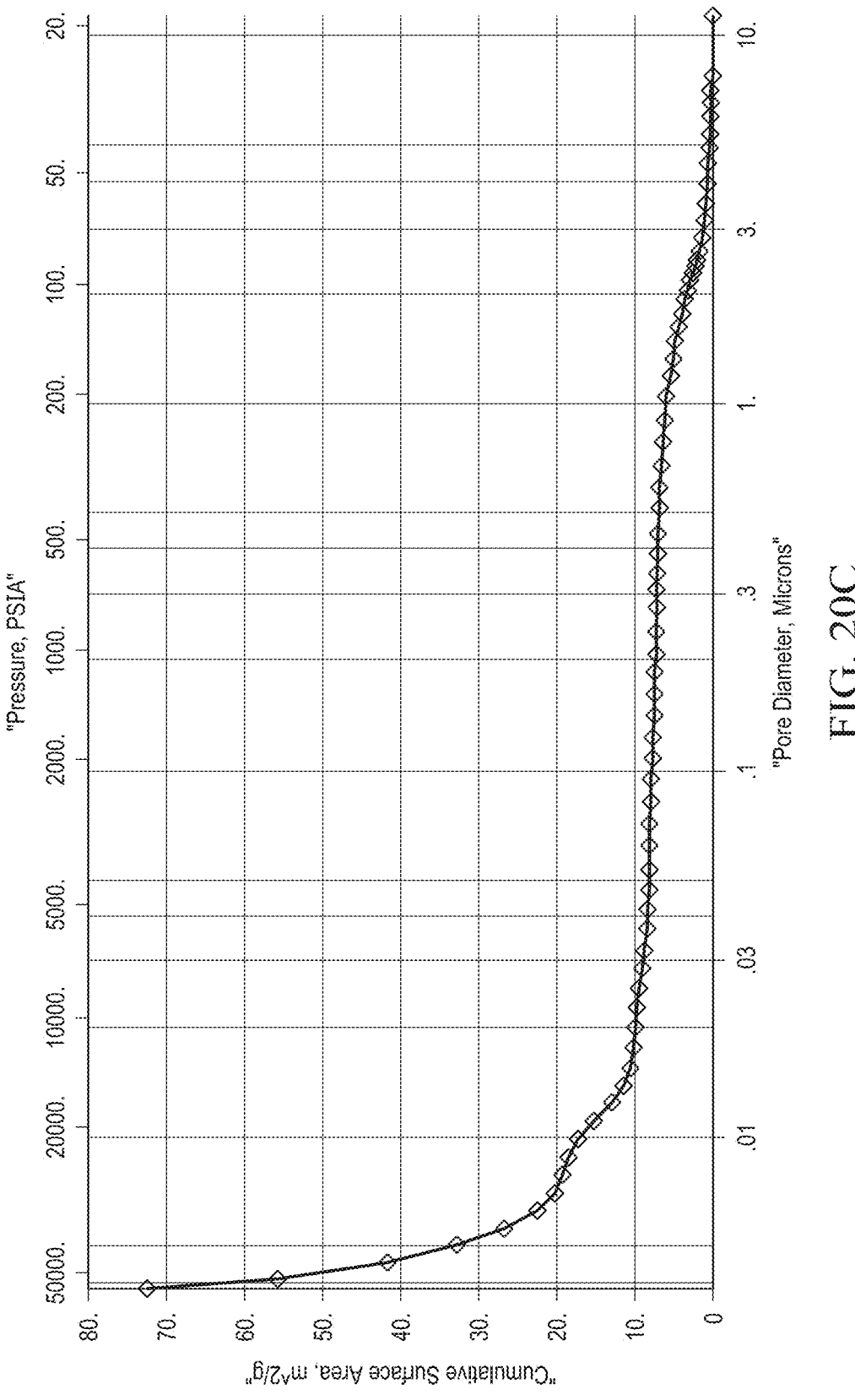

The introduction of an acrylic latex emulsion and wetting agents was shown to increase the tensile strength. As expected, the LOI increased because of the introduction of more organic material. The presence of the acrylic latex emulsion is observed in the SEM micrographs in FIG. 24; however, it did not affect the visible pore size. The results are shown in Table 11 below compared to a standard Celgard® 2325 separator, FIG. 19 illustrates the LOI (via TGA), FIG. 20A shows the median pore size, FIG. 20B shows the cumulative pore volume, and FIG. 20C shows the surface area.

TABLE 11

RESULTS OF EXAMPLE 7

| Characteristic | Results | |
| | Ultra-Thin Mat | Standard |
| --- | --- | --- |
| Handleability (Pass/Fail) | Pass | ND |
| Thickness (μm) | 23 | 25 |
| Area Density - GSM | 5.0 | 15 |
| Loss on Ignition by TGA (%) | 8.2 | 99.5 |
| Average Pore Diameter (μm) | 1.3 | 0.0106 |
| Pore Volume (cm$^3$/g) | 2.5 | 0.9 |
| Permeability (Darcy) | 0.027 | 0.00014 |
| Tensile Strength (kg/cm$^2$) | 26 | 150-1700 |
| Surface Area (g/m$^2$) | 8.07 | ND |

ND = Not determined

Example 8—Ultra-Thin Mat with Nanofibrillated Cellulose Formed with Doctor Blade 0.75 g of a cellulose gum thickener was vigorously mixed using a laboratory stand mixer in 225 g of warm water (35° C.) until the mixture thickened. To this mixture, 2.5 g of NFC was added and vigorously mixed until evenly distributed. The mixture was acidified to pH 3.0 with 10% $H_2SO_4$ and mixed for 10 minutes. 3.5 g of BX9 glass fibers and 3.0 g of milled BX9 glass fibers were slowly added to the mixture along with 1000 ml of warm water (35° C.) to assist in the addition of the fiber. The milled BX9 fiber was prepared by ball milling the BX9 fiber for 6 hours. The resulting slurry was blended in a laboratory blender on high for 3 minutes.

Once the slurry was formed, a tight 335 mesh screen was wetted with water, and a doctor blade was set on the screen with the gate height set to 1.3 mm. A portion of the slurry was poured ahead of the doctor blade. Immediately after, the doctor blade was pulled along the 335 mesh screen to yield an even and smooth coating on the mesh.

The formed film was dried in an oven at 60° C. for 5-15 minutes or to dryness, removed from the oven, and allowed to cool. The resulting film was gently removed from the screen.

Figure 21:
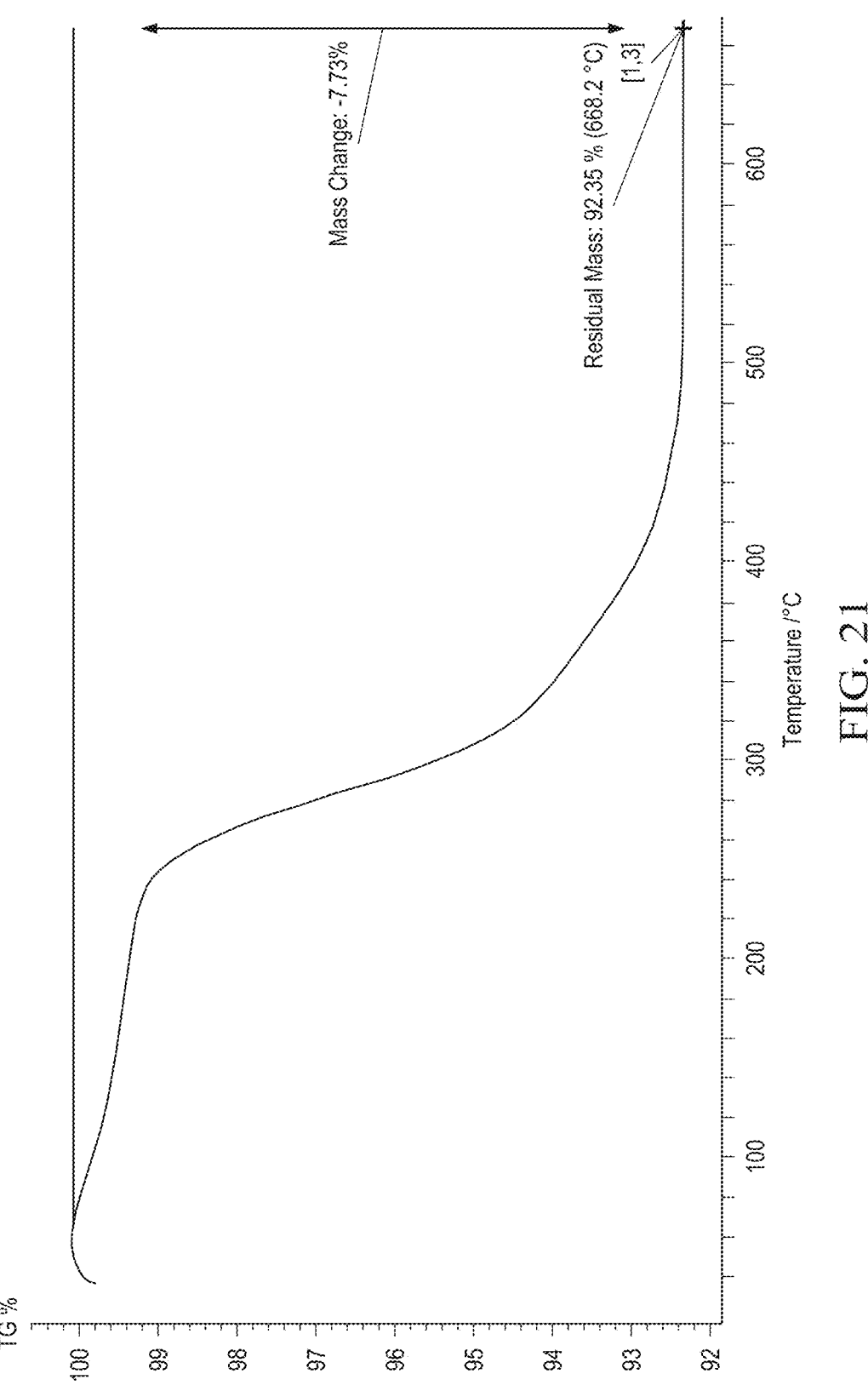
FIG. 21 illustrates the loss on ignition of the ultra-thin mat according to Example 8 according to embodiments of the present disclosure.

Thickness, GSM, LOI, and tensile strength were determined at this point. As done in Example 1, the results from Example 8 were compared to the standard Celgard® 2325 separator. The results are shown in Table 12 below. Although the mat of Example 8 is twice as thick as that of the other embodiments, the tensile strength is comparable and likely would improve with the introduction of latex emulsions or other types of conditioning agents. FIG. 21 illustrates the LOI (via TGA).

TABLE 12

RESULTS OF EXAMPLE 8

| Characteristic | Results | |
| | Ultra-Thin Mat | Standard |
| --- | --- | --- |
| Handleability (Pass/Fail) | Pass | ND |
| Thickness (μm) | 50 | 25 |
| Area Density - GSM | 14.0 | 15 |
| Loss on Ignition by TGA (%) | 7.7 | 99.5 |
| Tensile Strength (kg/cm$^2$) | 22 | 150-1700 |

ND = Not determined

Coin cells were produced utilizing the following common commercially-available components, substances, and conditions: cathodes consisted of a mixture of: 94 wt % cathode active material $LiNi_{0.5}Co_{0.2}Mn_{0.3}O_2$ (NCM523), 2.5% conductive additive (C65 conductive carbon black), and 3.5 wt % polyvinylidene fluoride (PVDF) binder (HSV 1800 PVDF) on an aluminum current collector foil (area: 1.77 cm$^2$), and anodes were constructed using a mixture of 94% anode active material (graphite), 2.5% conductive additive (C65 conductive carbon black), and 3.5% PVDF binder (HSV 900 PVDF) on copper current collector foil (area: 2.01 cm$^2$). The electrolyte was 1.0M lithium hexafluorophosphate (LiPF$_6$) in 3:7 EC (ethylene carbonate):EMC (ethyl methyl carbonate). Cells were housed in 2032 coin cell casings from Hohsen Corp. The cell utilized separators formed from the dried mat of Example 8. The separators were dried in a vacuum oven at 130° C. for 12 hours prior to use. A generic polypropylene (PP) separator was used as a control.

Figure 22:
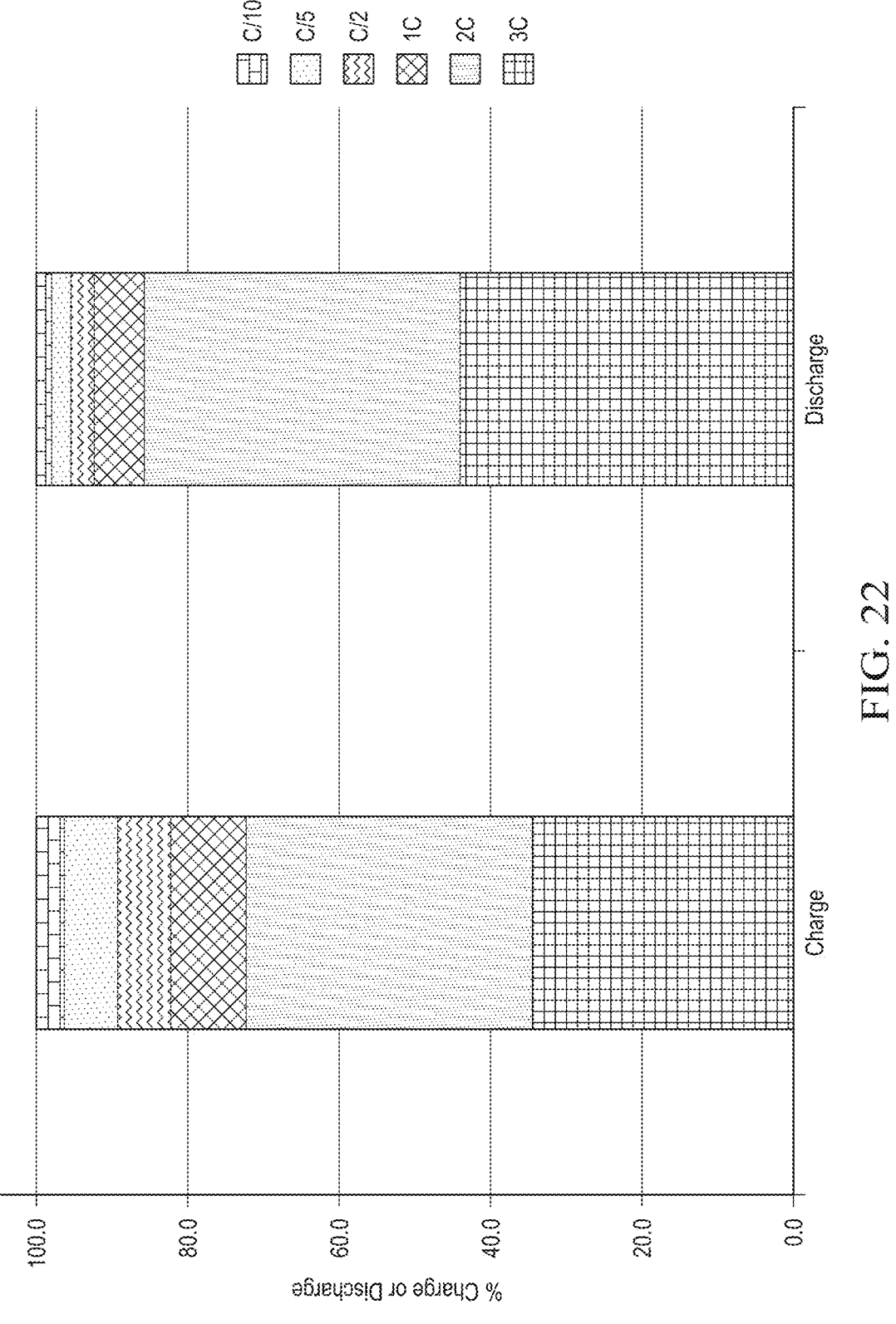
FIG. 22 illustrates the % charge and % discharge at different rates of a cell prepared with the ultra-thin mat according to Example 8 according to embodiments of the present disclosure.

FIG. 22 illustrates the percent charge and discharge (as a function of specific capacity) using a cell containing the separator of Example 8 as it experiences a single cycle of the discharge and charge rates of: C/10, C/5, C/2, 1C, 2 C, and 5 C. The percentages presented in Table 13 below describe the amount of charge or discharge capacity that is realized after a single cycle at the described discharge and charge rate. The separator of Example 8 shows a greater specific discharge capacity at all discharge rates, up to C/10, suggesting improved mobility of lithium ions compared to the generic polypropylene separator. The specific charging capacity of cells prepared with the separator of Example 8 is greater than or equal to those prepared with polypropylene type separators at all charge rates, up to C/10.

Figure 23:
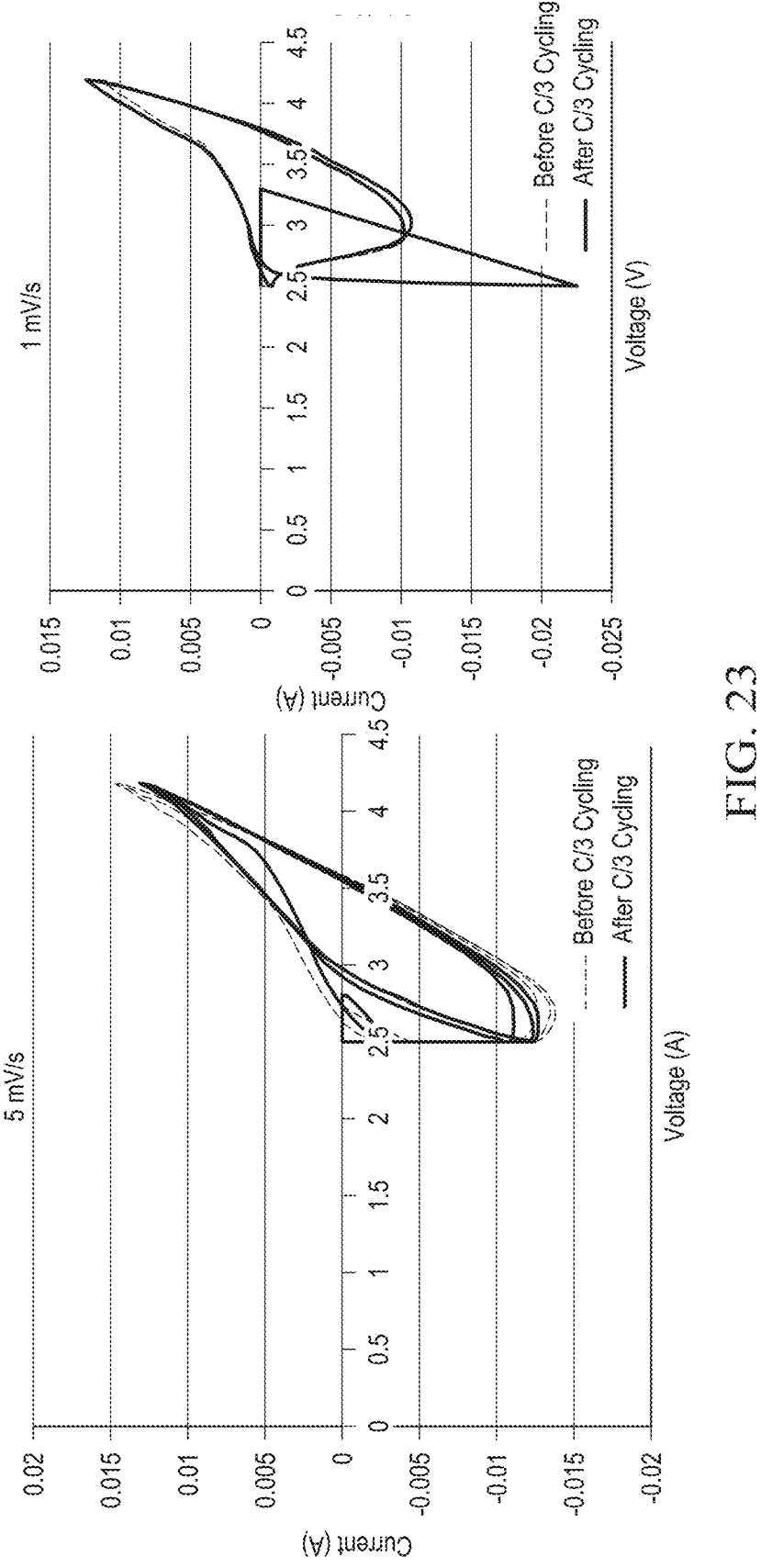
FIG. 23 illustrates the cyclic voltammetry before and after charge and discharge cycling at C/3 of a cell prepared with the ultra-thin mat of Example 8 according to embodiments of the present disclosure.

The coulombic efficiency of cells containing the separators is described below. FIG. 23 demonstrates the stability of the mat of Example 8 in a coin cell before and after repeated cycling at a rate of C/3. The results are shown below in Table 13.

TABLE 13

RESULTS OF EXAMPLE 8

| Characteristic | Result | |
| --- | --- | --- |
| | Ultra-Thin Mat | Standard |
| % Cumulative Charge | | |
| 5C | 34.6 | 7.3 |
| 2C | 72.6 | 53.8 |
| 1C | 82.7 | 79.3 |
| C/2 | 89.7 | 90.7 |
| C/5 | 96.7 | 97.2 |
| C/10 | 100.0 | 100.0 |

TABLE 13-continued

RESULTS OF EXAMPLE 8

| Characteristic | Result | |
| --- | --- | --- |
| | Ultra-Thin Mat | Standard |
| % Cumulative Discharge | | |
| 5C | 44.2 | 11.5 |
| 2C | 86.2 | 48.5 |
| 1C | 92.4 | 77.7 |
| C/2 | 95.7 | 87.8 |
| C/5 | 98.4 | 96.3 |
| C/10 | 100.0 | 100.0 |
| Average Capacity Performance Discharge Rate of C/3 (mAh/g) | 125.5 | 121.2 |
| Average Capacity Performance Charge Rate of C/3 (mAh/g) | 125.4 | 122.5 |
| Average Coulombic Efficiency at C/3 | 100.0 | 98.9% |
| Cell Integrity - Cyclic Voltammetry (Pass/Fail) | Pass* | Pass* |

Pass* = Pass with some minor differences

Table 14 below shows the results of Examples 1, 3, 4, and 6-8 compared to the standard Celgard® 2325 separator as a control. The industry standard, Celgard® 2325 separator, is a polymer-based separator that utilizes polyethylene and polypropylene or combinations thereof to provide a semi-permeable barrier. These separators, however, are susceptible to thermal degradation and oxidative destruction as evidenced by the LOI. Further, the average pore diameter and permeability is greatly reduced when utilizing a polymer base separator.

TABLE 14

RESULTS OF EXAMPLES 1, 3, 4, AND 6-8

Results

| Characteristic | Ultra-Thin Mat | | | | | | Standard |
| --- | --- | --- | --- | --- | --- | --- | --- |
| | Example 1 | Example 3 | Example 4 | Example 6 | Example 7 | Example 8 | |
| Handleability (Pass/Fail) | Pass | Pass | Pass | Pass | Pass | Pass | ND |
| Thickness (μm) | 20 | 22 | 19 | 19 | 23 | 50 | 25 |
| Area Density - GSM | 4.8 | 6.1 | 5.7 | ND* | 5.0 | 14.0 | 15 |
| Loss on Ignition TGA (%) | 4.3 | 13.7 | 7.8 | 5.4 | 8.2 | 7.7 | 99.5 |
| Average Pore Diameter (μm) | 1.8 | 1.3 | 1.1 | ND* | 1.3 | ND | 0.0106 |
| Pore Volume (cm$^3$/g) | 3.4 | 1.2 | 1.3 | ND* | 2.5 | ND | 0.9 |
| Permeability (Darcy) | 0.121 | 0.024 | 0.018 | ND* | 0.027 | ND | 0.00014 |
| Tensile Strength (kg/cm$^2$) | 20 | 29 | 22 | 4.0 | 26 | 22 | 150-1700 |
| Surface Area (m$^2$/g) | 7.5 | 3.8 | 4.7 | ND* | 8.1 | ND | ND |

ND = Not determined

ND* = Not determined because tensile strength too weak

Figure 24:
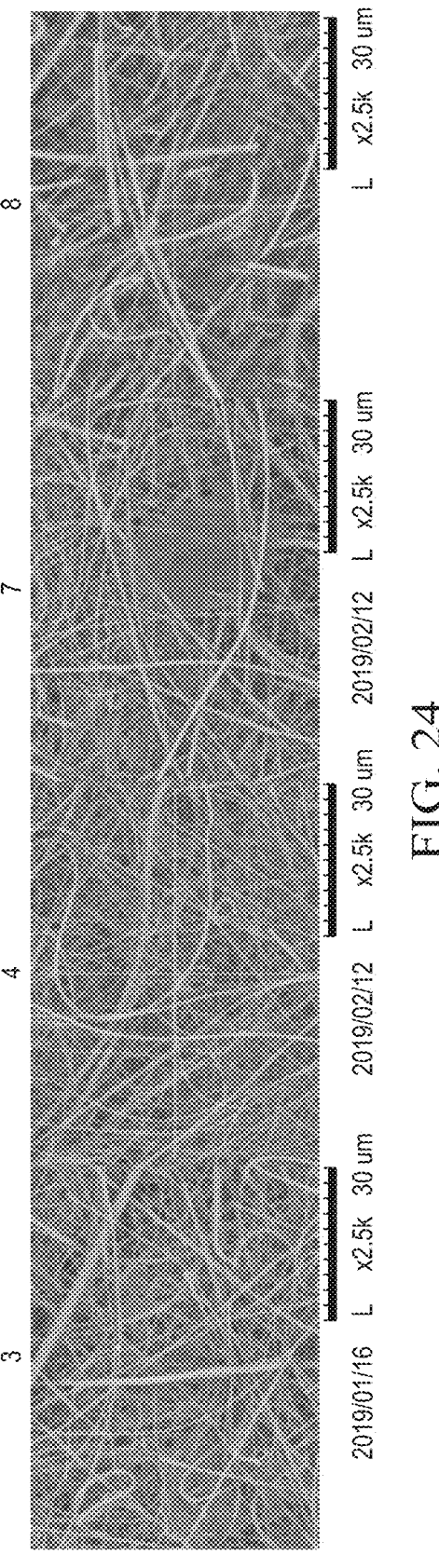
FIG. 24 illustrates SEM micrographs of the ultra-thin mats of Example 3, 4, 7, and 8 according to embodiments of the present disclosure.

FIG. 24 are SEM micrographs of the mats prepared according to Examples 3, 4, 7, and 8.

Table 15 below shows the performance results inside a coin cell of separators of Examples 2, 3, 5, and 8 compared to a generic PP separator as a control. The results presented in Table 15 exhibit increased pore diameter, pore volume, and permeability. The nature of the separator allows for the improved transit of ions within the coin cell. Additionally, cyclic voltammetry suggests that the separators of Examples 2 and 5 are more stable in the coin cell preparations.

according to Example 5 would result in an improved specific charge capacity compared to those prepared with a PP type separator. Still further, the percent specific discharge capacity of cells prepared with the separator of Example 5 is three times greater at 5 C discharge rates than those with PP type separators. Cyclic voltammetry shows stability of the coin cells prepared with the separator of Example 5 compared to other examples and in particular compared to the generic PP separator.

TABLE 15

| PERFORMANCE RESULTS OF EXAMPLES 2, 3, 5, AND 8 | | | | | |
|---|---|---|---|---|---|
| | Result | | | | |
| Characteristic | Example 2 | Example 3 | Example 5 | Example 8 | Standard |
| % Cumulative Charge | | | | | |
| 5C | 57.0 | 32.5 | 3.0 | 34.6 | 7.3 |
| 2C | 81.3 | 75.4 | 51.5 | 72.6 | 53.8 |
| 1C | 90.6 | 88.2 | 73.9 | 82.7 | 79.3 |
| C/2 | 95.5 | 94.1 | 87.1 | 89.7 | 90.7 |
| C/5 | 98.6 | 98.0 | 97.0 | 96.7 | 97.2 |
| C/10 | 100.0 | 100.0 | 100.0 | 100.0 | 100.0 |
| % Cumulative Discharge | | | | | |
| 5C | 49.9 | 39.8 | 33.4 | 44.2 | 11.5 |
| 2C | 89.6 | 84.7 | 85.4 | 86.2 | 48.5 |
| 1C | 95.0 | 92.6 | 93.3 | 92.4 | 77.7 |
| C/2 | 97.7 | 96.4 | 96.7 | 95.7 | 87.8 |
| C/5 | 99.4 | 98.8 | 98.8 | 98.4 | 96.3 |
| C/10 | 100.0 | 100.0 | 100.0 | 100.0 | 100.0 |
| Average Capacity Performance Discharge Rate of C/3 (mAh/g) | 132.3 | 122.1 | 122.6 | 125.5 | 121.2 |
| Average Capacity Performance Charge Rate of C/3 (mAh/g) | 132.9 | 122.6 | 123.6 | 125.4 | 122.5 |
| Average Coulombic Efficiency at C/3 | 99.6% | 99.7% | 99.3% | 100.0 | 98.9% |
| Cell Integrity - Cyclic Voltammetry (Pass/Fail) | Pass | Pass* | Pass | Pass* | Pass* |

Pass* = Pass with some minor differences

The separator of Example 5, which includes 5% NFC, is an exemplary embodiment because it has improved tensile strength compared to the separator of Example 1, while limiting the amount of raw materials lost in the preparation. Moreover, the separator of Example 5 is particularly exemplary because of its ease of preparation, limited materials, and processing required. Furthermore, the separator of Example 5 exhibited at least a 100-fold increase in average pore diameter and permeability when compared to the standard Celgard® 2325 separator. While, the specific charge capacity of coin cells prepared with the separator of Example 5 is significantly lower than those prepared with Examples 2, 3, and 8 and is similar to coin cells prepared with the generic PP separator, those of ordinary skill in the art will readily appreciate that this abnormality may be the result of an error during the formation of the coin cell, experimental setup, or several other factors. Furthermore it would be expected that additional preparations and C-rate testing of coin cells prepared with the separator prepared Example 9—Thin Mat with Nanofibrillated Cellulose A tank was filled with 250 gallons of water, and the pH was adjusted to between 2 and 4 using 10% $H_2SO_4$. After which, 344.2 g of BX9 glass fiber and 143.3 g of NFC was loaded into the tank and allowed to mix into a well dispersed slurry.

The BX9 fiber slurry was then transferred to a cleaning apparatus to remove any excess shot or slag that was present in the fiber and would negatively affect the final quality of the glass fiber mat. The cleaned fiber was then transferred to a large mix tank.

The resulting slurry was then transferred to a headbox of a rotoformer, at a rate of 15 gal/min, a mat then formed on the rotoformer drum (width: 33.7 cm) at a rate of 3.5 ft/min, and was pressed and dried in radio frequency (RF) and conduction ovens.

Figure 25:
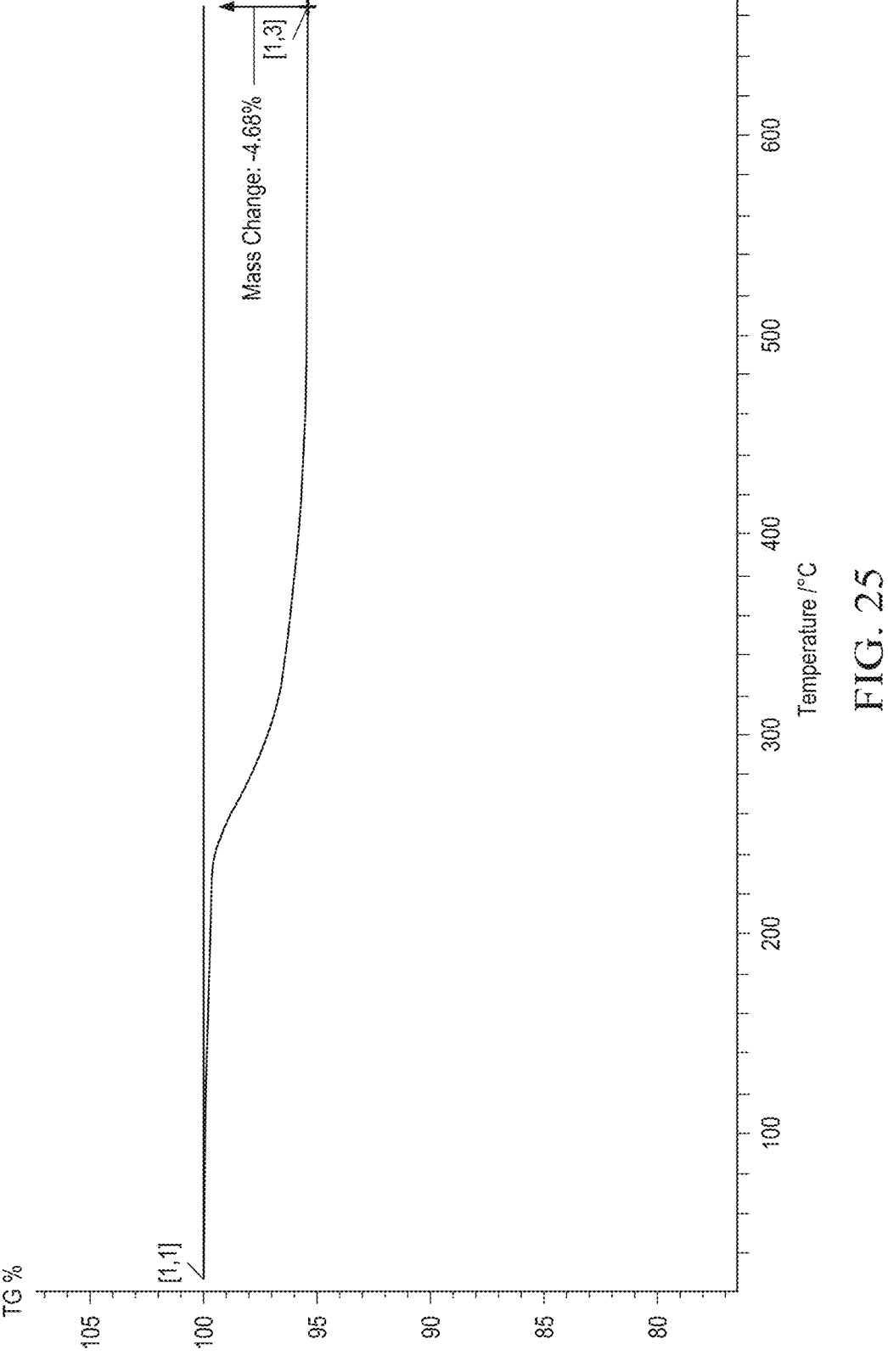
FIG. 25 illustrates the loss on ignition of the thin mat of Example 9 according to embodiments of the present disclosure.
Figure 26A:
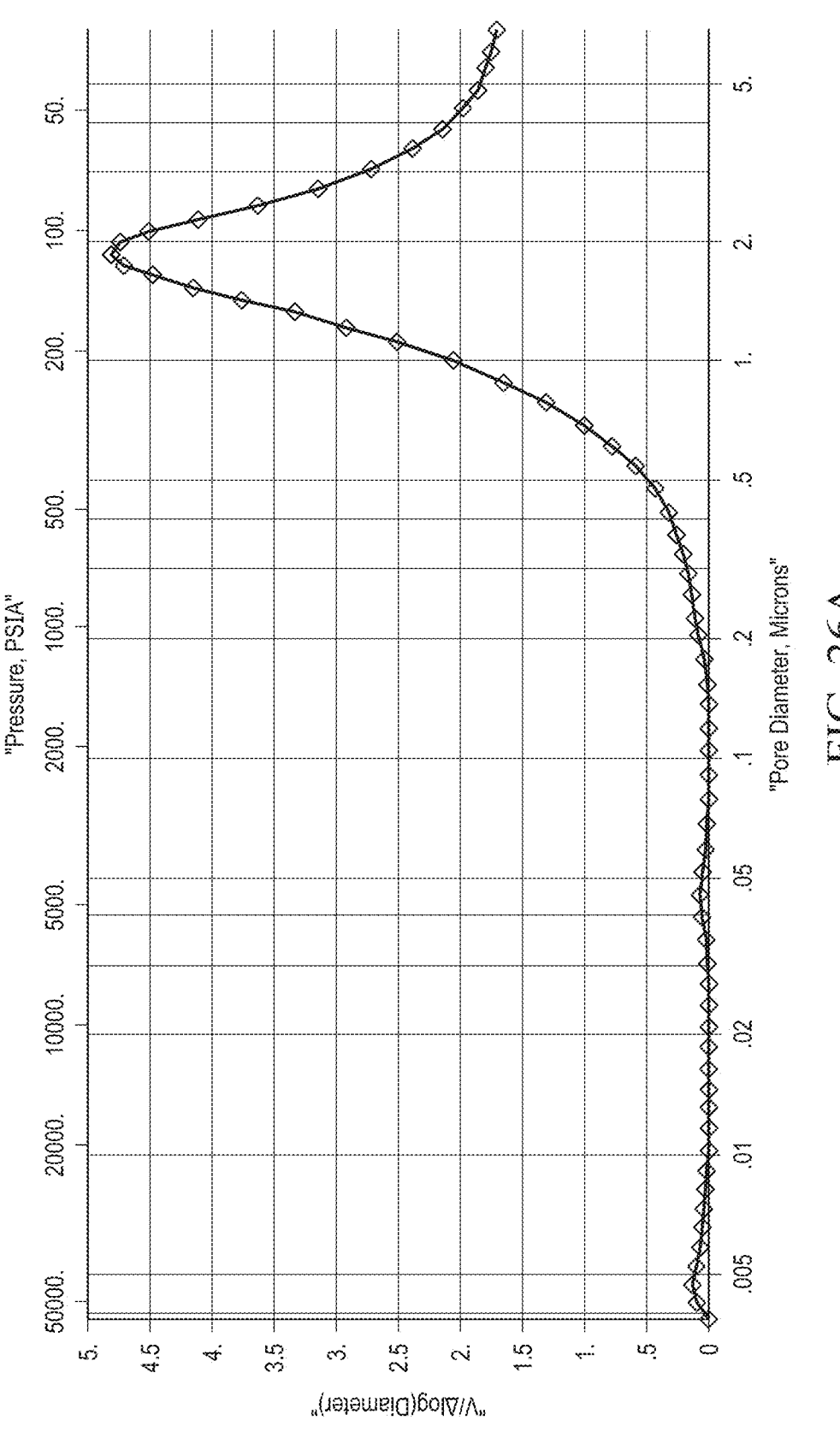
FIGS. 26A, 26B, and 26C illustrate the median pore size, cumulative pore volume, and surface area, respectively of the thin mat of Example 9 according to embodiments of the present disclosure.
Figure 26B:
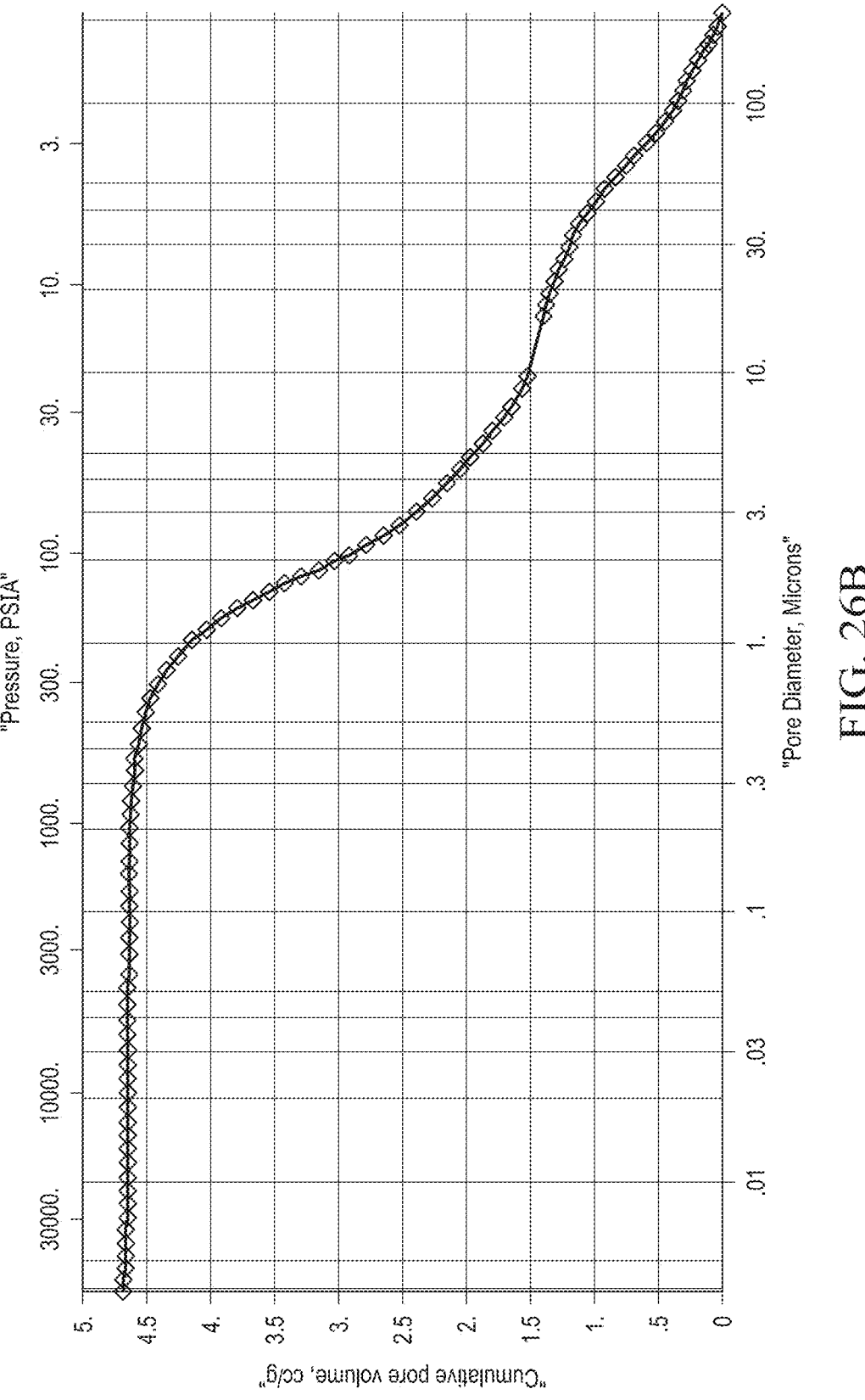
Figure 26C:
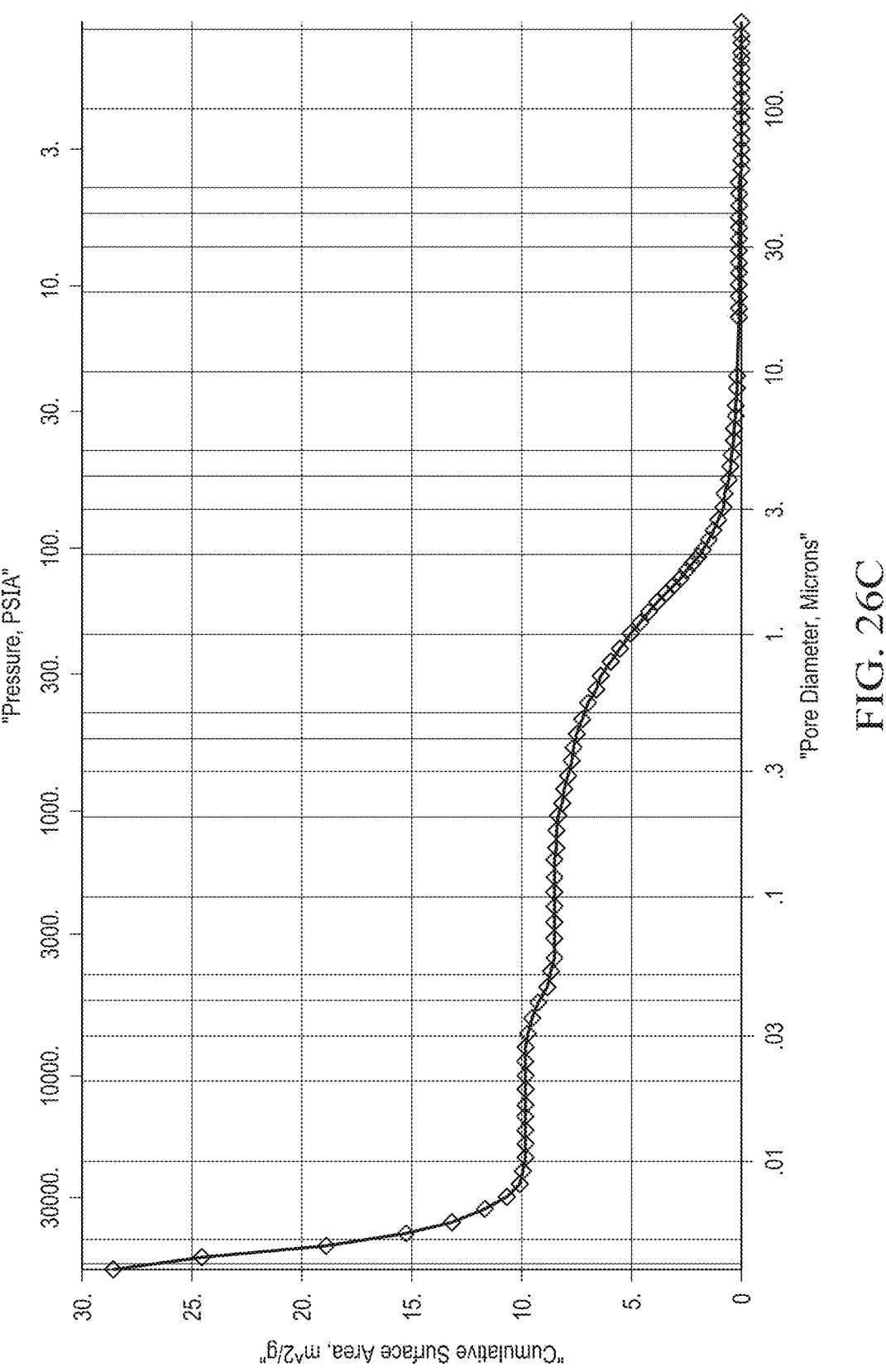
Figure 27:
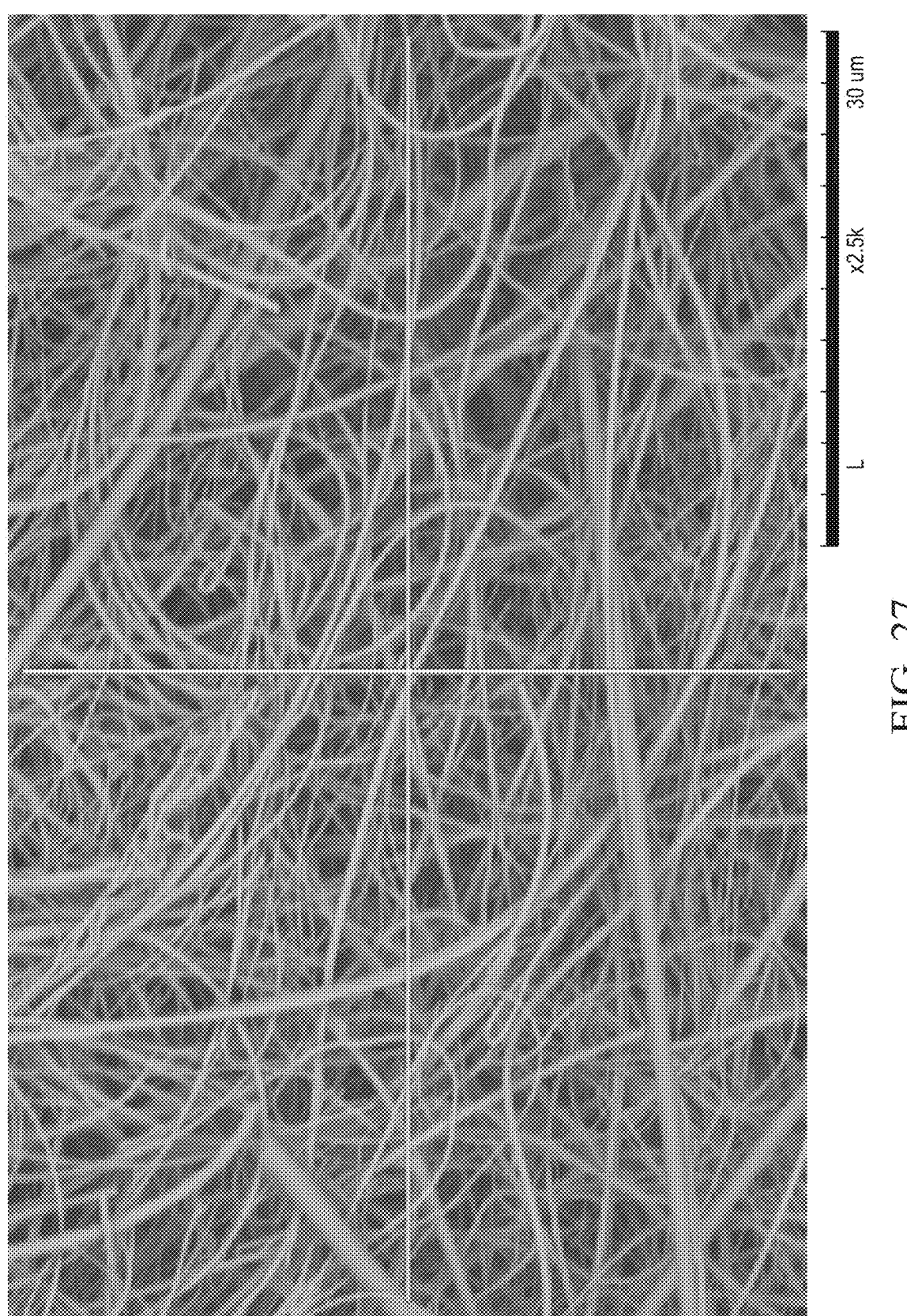
FIG. 27 is an SEM micrograph of the thin mat of Example 9 according to embodiments of the present disclosure.

The resulting mat was characterized by determining the thickness, area density (GSM), LOI (via TGA), MIP (median pore size, surface area and cumulative pore volume), permeability, SEM imaging, and tensile strength. The results for the mat are shown in Table 16 below. FIG. 25 illustrates the LOI (via TGA) of the mat. FIGS. 26A, 26B, and 26C exhibit the median pore size, cumulative pore volume, and surface area of the mat. FIG. 27 is a SEM micrograph of the mat.

The results are shown in Table 16.

TABLE 16

| RESULTS OF EXAMPLE 9 | |
| --- | --- |
| Characteristic | Thin Mat |
| Handleability (Pass/Fail) | Pass |
| Average Thickness ($\mu$m) | 470 |
| Maximum Thickness ($\mu$m) | 610 |
| Minimum Thickness ($\mu$m) | 406 |
| Area Density - GSM | 55 |
| Loss on Ignition by TGA (%) | 4.7 |
| Average Pore Diameter ($\mu$m) | 1.9 |
| Pore Volume ($cm^3$/g) | 4.7 |
| Permeability (Darcy) | 0.049 |
| Tensile Strength (lbs./in) | 2.6 |
| Surface Area ($m^2$/g) | 28.7 |
| Fiber Index (%) | 99.8 |
| Shot Content (%) | 0.2 |

Example 10—Thin Mat with Nanofibrillated Cellulose

A tank was filled with 250 gallons of water, and the pH was adjusted to between 2 and 4 using 10% $H_2SO_4$. After which, 344.2 g of BX9 glass fiber and 143.3 g of NFC was loaded into the tank and allowed to mix into a well dispersed slurry.

The BX9 fiber slurry was then transferred to a cleaning apparatus to remove any excess shot or slag that was present in the fiber and would negatively affect the final quality of the glass fiber mat. The cleaned fiber was then transferred to a large mix tank.

The resulting slurry was then transferred to a headbox of a rotoformer, at a rate of 15 gal/min, a mat then formed on the rotoformer drum (width: 33.7 cm) at a rate of 4.7 ft/min, and was pressed and dried in radio frequency (RF) and conduction ovens.

Figure 28A:
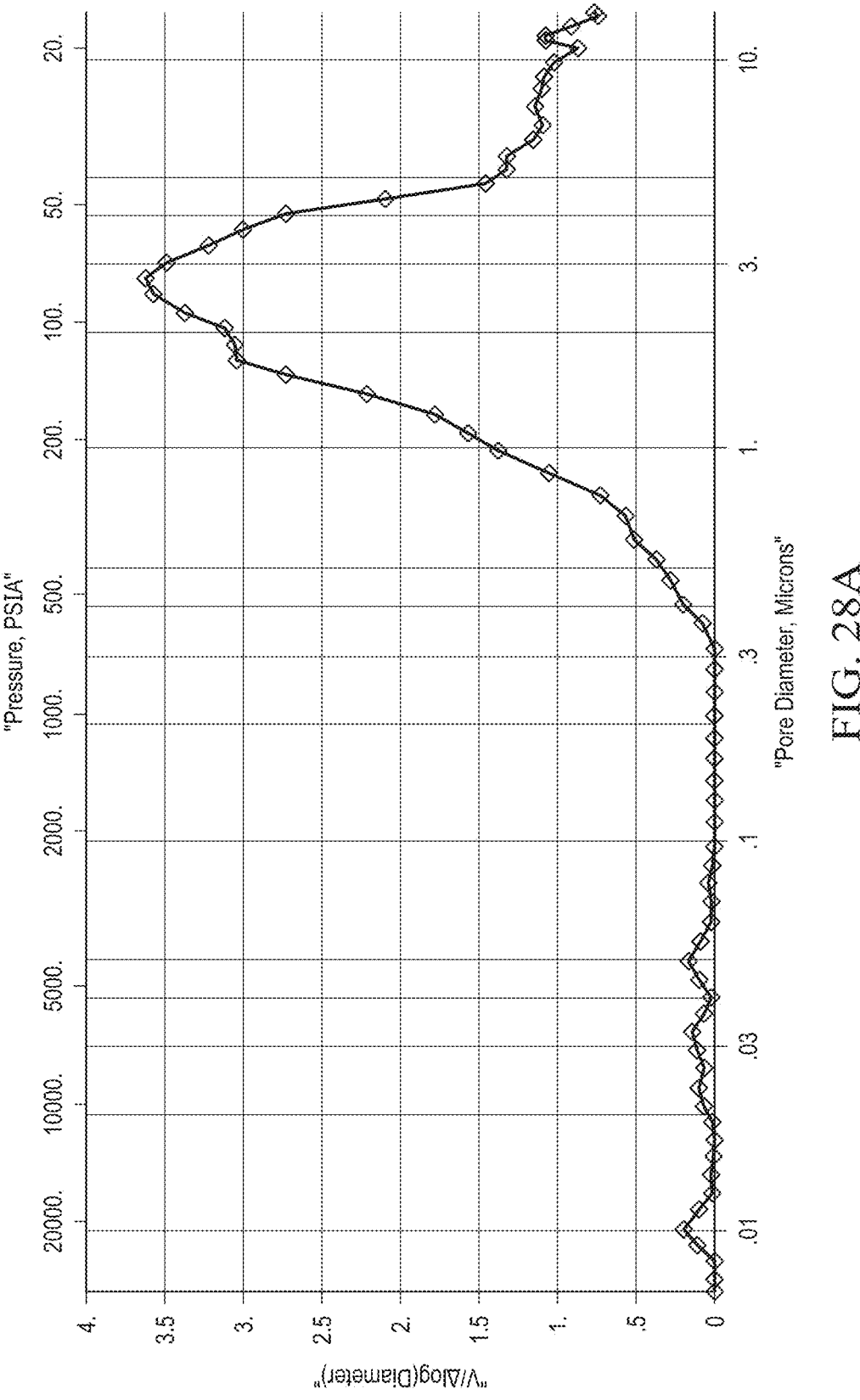
FIGS. 28A, 28B, and 28C illustrate the median pore size, cumulative pore volume, and surface area, respectively, of the thin mat of Example 10 according to embodiments of the present disclosure.
Figure 28B:
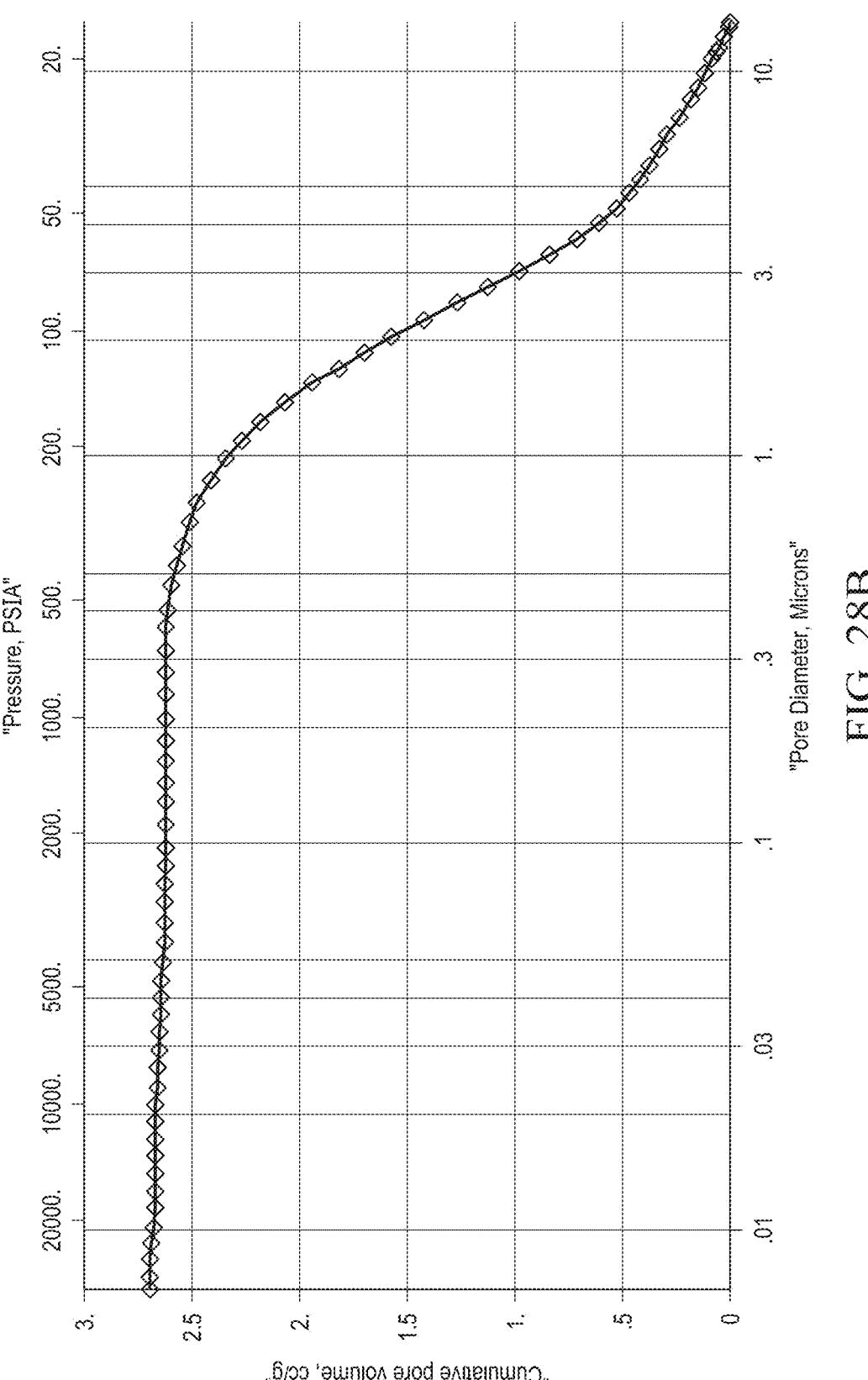
Figure 28C:
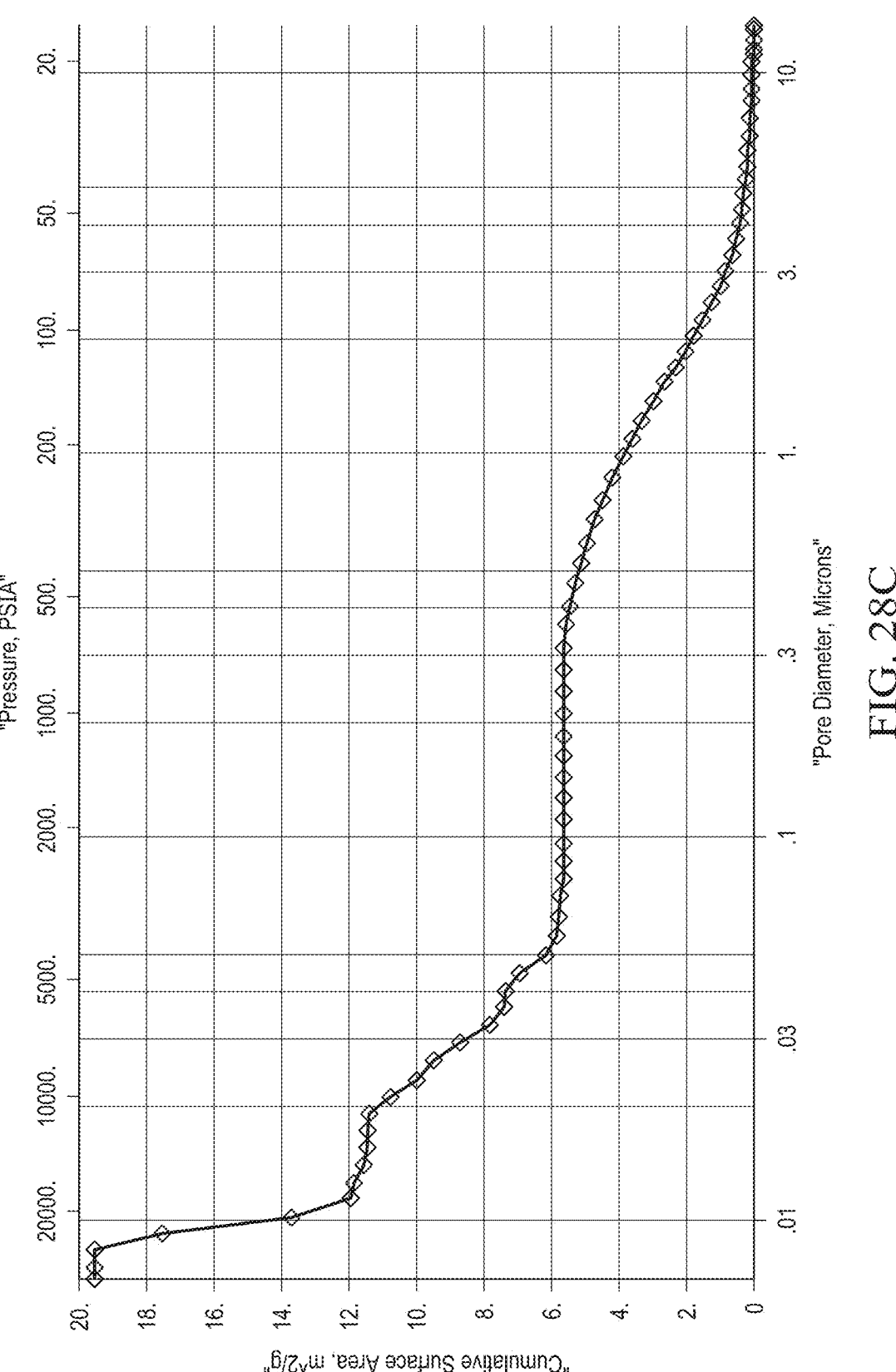

The resulting mat was characterized by determining the thickness, area density (GSM), LOI (via TGA), MIP (median pore size, surface area and cumulative pore volume), permeability, SEM imaging, and tensile strength. The results for the mat are shown in Table 17 below. FIGS. 28A, 28B, and 28C exhibit the median pore size, cumulative pore volume, and surface area of the mat.

The results are shown in Table 17.

TABLE 17

| RESULTS OF EXAMPLE 10 | |
| --- | --- |
| Characteristic | Thin Mat |
| Handleability (Pass/Fail) | Pass |
| Average Thickness ($\mu$m) | 445 |
| Maximum Thickness ($\mu$m) | 521 |
| Minimum Thickness ($\mu$m) | 432 |
| Area Density - GSM | 42 |
| Loss on Ignition by TGA (%) | 4.0 |

TABLE 17-continued

| RESULTS OF EXAMPLE 10 | |
| --- | --- |
| Characteristic | Thin Mat |
| Average Pore Diameter ($\mu$m) | 2.7 |
| Pore Volume ($cm^3$/g) | 2.7 |
| Permeability (Darcy) | 0.080 |
| Tensile Strength (lbs./in) | 1.8 |
| Surface Area ($m^2$/g) | 19.6 |
| Fiber Index (%) | 99.8 |
| Shot Content (%) | 0.2 |

Example 11—Thin Mat with Nanofibrillated Cellulose

A tank was filled with 250 gallons of water, and the pH was adjusted to between 2 and 4 using 10% $H_2SO_4$. After which, 344.2 g of BX9 glass fiber and 143.3 g of NFC was loaded into the tank and allowed to mix into a well dispersed slurry.

The BX9 fiber slurry was then transferred to a cleaning apparatus to remove any excess shot or slag that was present in the fiber and would negatively affect the final quality of the glass fiber mat. The cleaned fiber was then transferred to a large mix tank.

The resulting slurry was then transferred to a headbox of a rotoformer, at a rate of 15 gal/min, a mat then formed on the rotoformer drum (width: 33.7 cm) at a rate of 7.0 ft/min, and was pressed and dried in radio frequency (RF) and conduction ovens.

Figure 29A:
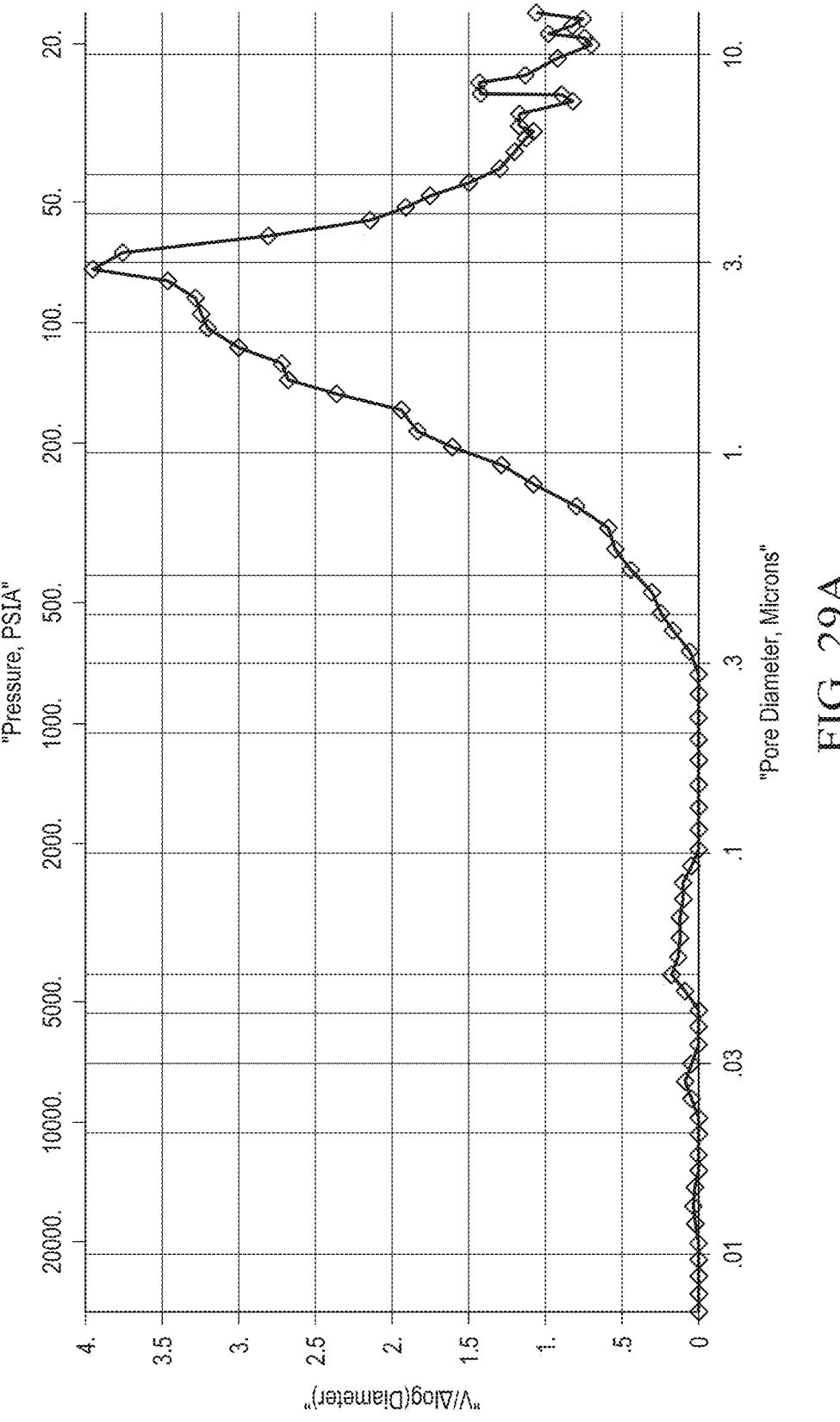
FIGS. 29A, 29B, and 29C illustrate the median pore size, cumulative pore volume, and surface area, respectively, of the thin mat of Example 11 according to embodiments of the present disclosure.
Figure 29B:
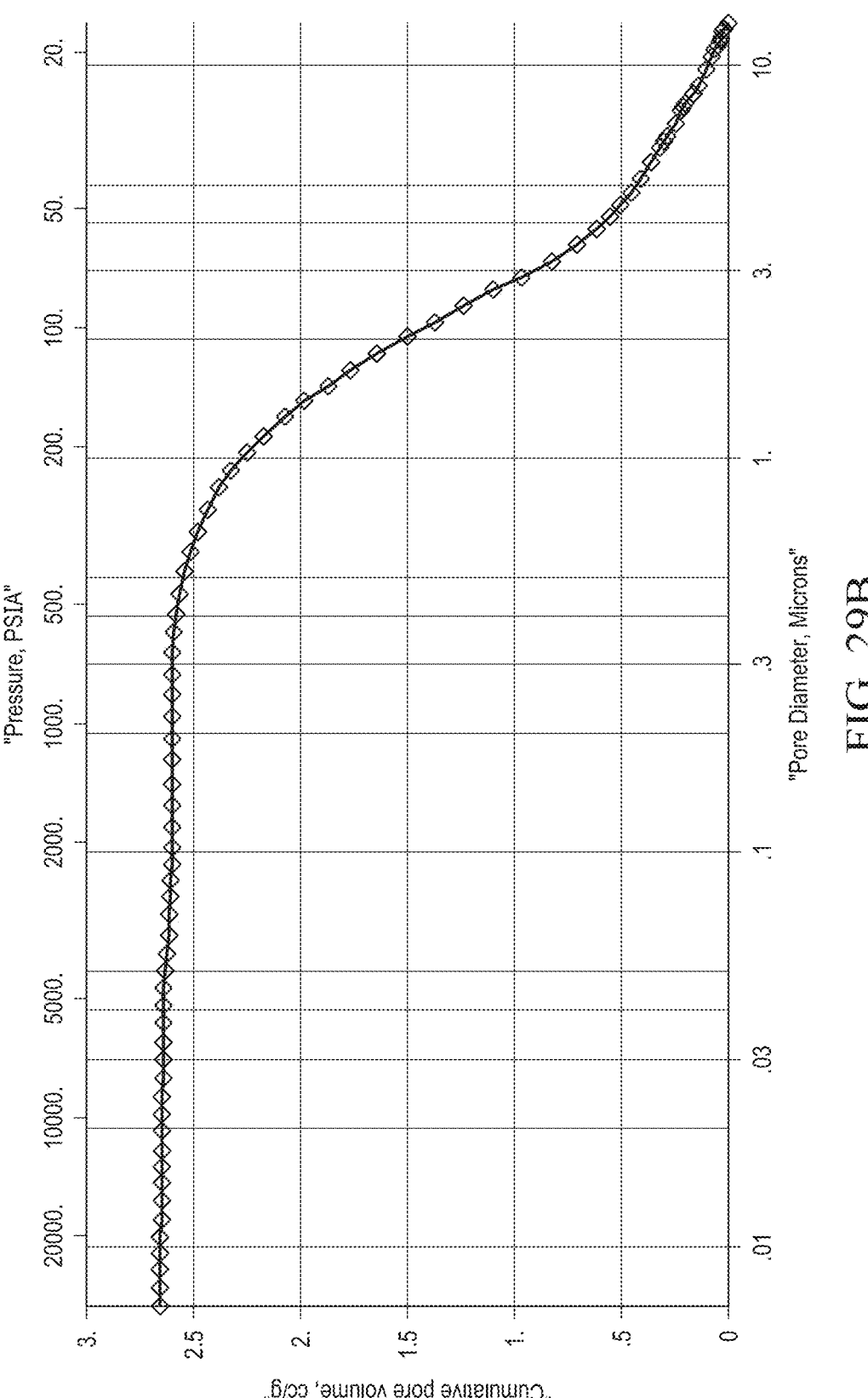
Figure 29C:
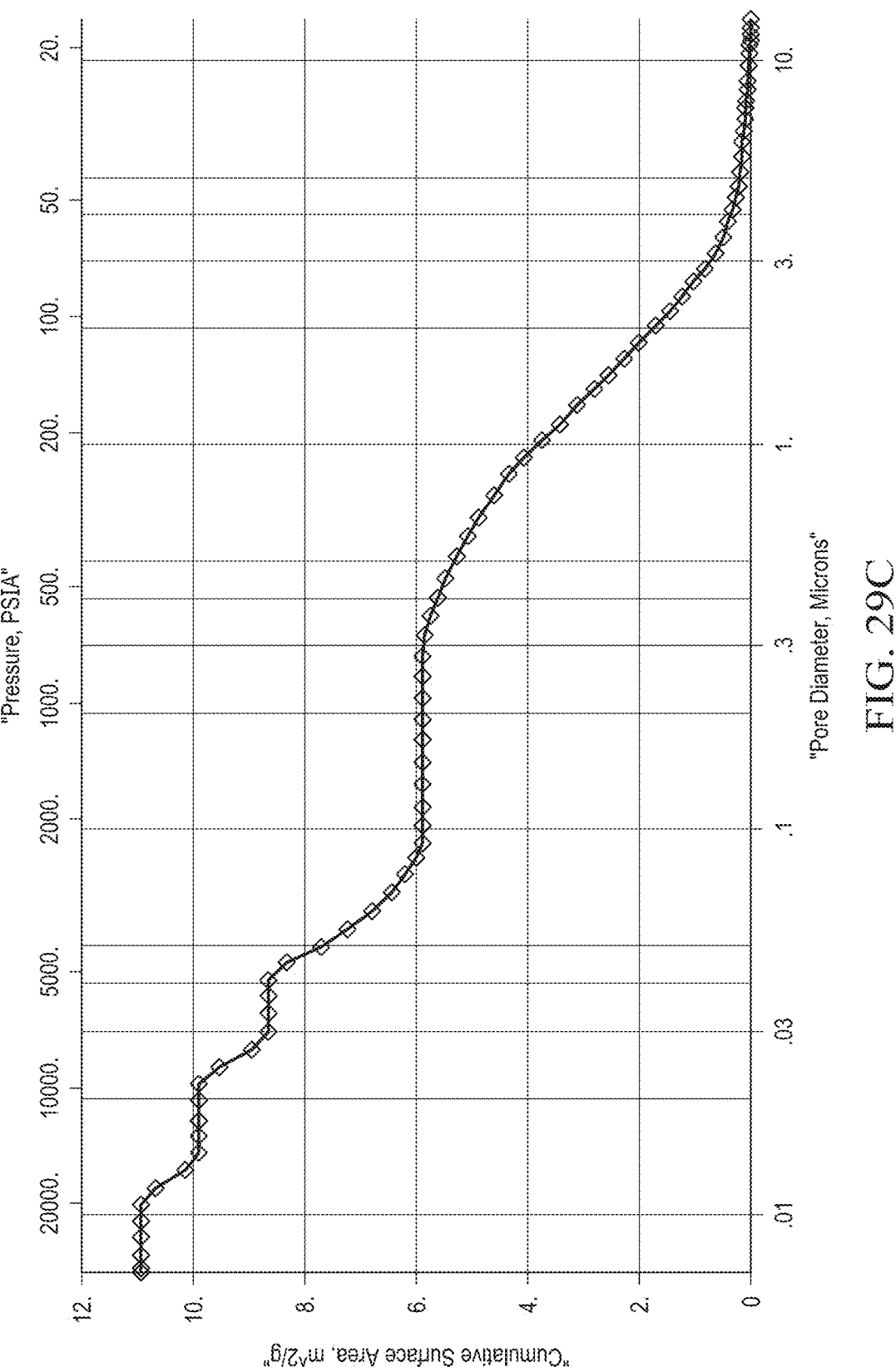

The resulting mat was characterized by determining the thickness, area density (GSM), LOI (via TGA), MIP (median pore size, surface area and cumulative pore volume), permeability, SEM imaging, and tensile strength. The results for the mat are shown in Table 18 below. FIGS. 29A, 29B, and 29C exhibit the median pore size, cumulative pore volume, and surface area of the mat.

The results are shown in Table 18.

TABLE 18

| RESULTS OF EXAMPLE 11 | |
| --- | --- |
| Characteristic | Thin Mat |
| Handleability (Pass/Fail) | Pass |
| Average Thickness ($\mu$m) | 368 |
| Maximum Thickness ($\mu$m) | 381 |
| Minimum Thickness ($\mu$m) | 356 |
| Area Density - GSM | 33 |
| Loss on Ignition by TGA (%) | 4.1 |
| Average Pore Diameter ($\mu$m) | 2.9 |
| Pore Volume ($cm^3$/g) | 2.7 |
| Permeability (Darcy) | 0.102 |
| Tensile Strength (lbs./in) | 1.4 |
| Surface Area ($m^2$/g) | 10.9 |
| Fiber Index (%) | 99.8 |
| Shot Content (%) | 0.2 |

It should be understood that fibers of the same chemistry as BX9 fibers, or having a different diameter or surface area, may be used. Additionally, alternate fiber chemistries (e.g., A, C, D, or E) may be utilized having the same or different fiber diameters or surface areas. By controlling these characteristics, mats of varying chemistries, thicknesses, GSMs, pore sizes, and/or pore diameters can be produced. Likewise, additional traditional papermaking processes may be used to prepare the mats. Embodiments may contain more or less glass fiber to obtain a thicker or thinner mat, respectively.

Although only a few exemplary embodiments have been described in detail above, those of ordinary skill in the art will readily appreciate that many other modifications are possible in the exemplary embodiments without materially departing from the novel teachings and advantages of the present invention. Accordingly, all such modifications are intended to be included within the scope of the present invention as defined in the following claims.

The invention claimed is:

1. A nonwoven fiber mat, consisting of:

B-glass fibers having an average fiber diameter of less than 0.5 micron and a specific surface area of 5.0 to 7.0 m$^2$/g;

a binder consisting of nanofibrillated cellulose, starch, or polyvinyl acetate; and optionally one or more additives selected from:

a conditioning agent consisting of an alkoxylated alcohol or a polyamidoamine resin, and an additional glass fiber type, wherein the fiber mat has a thickness of about 10 to about 700 microns and a basis weight of about 1 to about 70 g/m$^2$.

2. The nonwoven fiber mat of claim 1, wherein the B-glass fibers are present in an amount of about 50 to about 100 weight percent of the fiber mat.

3. The nonwoven fiber mat of claim 1, wherein the binder is present in an amount of up to 20 weight percent of the fiber mat.

4. The nonwoven fiber mat of claim 1, wherein the conditioning agent is present.

5. The nonwoven fiber mat of claim 4, wherein the conditioning agent is present in an amount of about 1 to about 20 weight percent of the fiber mat.

6. The nonwoven fiber mat of claim 1, wherein the additional glass fiber type is present.

7. The nonwoven fiber mat of claim 6, wherein the additional glass fiber type comprises a C-glass fiber.

8. The nonwoven fiber mat of claim 1, having a heat stability of up to 650° C.

9. The nonwoven fiber mat of claim 1, wherein the fiber mat has a thickness of about 10 to about 100 microns and a basis weight of about 1 to about 25 g/m$^2$.

10. The nonwoven fiber mat of claim 1, wherein the fiber mat has a thickness of about 200 to about 700 microns and a basis weight of about 30 to about 70 g/m$^2$.

11. The nonwoven fiber mat of claim 1, consisting of about 80 to about 99 weight percent of the B-glass fibers and about 1 to about 20 weight percent of nanofibrillated cellulose.

12. A battery comprising the nonwoven fiber mat of claim 1.

13. A lithium-ion battery comprising:

an anode;

a cathode;

an electrolyte solution; and a separator placed between the anode and the cathode, wherein the separator has a thickness of about 10 to about 700 microns and a basis weight of about 1 to about 70 g/m$^2$ and consists of:

B-glass fibers having an average fiber diameter of less than 0.5 micron and a specific surface area of 5.0 to 7.0 m$^2$/g, and a binder consisting of nanofibrillated cellulose, starch, or polyvinyl acetate.

14. The battery of claim 13, wherein the separator has a thickness of about 10 to about 100 microns and a basis weight of about 1 to about 25 g/m$^2$.

15. The battery of claim 13, wherein the separator has a thickness of about 200 to about 700 microns and a basis weight of about 30 to 70 g/m$^2$.

16. The battery of claim 13, wherein the separator has a heat stability of up to 650° C.

17. A method of making a nonwoven fiber mat, comprising:

forming a suspension consisting of:

B-glass fibers having an average fiber diameter of less than about 0.5 micron and a specific surface area of 5.0 to 7.0 m$^2$/g, a binder consisting of nanofibrillated cellulose, starch, or polyvinyl acetate; and optionally one or more additives selected from:

a conditioning agent consisting of an alkoxylated alcohol or a polyamidoamine resin, and an additional glass fiber type;

acidifying the suspension to a pH of about 2.8-3.5 to form a slurry;

distributing the slurry onto a screen; and removing liquid from the slurry to provide a nonwoven fiber mat having a thickness of about 10 to about 700 microns and a basis weight of about 1 to about 70 g/m$^2$.

18. The method of claim 17, wherein the conditioning agent is present in the suspension.

19. The method of claim 17, wherein removing liquid from the slurry comprising applying a vacuum to the slurry.

20. The nonwoven fiber mat of claim 1, wherein the binder consists of nanofibrillated cellulose or starch.

21. The battery of claim 13, wherein the binder consists of nanofibrillated cellulose or starch.

22. The method of claim 17, wherein the binder consists of nanofibrillated cellulose or starch.

* * * * *